Figure 1:
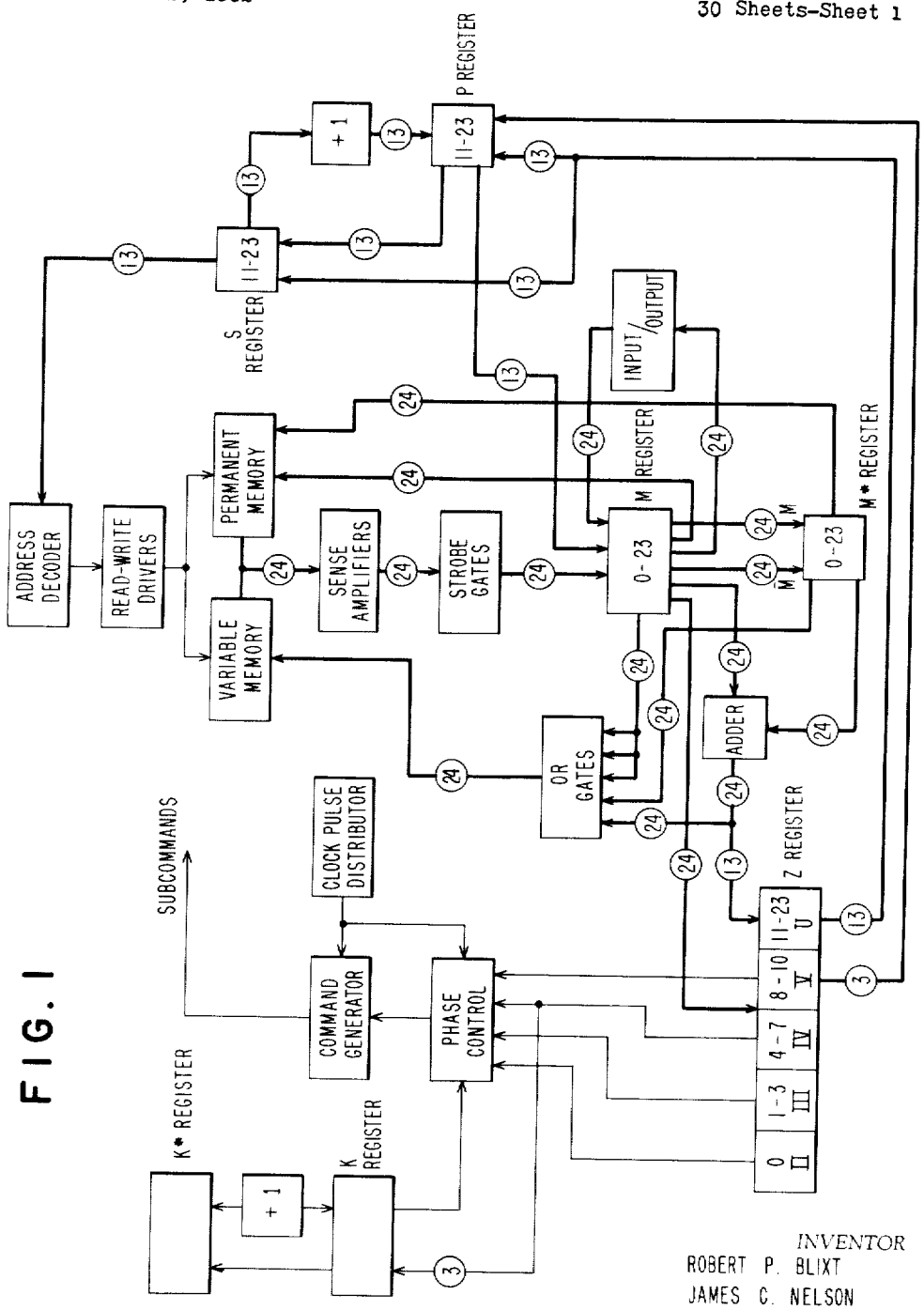

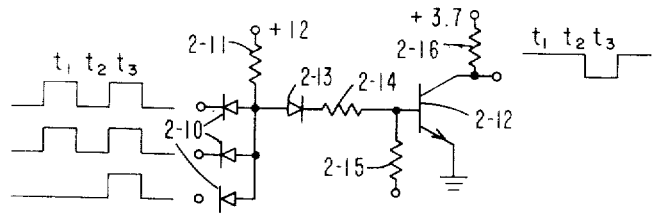
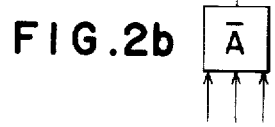
FIG.2a   FIG.2b
FIG.2c
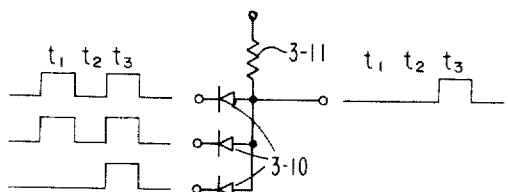
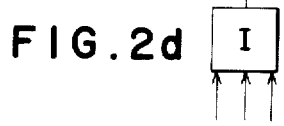
FIG.3a   FIG.2d
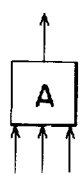
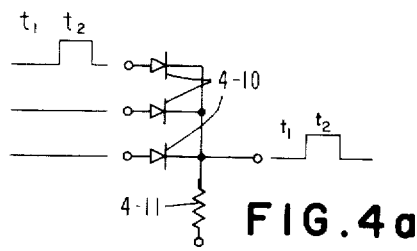
FIG.3b   FIG.4a
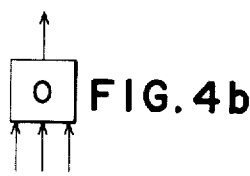
FIG.4b
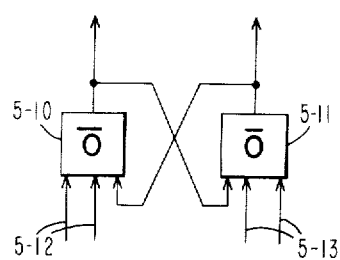
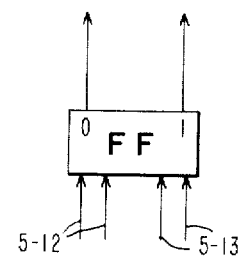
FIG.5a   FIG.5b

S REGISTER

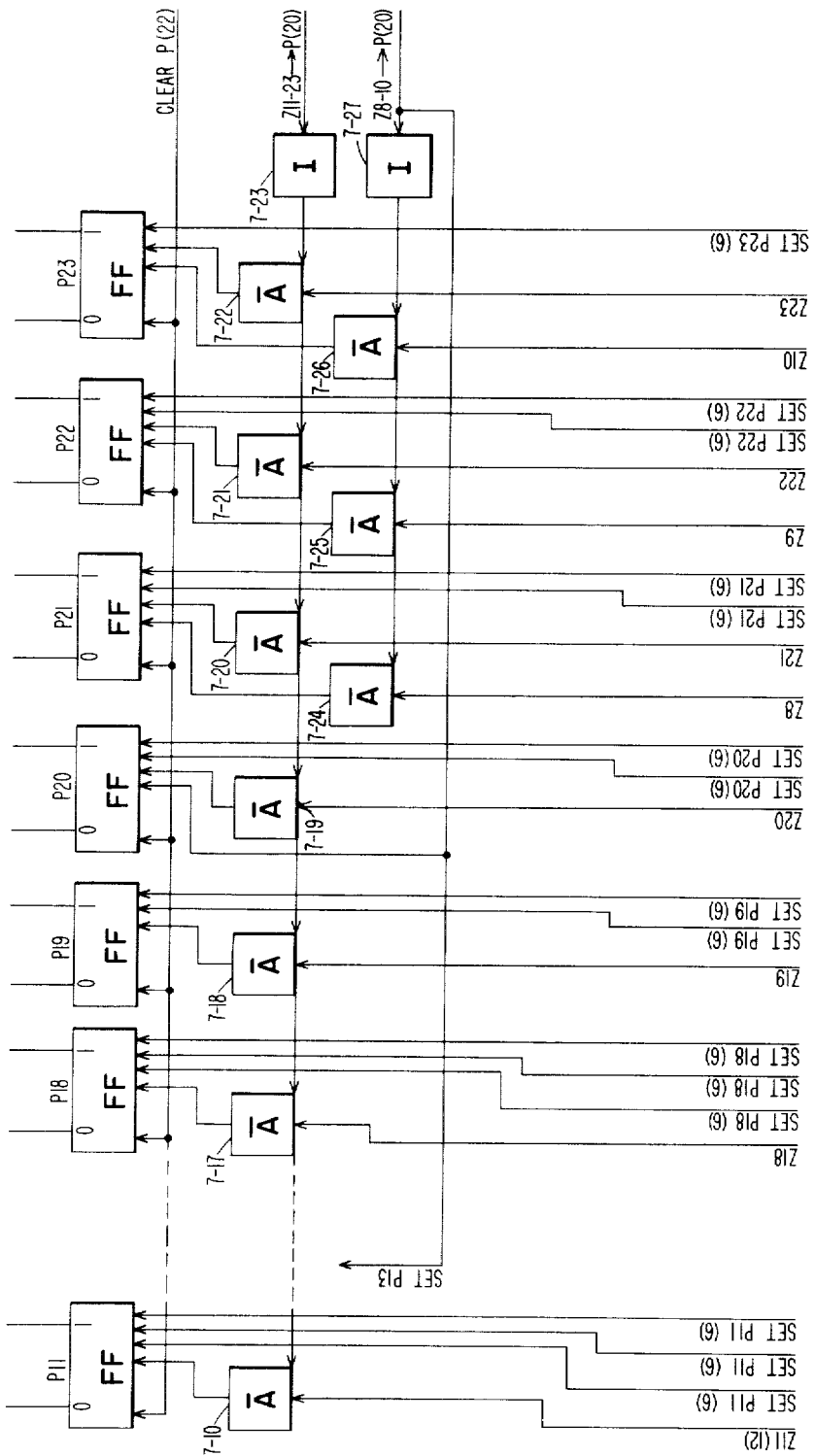
FIG. 7 P REGISTER

M and M* REGISTER

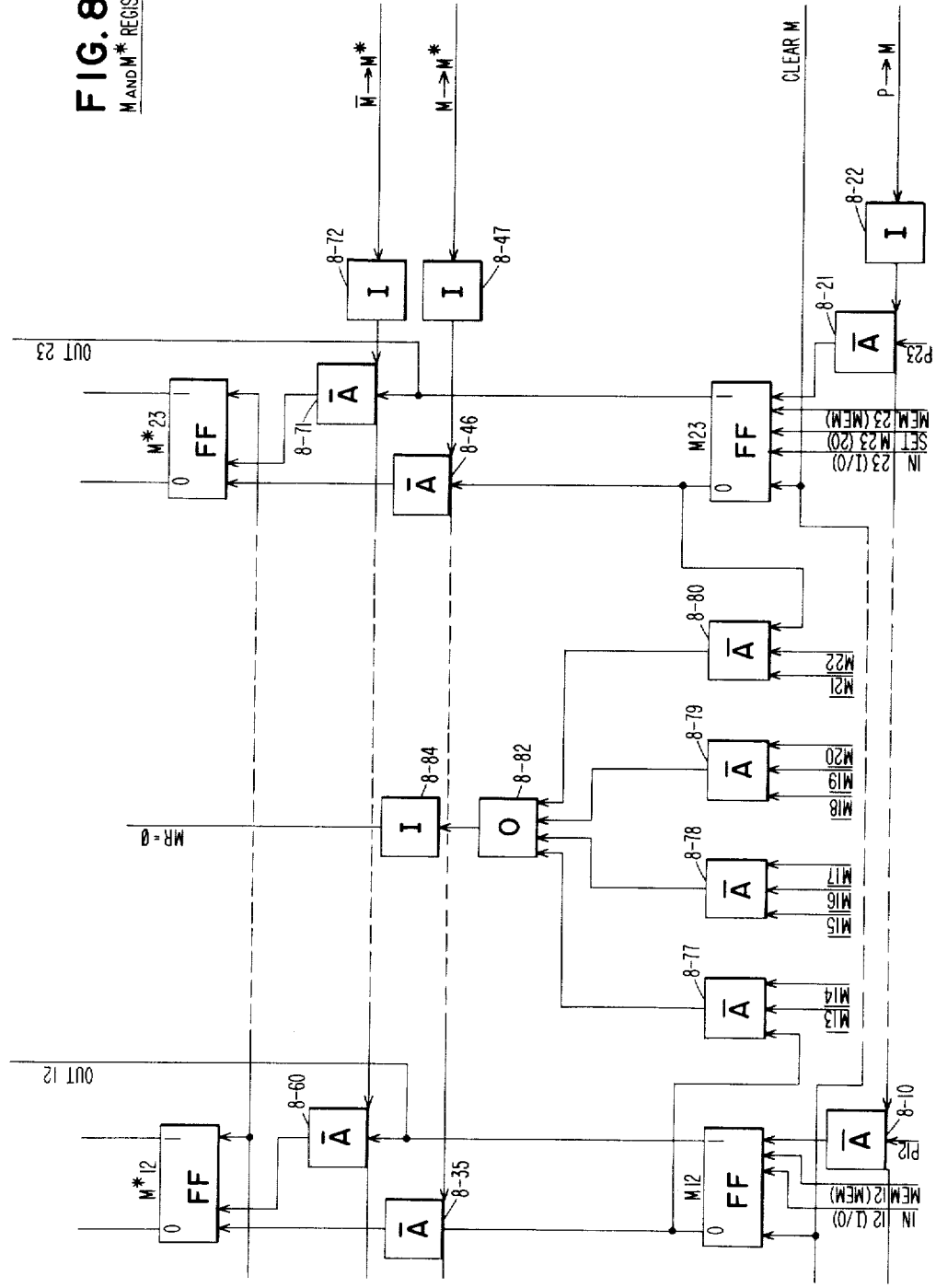

ADDER

DIGIT DRIVERS

DIGIT DRIVERS

K AND K* REGISTER

Z REGISTER

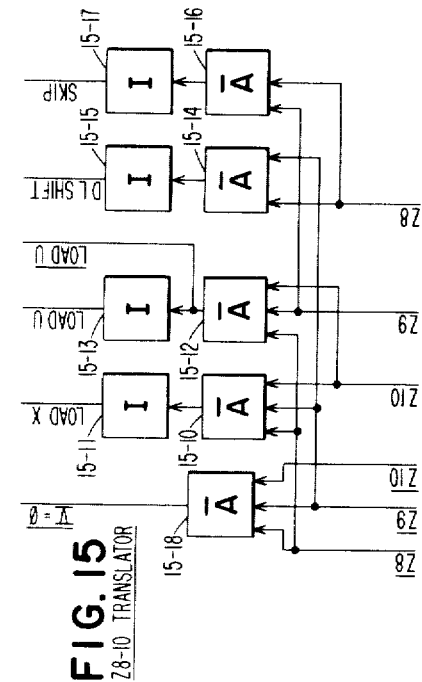
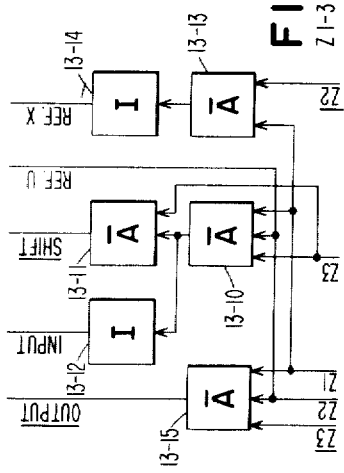
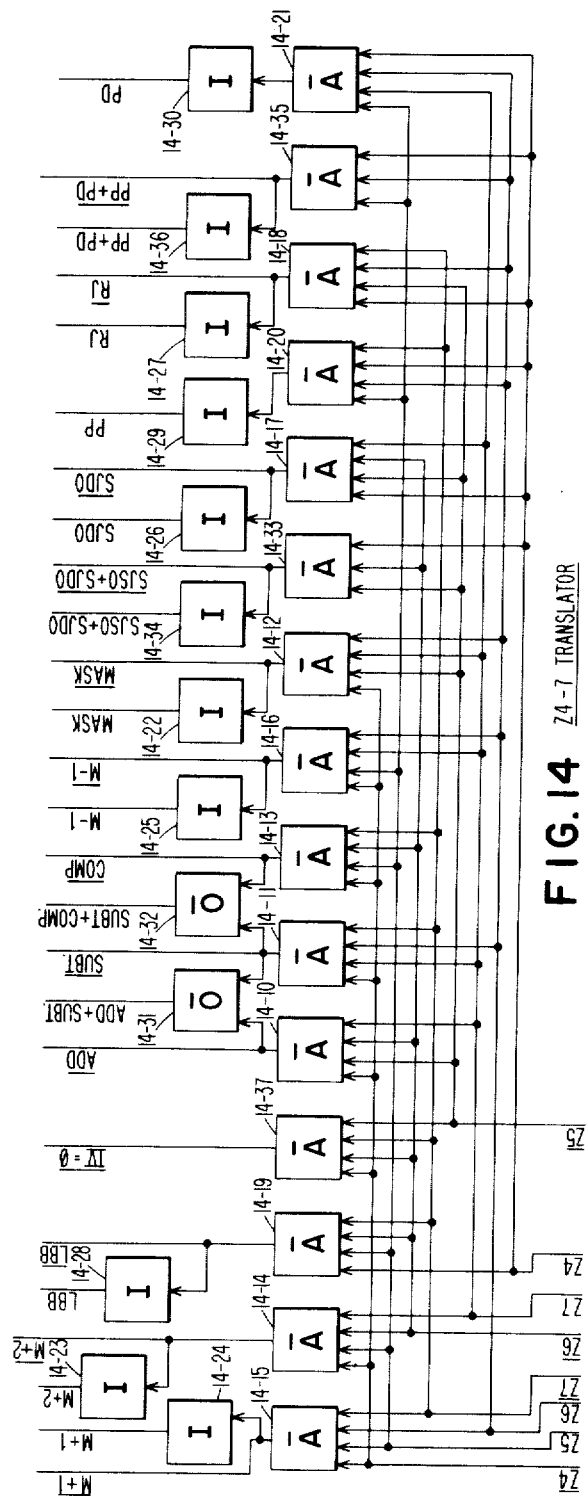

PHASE CONTROL

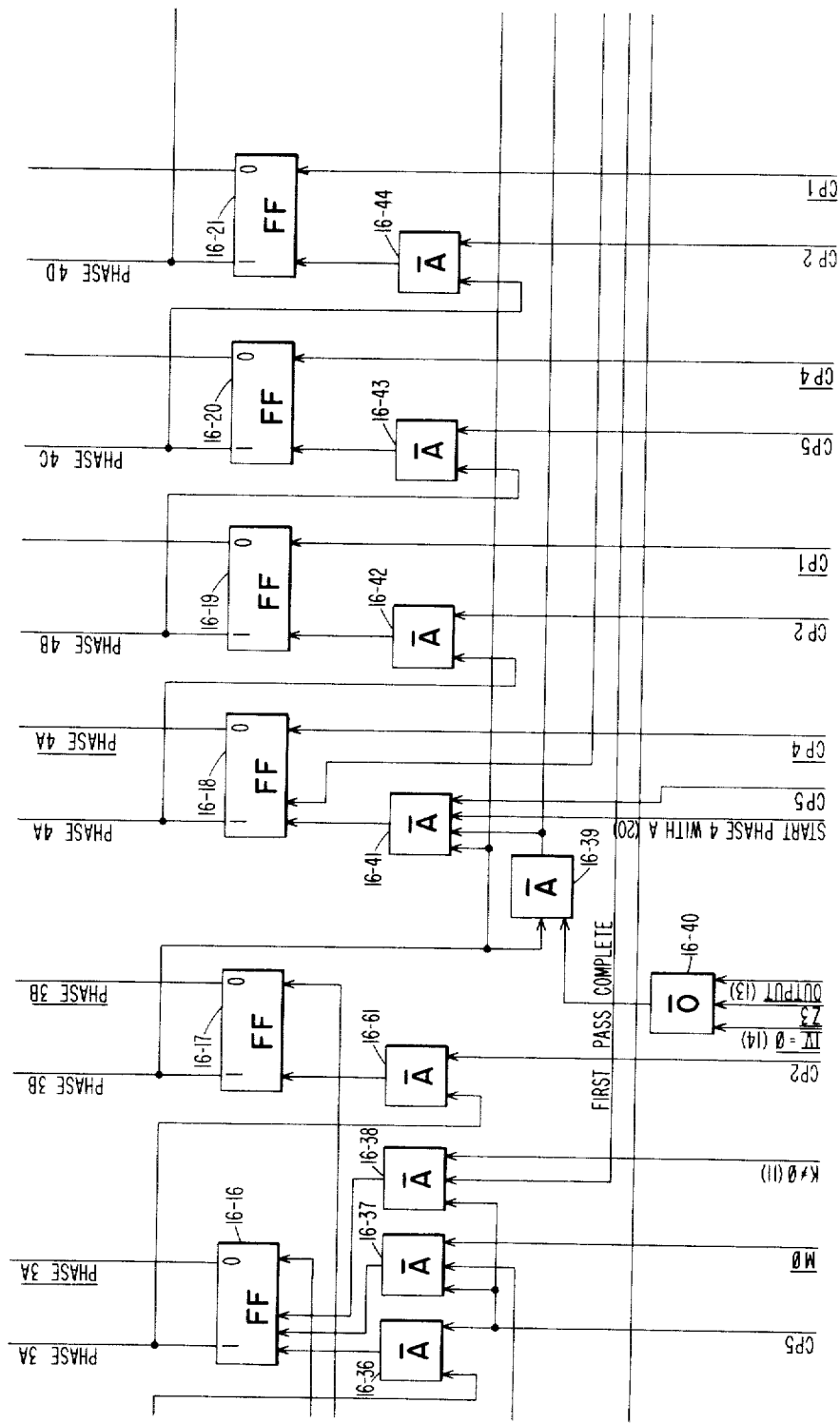

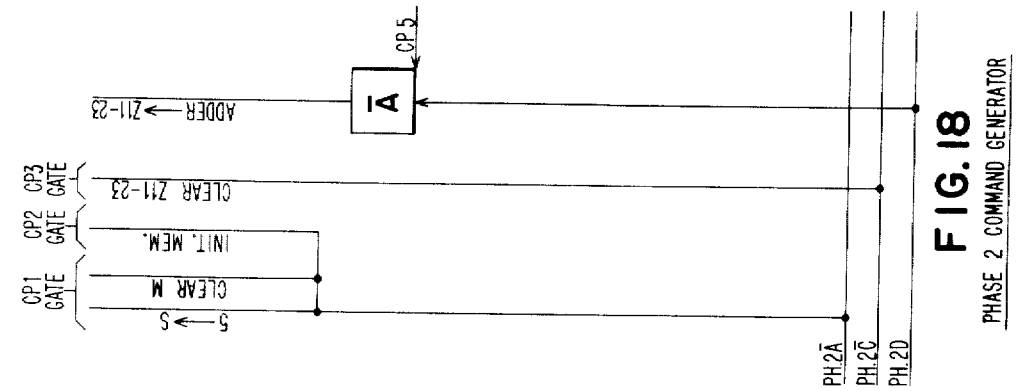
FIG. 18 PHASE 2 COMMAND GENERATOR
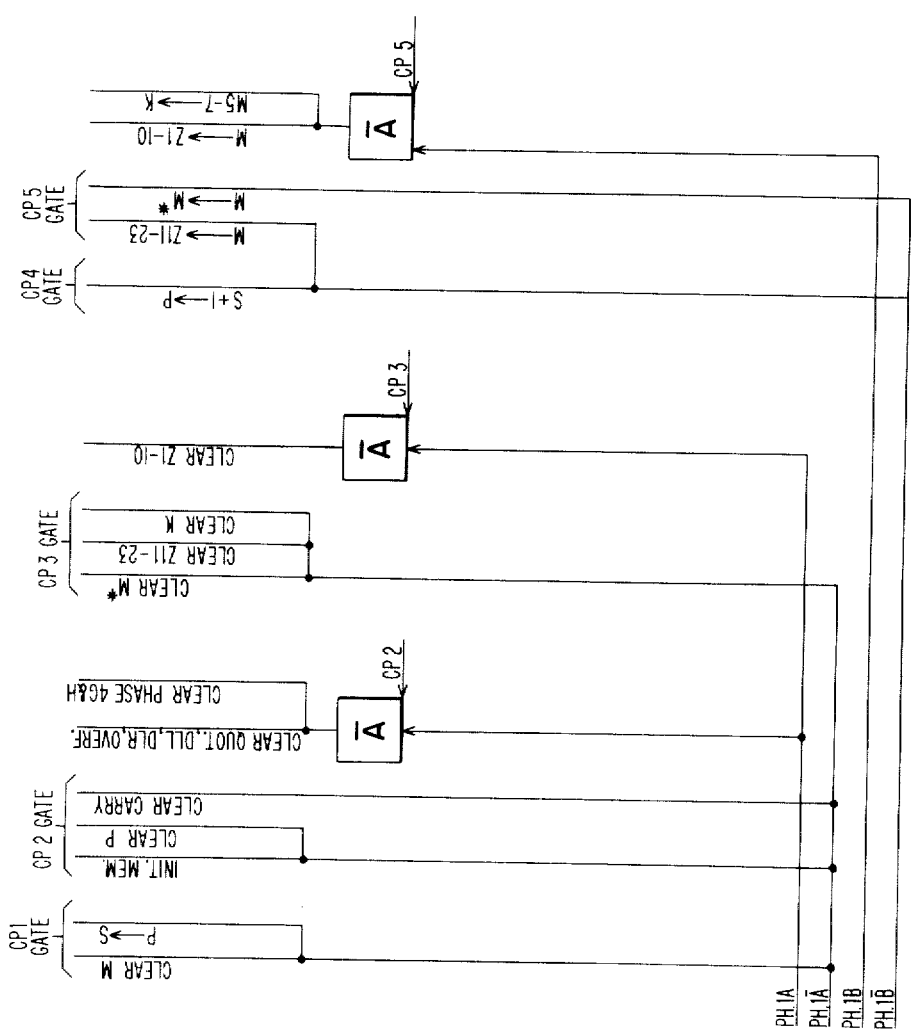
FIG. 17 PHASE 1 COMMAND GENERATOR

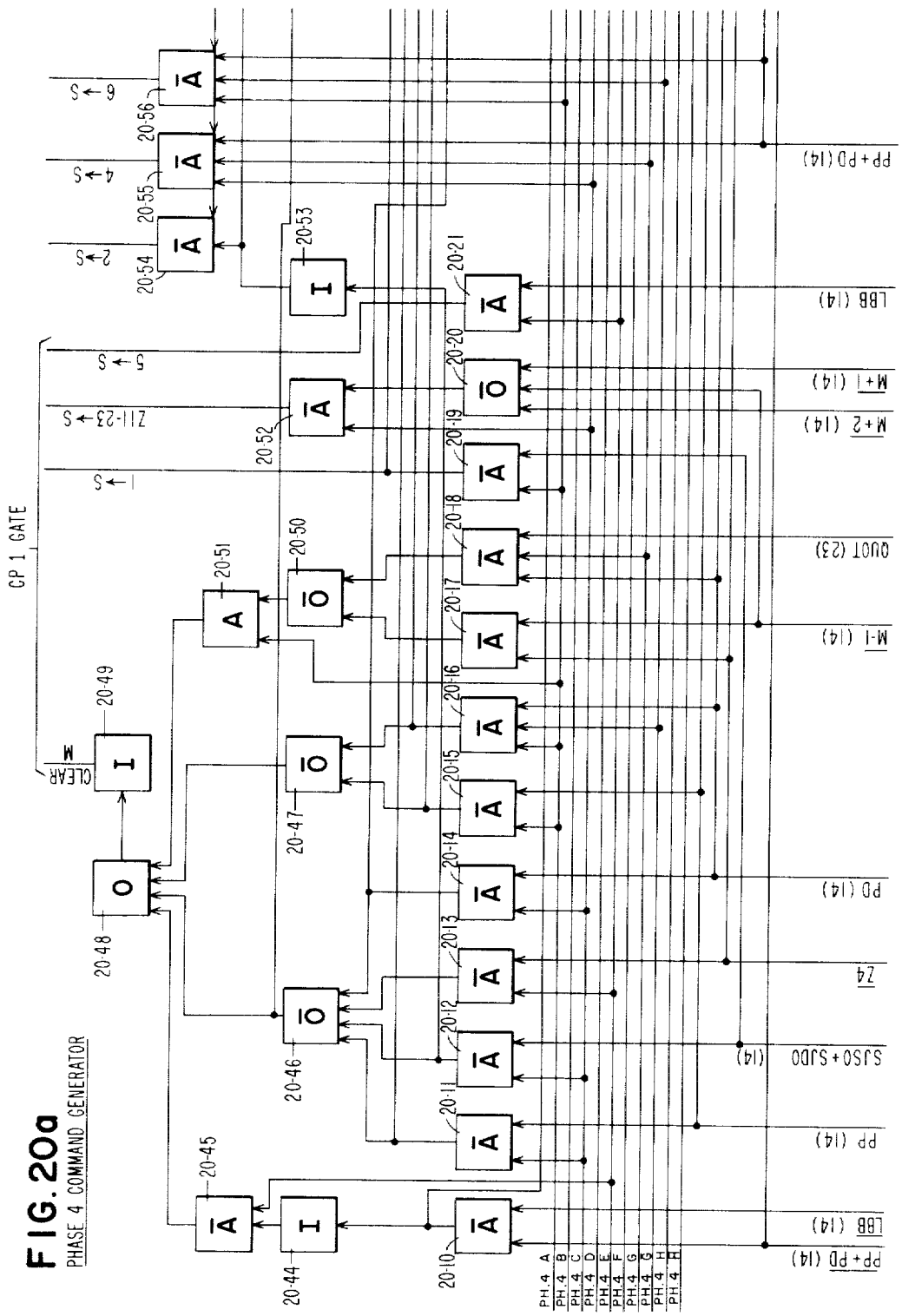

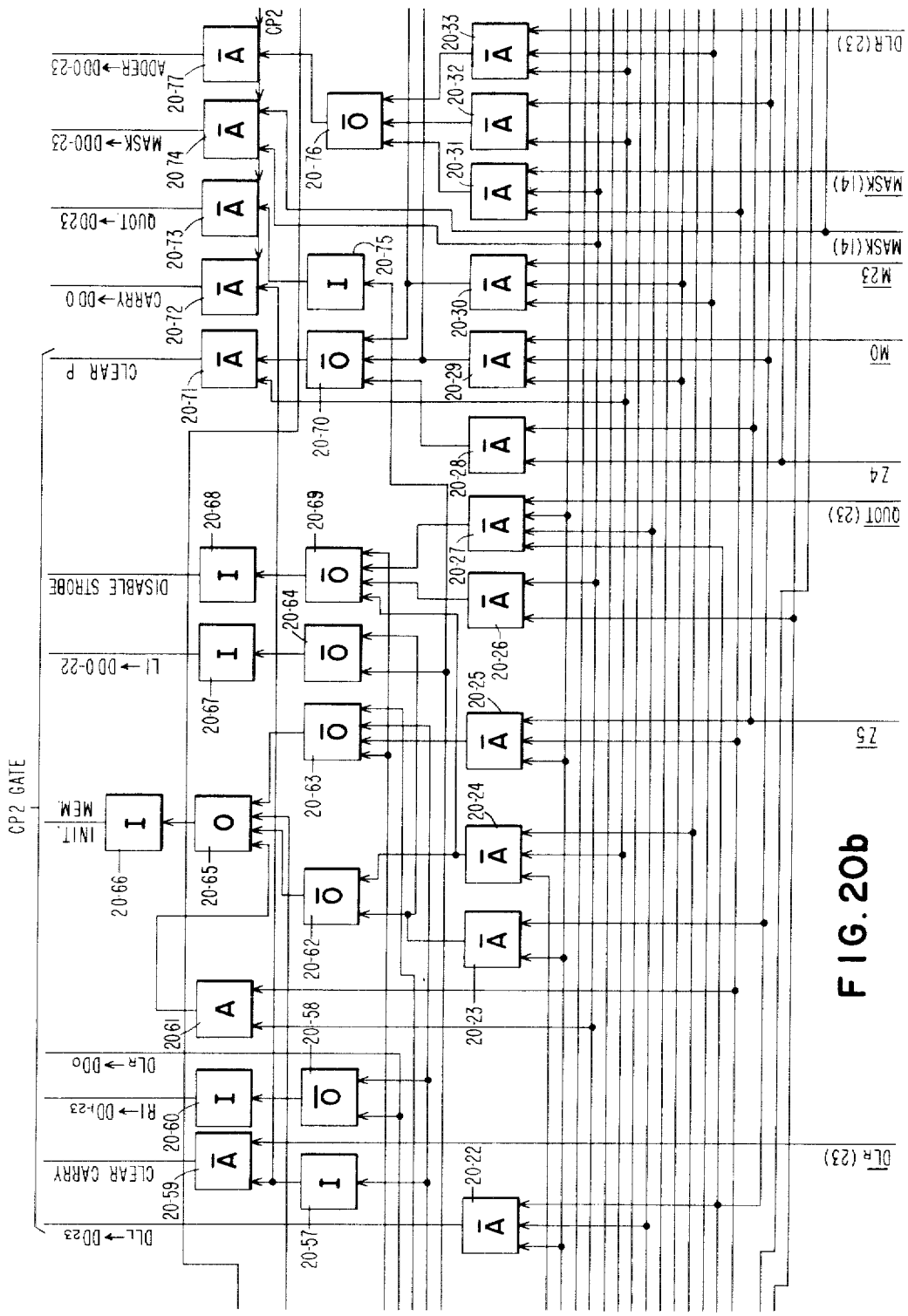

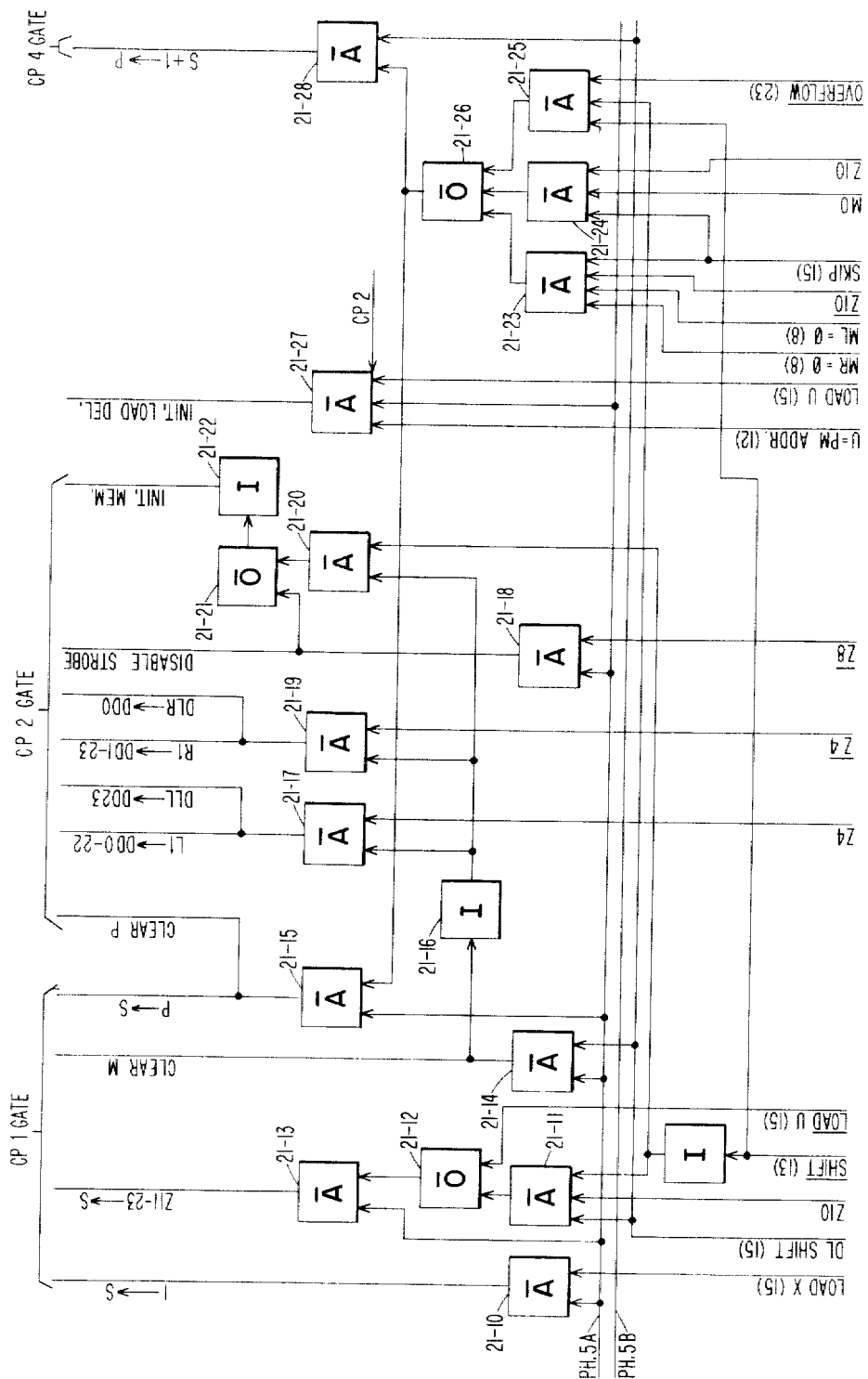
FIG. 21 PHASE 5 COMMAND GENERATOR

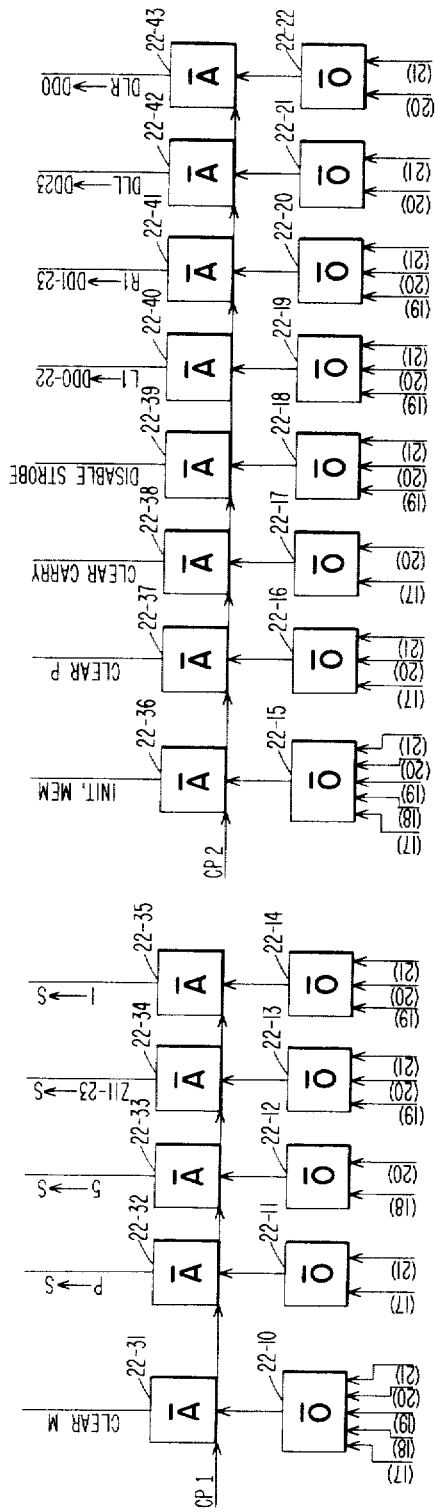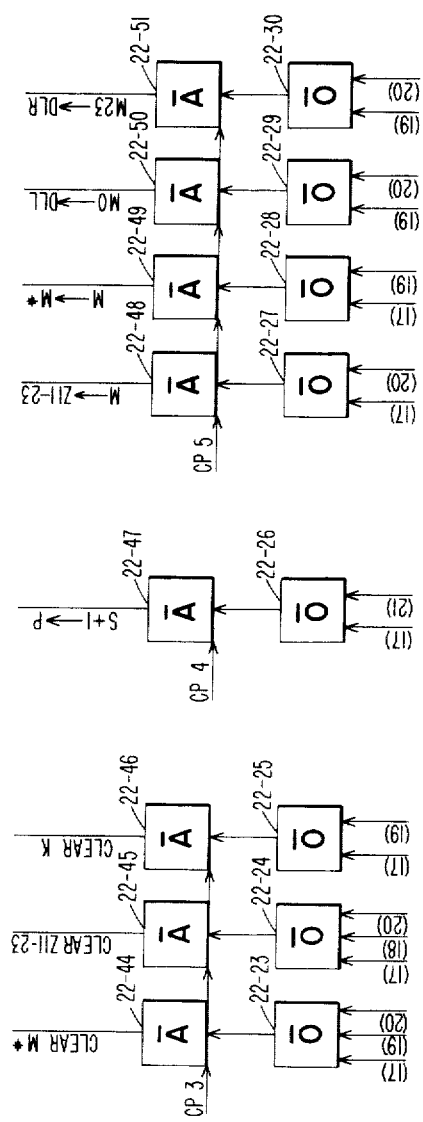
FIG. 22
COMMAND GENERATOR OR GATES

MEMORY AND ARITHMETIC CONTROLS

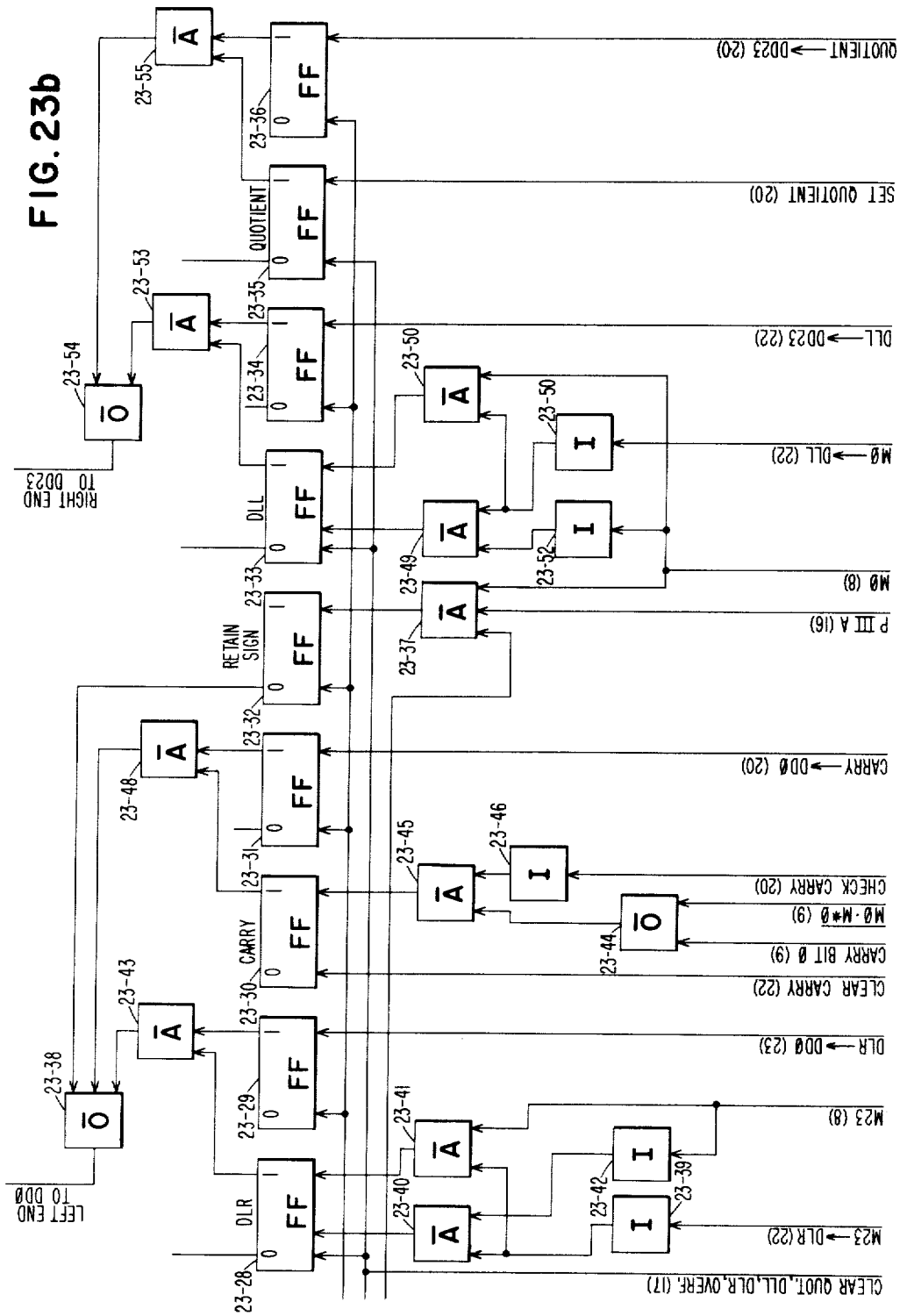

Feb. 8, 1966   R. P. BLIXT ETAL   3,234,523
PHASE CONTROLLED INSTRUCTION WORD FORMAT
Filed Jan. 2, 1962   30 Sheets-Sheet 28

United States Patent Office 3,234,523
Patented Feb. 8, 1966

---

3,234,523
PHASE CONTROLLED INSTRUCTION WORD FORMAT
Robert P. Blixt, Minneapolis, Albert Kaplan, St. Paul, James C. Nelson, Rosemount, and William Weigler, St. Paul, Minn., assignors to Sperry Rand Corporation, New York, N.Y., a corporation of Delaware
Filed Jan. 2, 1962, Ser. No. 163,785
23 Claims. (Cl. 340—172.5)

The present invention relates to the program execution means of a stored program data processing system, and more particularly to one which uses an instruction word whose command portion is divided into a plurality of fields each of which is scanned during a different time phase of the execution.

In a conventional single or multiple address digital computer of the prior art, the instruction word is usually divided into portions only one of which holds a single operation code or command, while the others hold addresses of operands. Many computers do utilize another portion of the instruction word for use in address modification, sometimes called indexing. However, the basic single-operation code concept still exists in that all of the bits in the command portion must be sensed and translated simultaneously as an integral unit in order to generate a complete set of sub-commands required for the execution of said instruction. In such a conventional computer, the number of different instructions possible is equal to $2^n$, where $n$ equals the number of bits present in the operation code portion.

In the present invention, the instruction word format has its command portion divided into a plurality of sub-units designated as fields, each of which is capable of containing a value which controls a single operation such as transfer, transfer with shift, add, subtract, etc. Although the operation specified by a field value may require the generation of a small number of related sub-commands, in essence it still falls into but one broad function class such as transfer, arithmetic operation, shift, or the like. This is in opposition to the above-described conventional method of constructing an instruction word wherein the single operation code portion must generate sub-commands which carry out a plurality of distinctly different functions. Hence, the novel instruction word format of the present invention permits a programmer to literally "build" an instruction word by choosing a value for each field, said field values being entirely independent of one another so that each field can be scanned at a different time. Furthermore, the present invention permits a reduction in the complexity of the decoders and command generators since fewer bits need be examined concurrently.

Therefore, one object of the present invention is to provide means individually responsive to each field of a divided instruction word format to generate command signals for executing the operation there specified.

Another object of the present invention is to provide means sampling said fields one at a time in succession.

The preferred instruction word format executed by the present invention contains four fields each sampled or scanned in succession by a novel timing means which generates a series of signals defining successive phase periods in the execution of the complete word. The first field is scanned during an early phase period to index the address portion, if required, of the instruction word. The second field is executed during a subsequent phase period during which is normally acquired an operand for use during a third phase period in which the third field is sampled to control an arithmetic operation. Lastly, the fourth field is scanned to transfer the results of said operation to a particular location. Since not all phases are required for the execution of each instruction word, e.g., indexing, arithmetic operation or the like, a novel feature of the invention permits the timing means to skip the generation of certain phase signals in order to proceed, without loss of time, directly to and sample only those fields which specify necessary operations. This timing means is therefore itself controlled by the information in the various fields.

Accordingly, another object of the present invention is to provide phase signal producing means controlled by field information in order to skip the generation of certain phase signals.

In line with the last mentioned object, the present invention provides that certain values in a field will cause the system to interpret values in another field in a different way than normal. This different interpretation may even require that said differently interpreted field value be utilized in some way, as a shift value or address, during the execution of the operation specified by said certain value. Under these conditions, the timing means is inhibited from generating the customary phase signals used for sampling said another field.

Therefore, a further object of the invention is to provide means to skip the generation of certain phase signals for those fields whose values are interpreted in a manner dictated by values in other fields.

Another novel provision of the present invention lies in means for causing the phase signal generating means to recycle through various ones of its phases when executing certain instructions. For example, if a single instruction word calls for a shift of several places, the control circuits are enabled to continuously repeat only the phase or phases in which shifting operations occur. Furthermore, when developing partial products or partial quotients, a phase can be repeated with slight modifications.

Figure 6A:
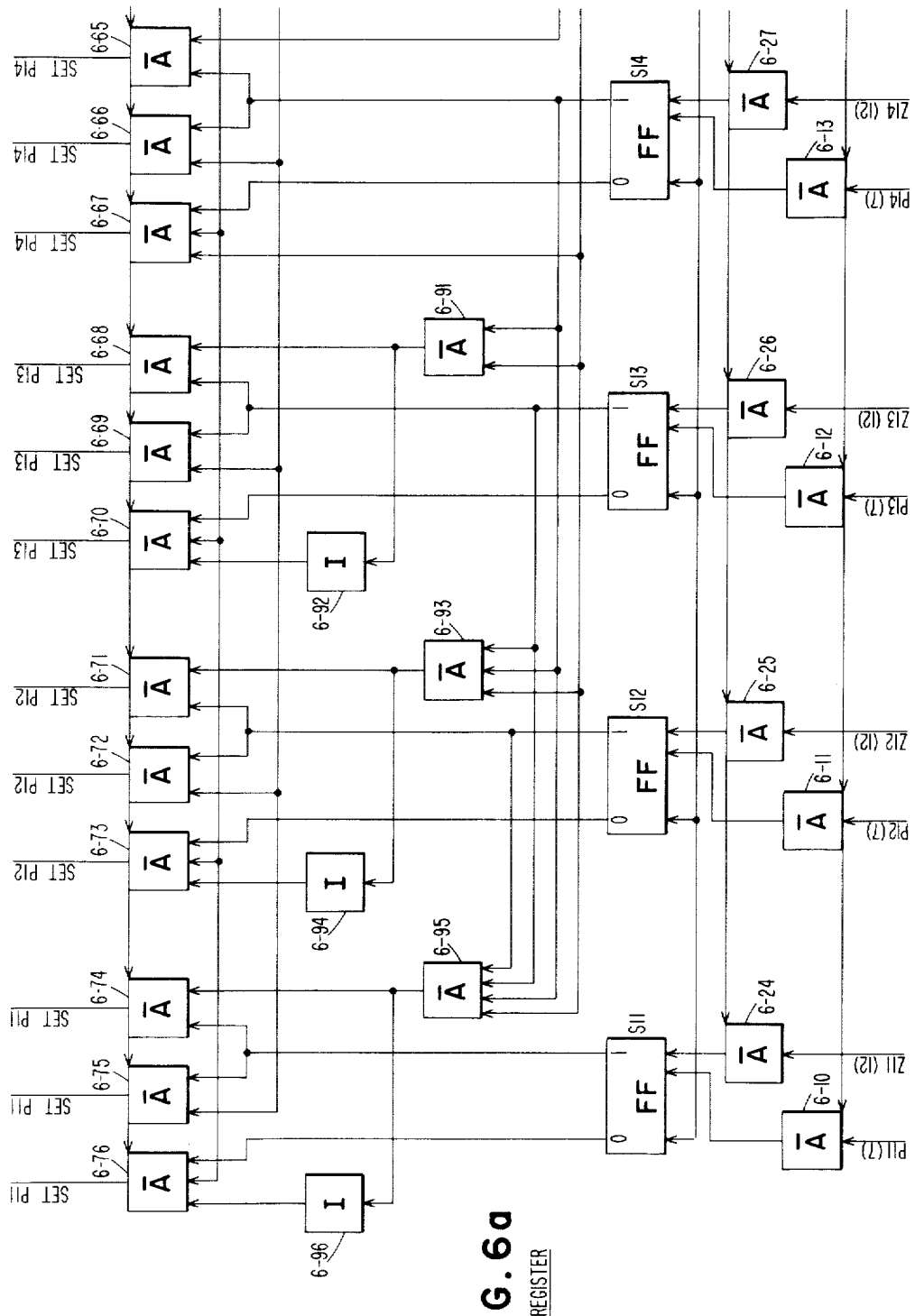
Figure 6B:
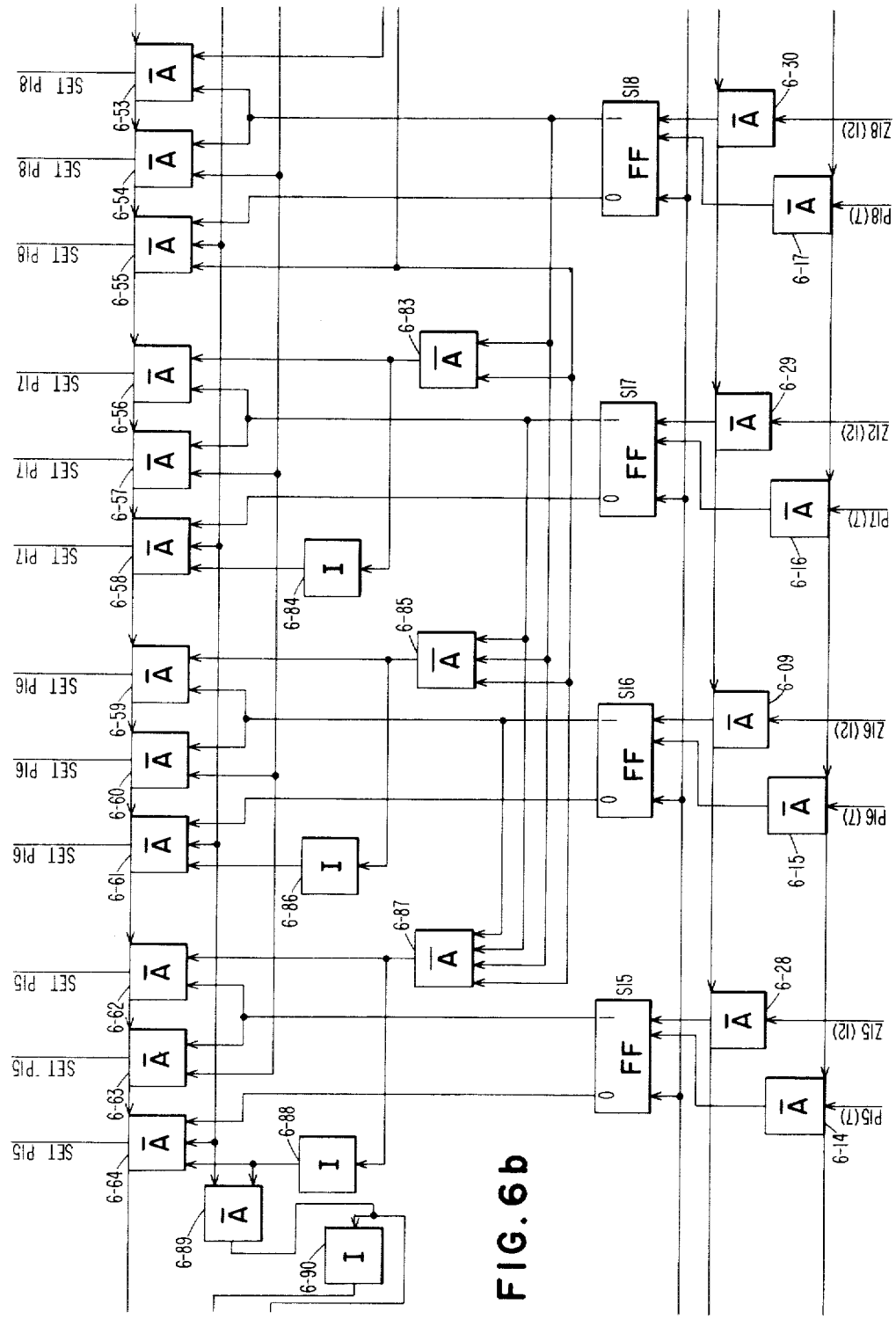
Figure 6C:
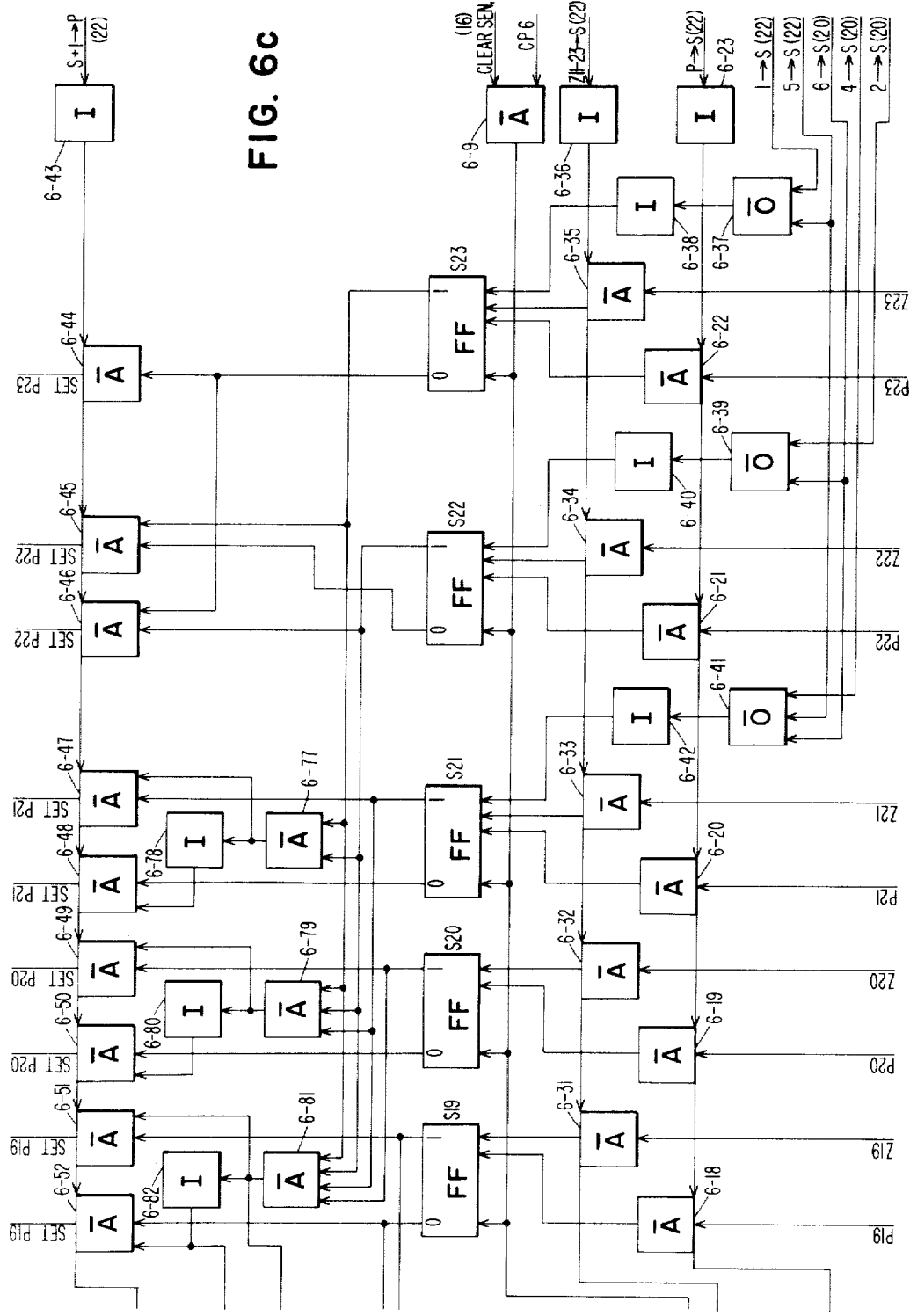
Figure 8A:
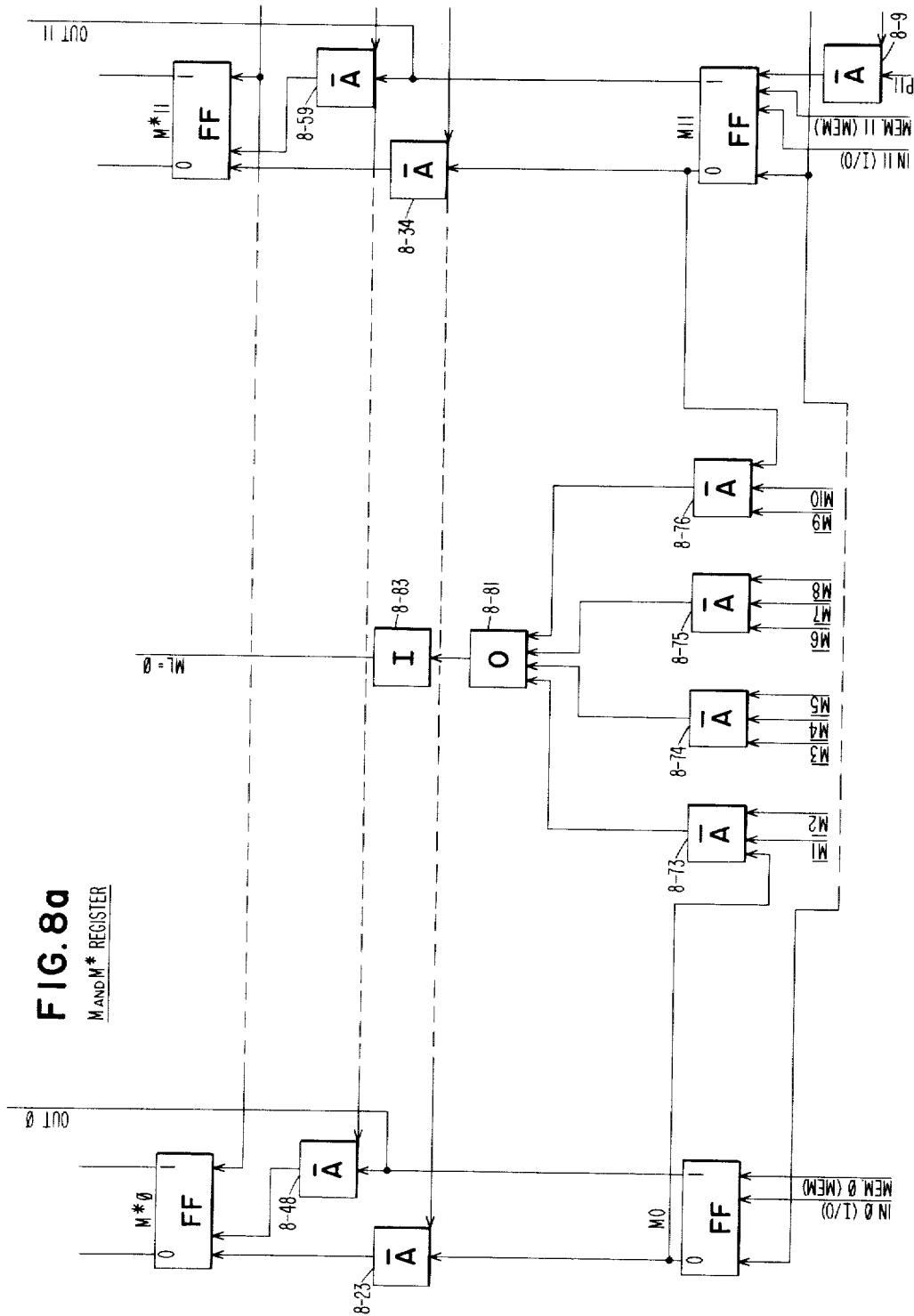
Figure 9:
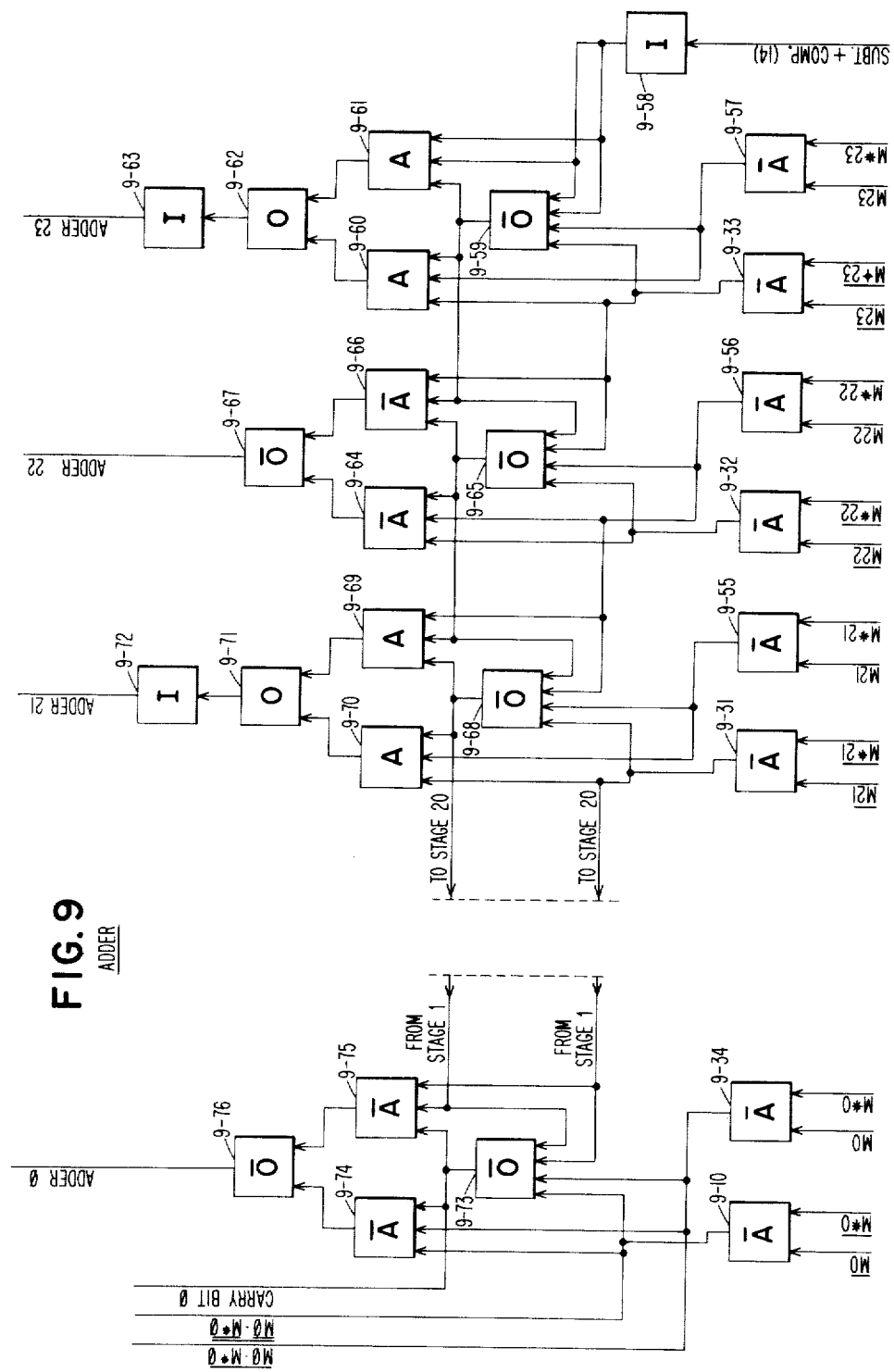
Figure 10A:
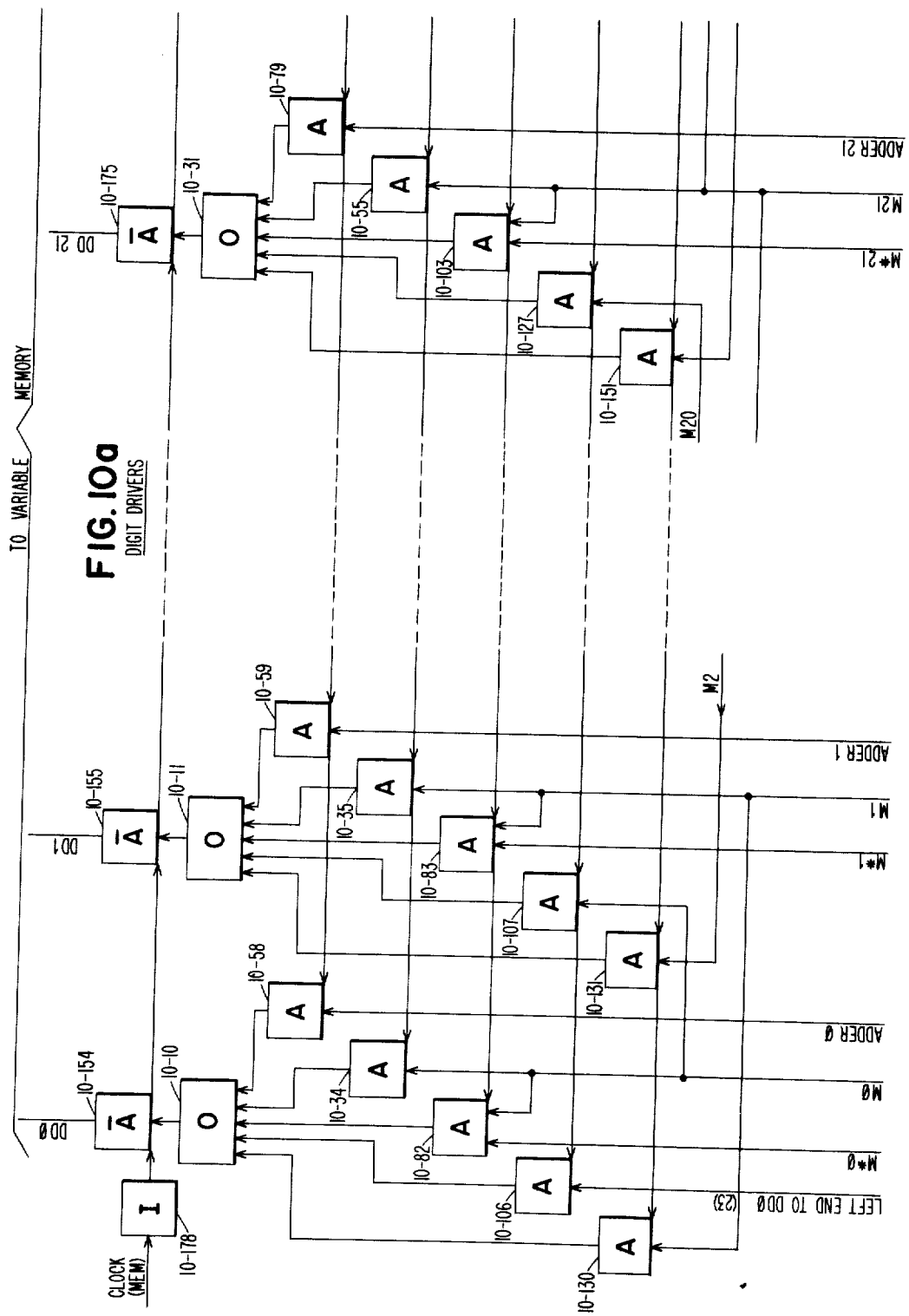
Figure 10B:
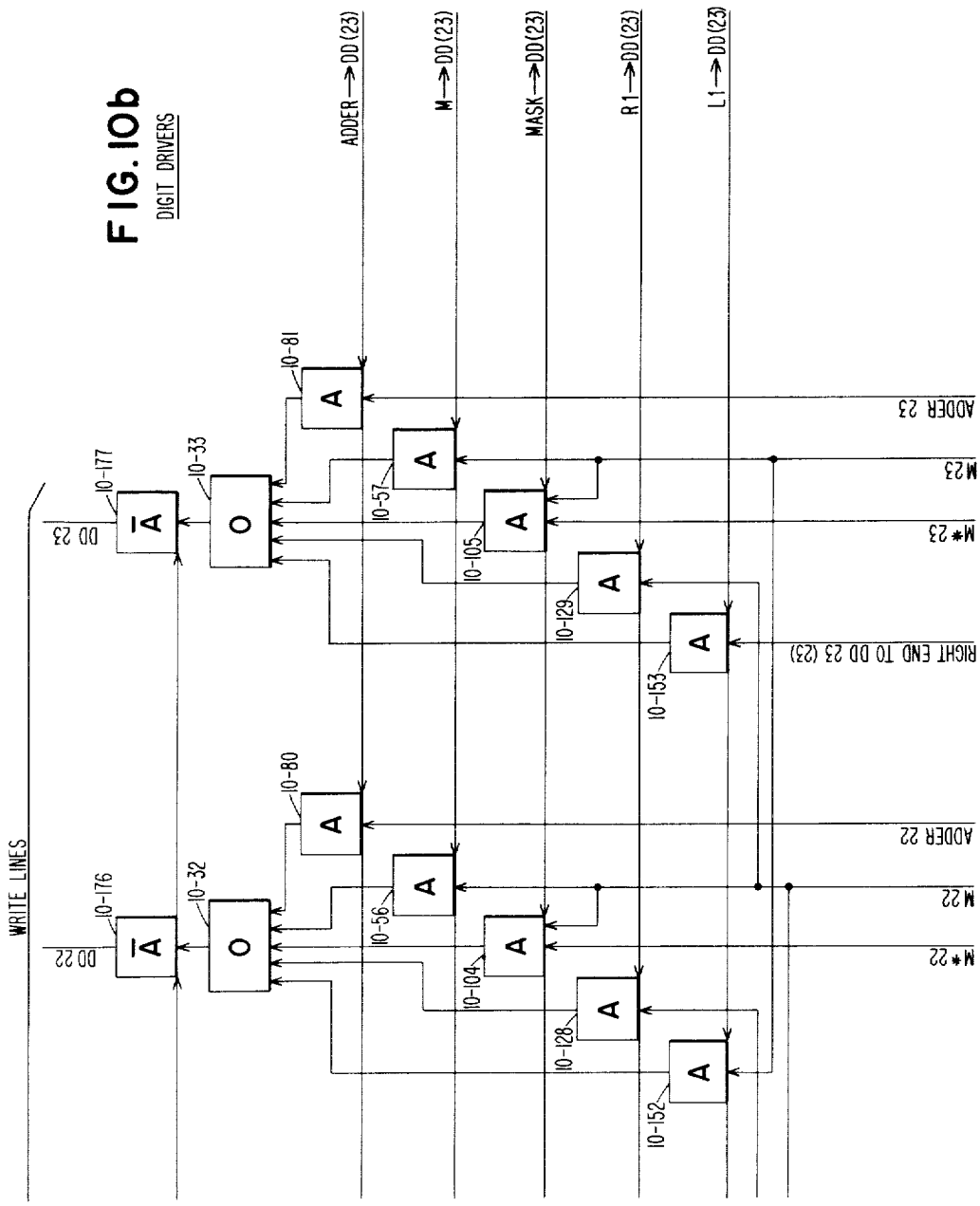
Figure 11:
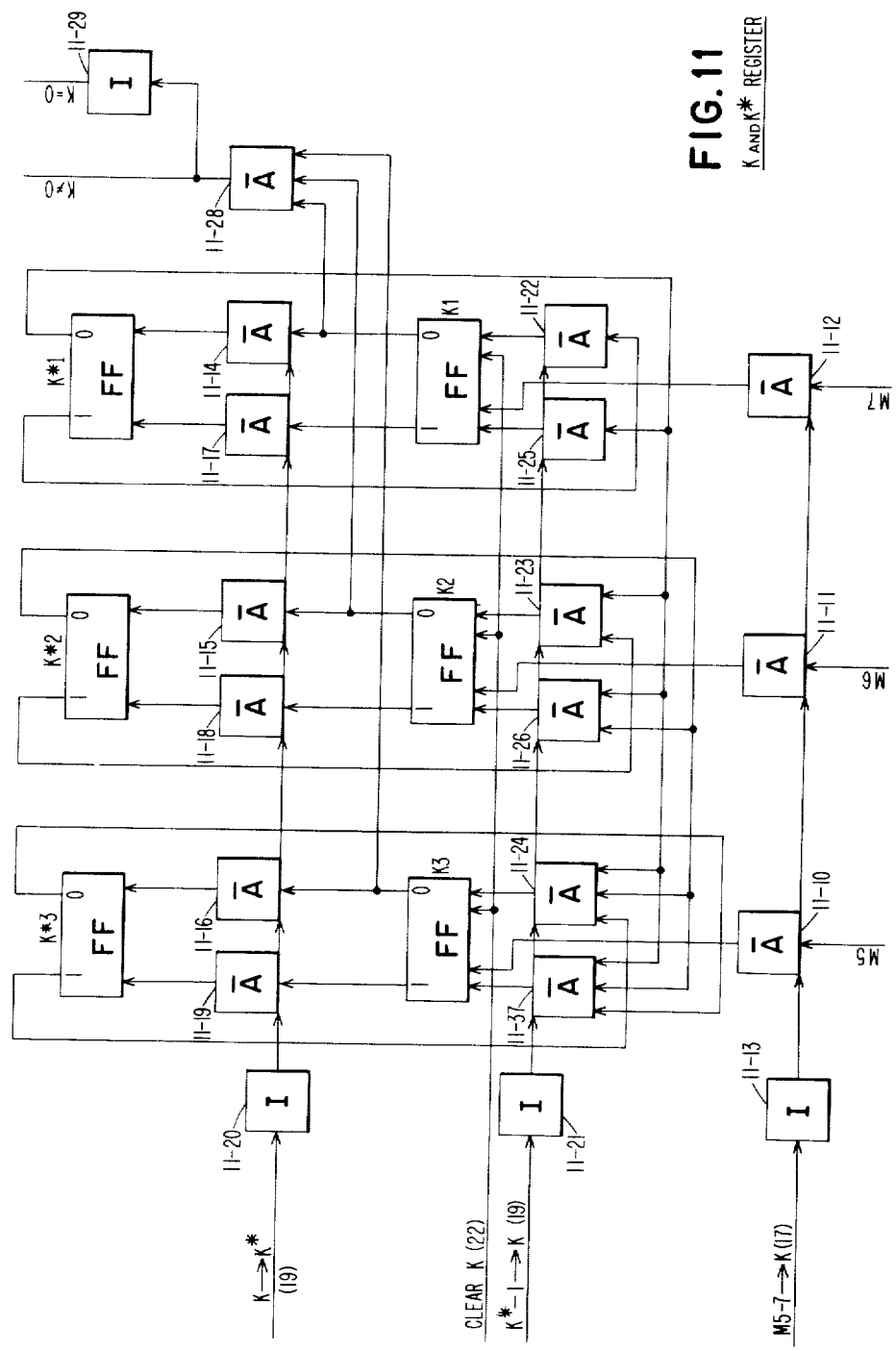
Figure 12:
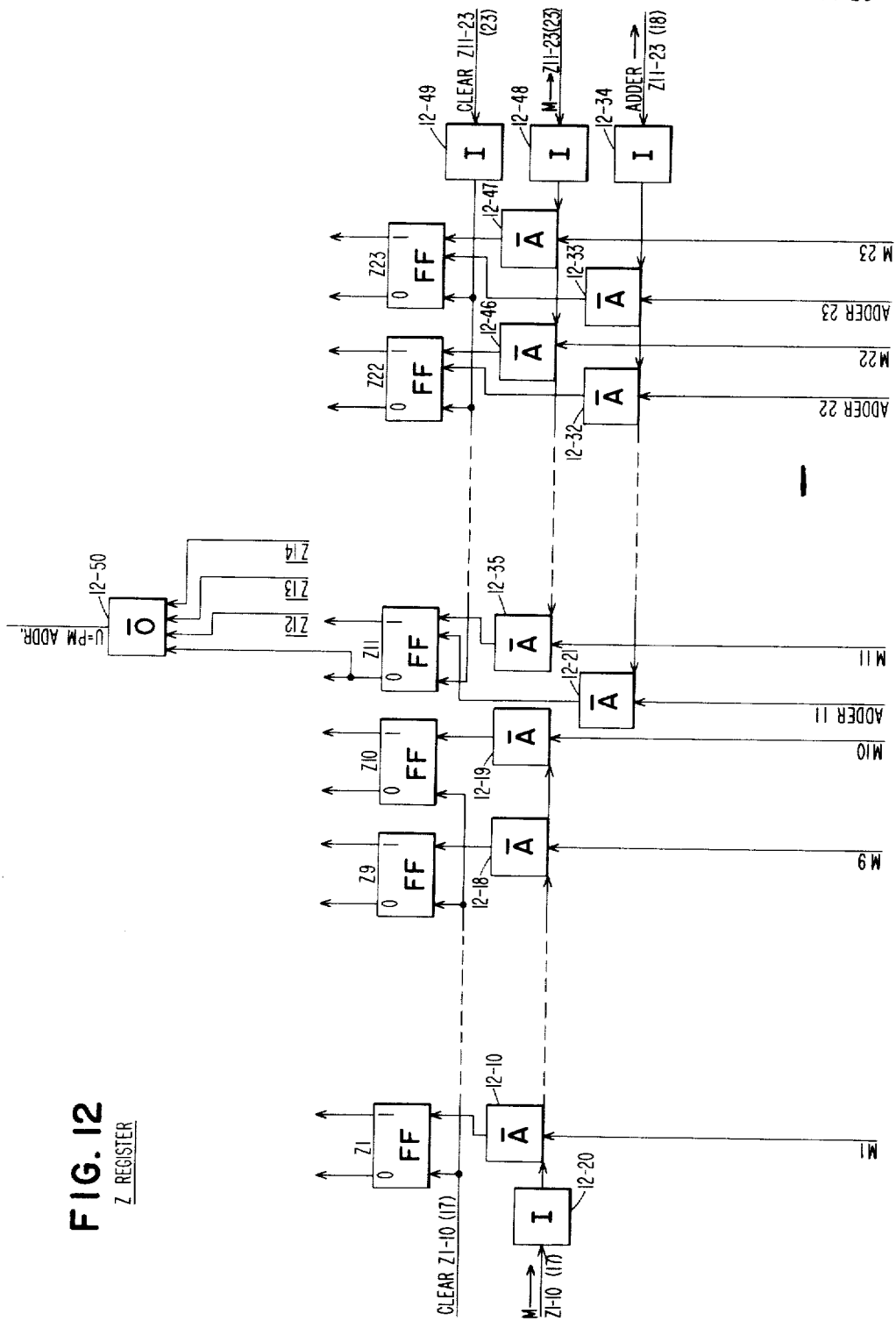
Figure 16A:
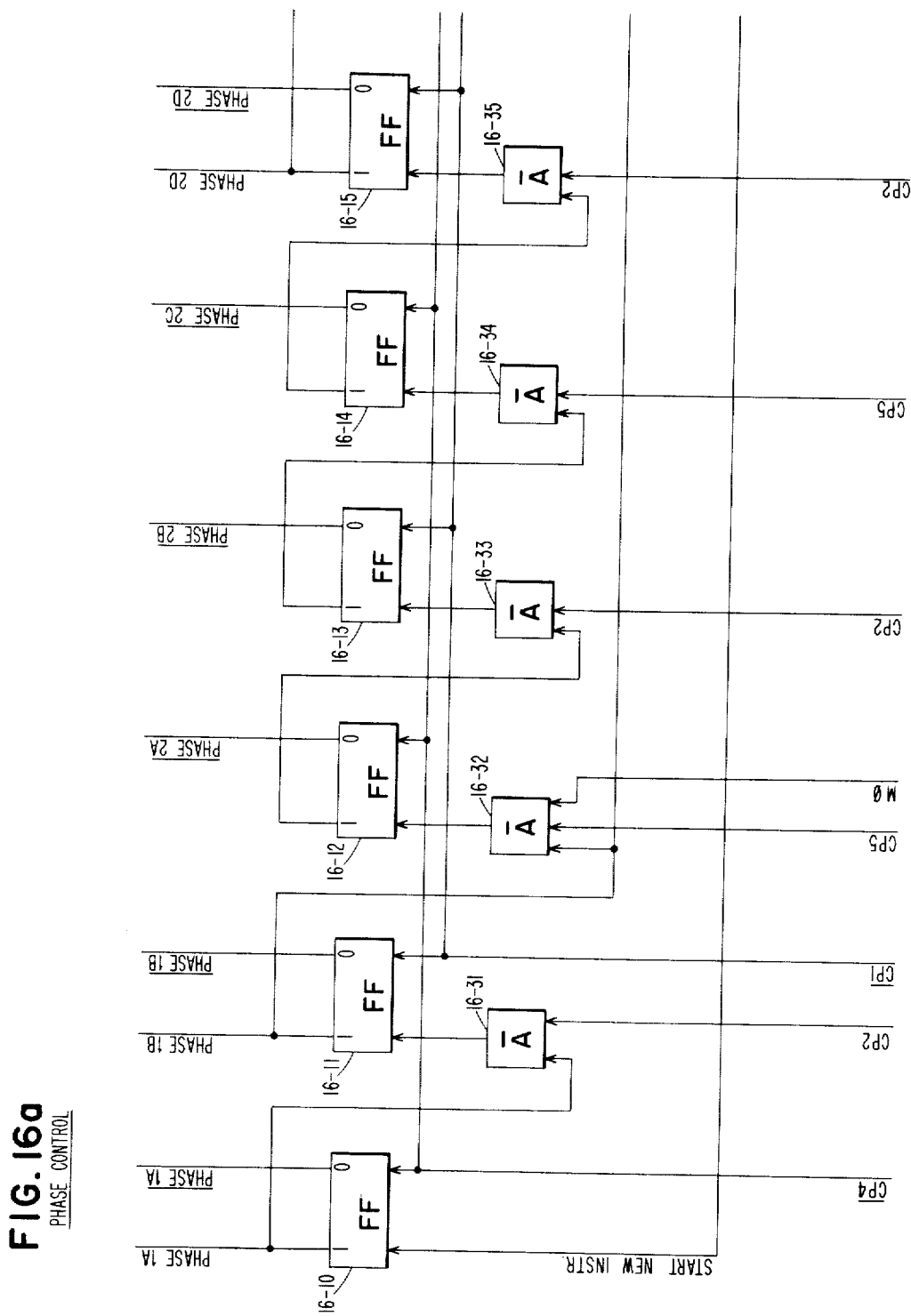
Figure 16C:
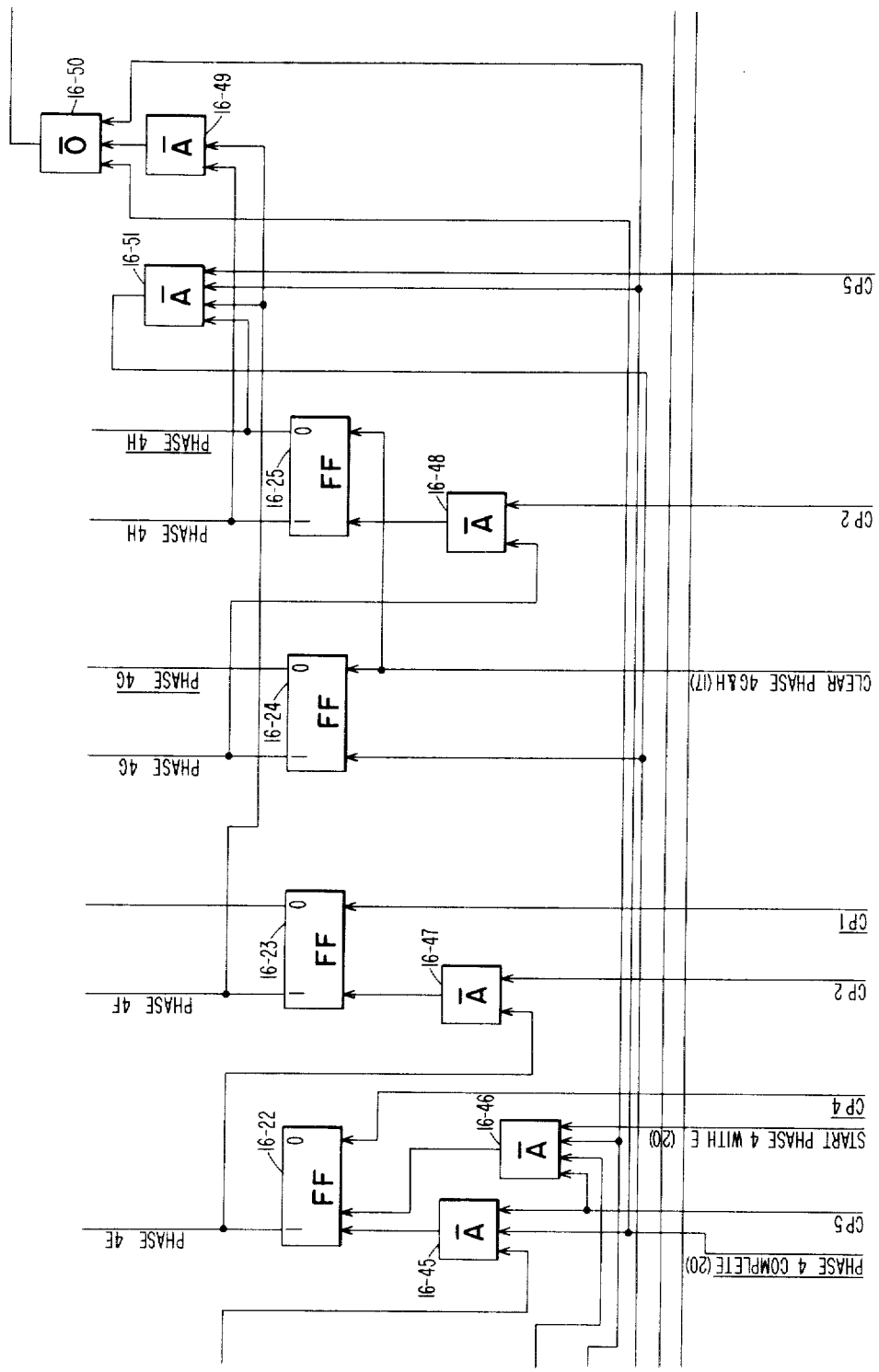
Figure 16D:
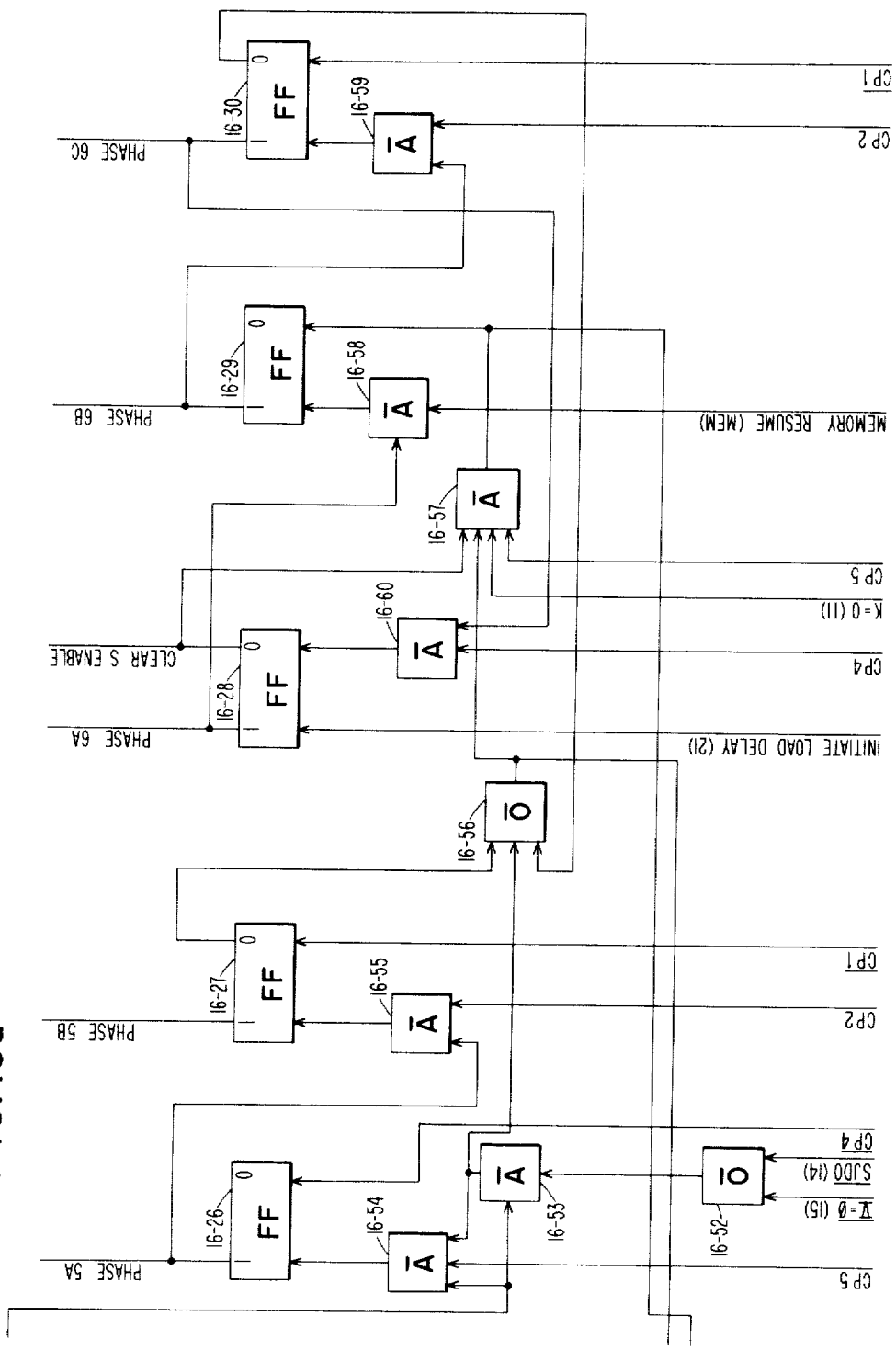
Figure 19:
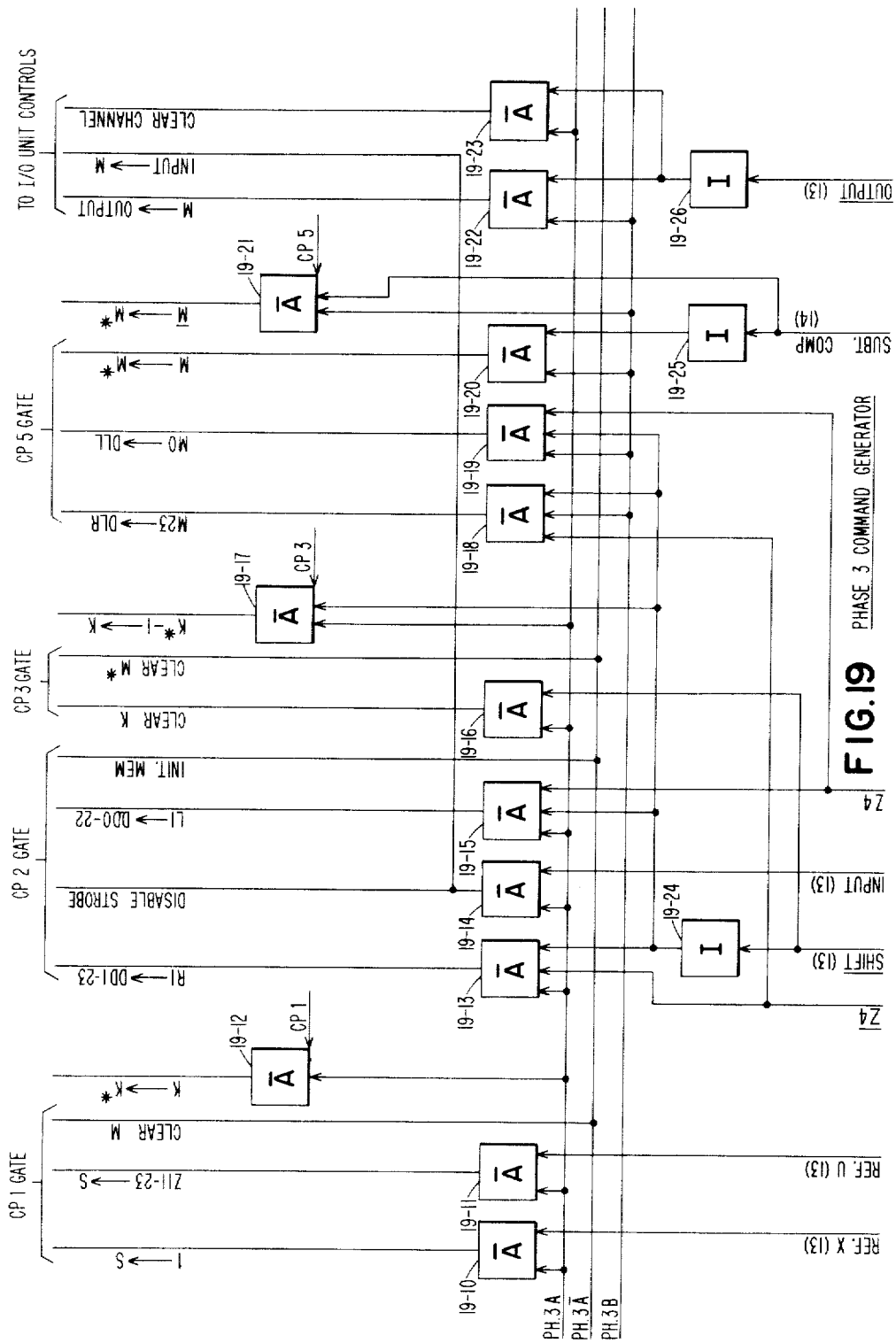
Figure 20C:
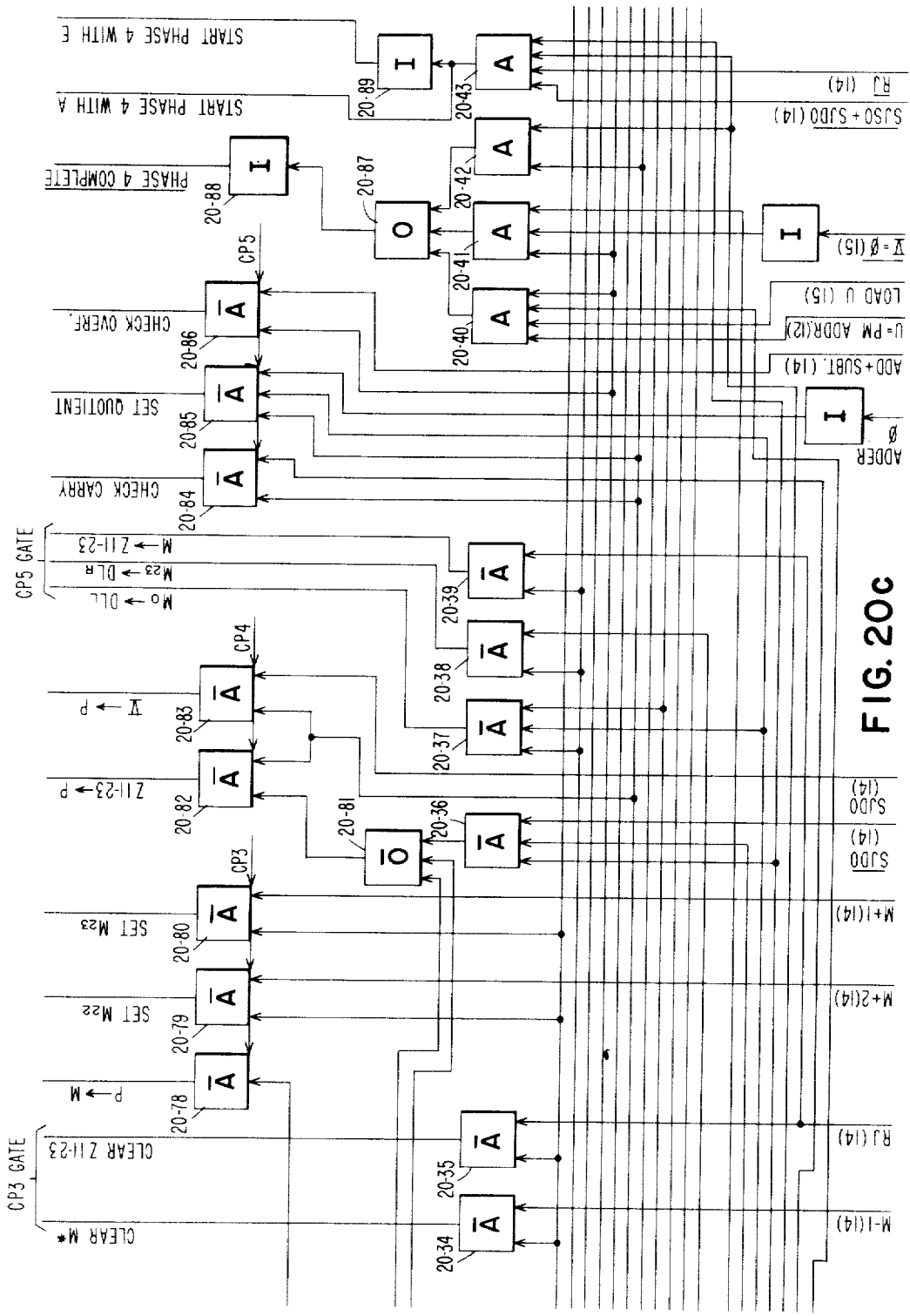
Figure 23A:
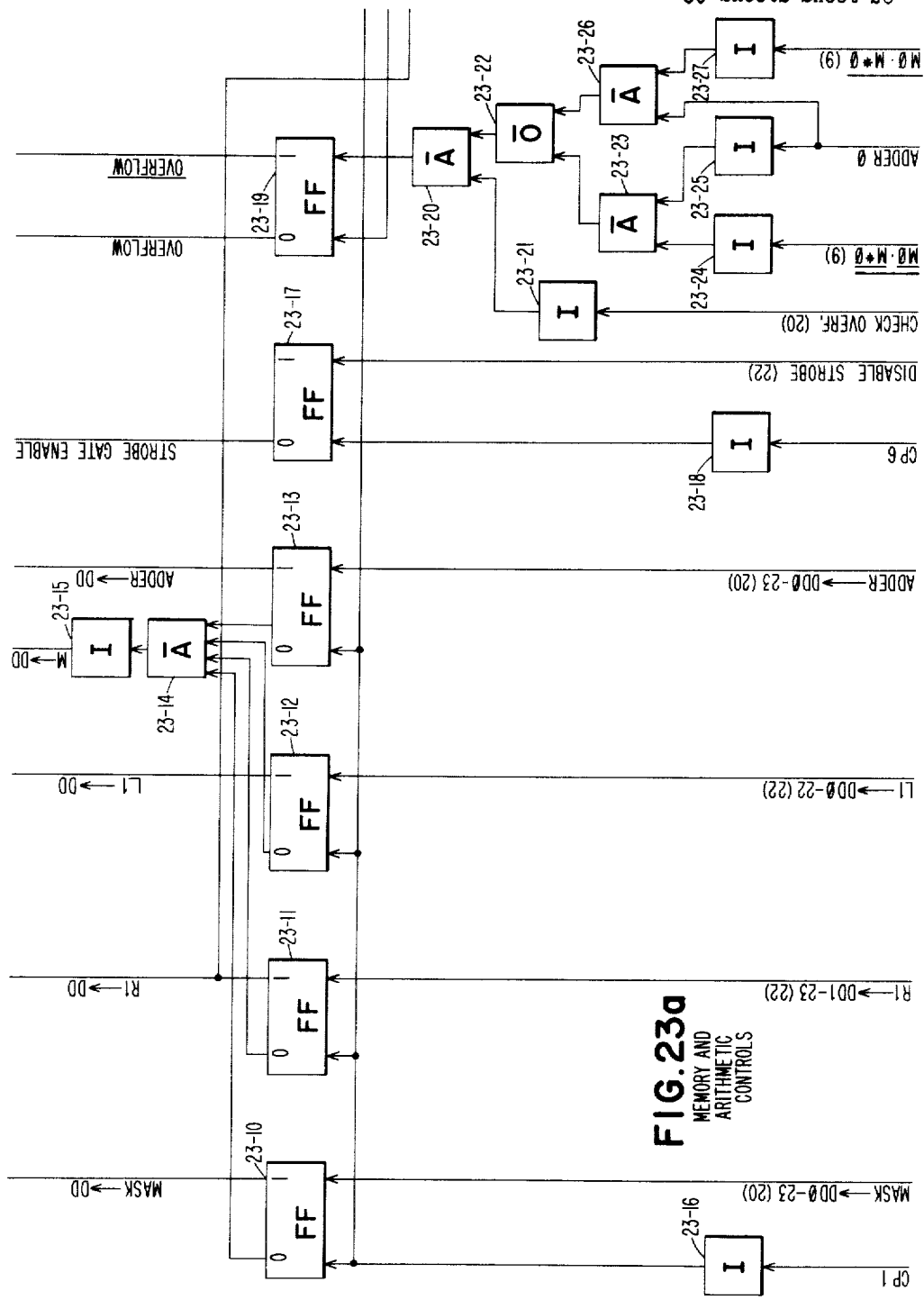

These and other objects of the present invention will become apparent during the course of the following description, which is to be read in conjunction with the drawings, in which:

FIGURE 1 is an overall block diagram of the preferred system in which the present invention finds particular use;
FIGURES 2a, 2b, 2c and 2d show details of basic logic circuits;
FIGURES 3a and 3b show details of basic logic circuits;
FIGURES 4a and 4b show details of basic logic circuits;
FIGURES 5a and 5b show details of basic logic circuits;
FIGURES 6a, 6b and 6c show the S register;
FIGURE 7 shows the P register;
FIGURES 8a and 8b show the M and M* registers;
FIGURE 9 shows the Adder;
FIGURES 10a and 10b show the digit drivers;
FIGURE 11 shows the K and K* registers;
FIGURE 12 shows the Z register;
FIGURES 13 through 15 show the Z register decoders;
FIGURES 16a, 16b, 16c and 16d show the phase control circuits;
FIGURE 17 shows phase 1 command generator circuits;
FIGURE 18 shows phase 2 command generator circuits;
FIGURE 19 shows phase 3 command generator circuits;
FIGURES 20a, 20b and 20c show phase 4 command generator circuits;
FIGURE 21 shows phase 5 command generator circuits;
FIGURE 22 shows command generator OR gates;
FIGURES 23a and 23b show certain arithmetic and memory control circuits, and FIGURES 24, 25, 26, 27, 28 and 29 are timing diagrams illustrating the execution of some typical instruction words.

INDEX

| Sec. | Title | Column |
|---|---|---|
| 1 | General Description: | |
| | 1.1 Memory | 3 |
| | 1.2 Arithmetic | 4 |
| | 1.3 Input-Output | 4 |
| | 1.4 Control | 4 |
| 2 | Detailed Figure Description: | |
| | 2.1 Basic Circuits | 9 |
| | 2.2 Memory Addressing | 12 |
| | 2.3 Arithmetic | 15 |
| | 2.4 Control Registers | 19 |
| | 2.5 Control Circuits | 20 |
| 3 | Operation: | |
| | 3.1 Arithmetic | 33 |
| | 3.2 Jump | 43 |
| | 3.3 Shift | 46 |

(1) GENERAL DESCRIPTION

FIGURE 1 shows a block diagram of the system which incorporates the present invention. The computer operates in the parallel mode and employs 24-binary bit data and instruction words. The various components may be broadly grouped into the memory, arithmetic, input-output and control sections. Each of these will now be briefly discussed in connection with FIGURE 1, with a detailed discussion being given in subsequent paragraphs of the more important circuits used in the present invention. Data transmission paths are shown by bold face lines, with the digit(s) enclosed by a circle specifying the number of bits transferred.

1.1 Memory

Two storage memories are provided which are designated Permanent and Variable. These memories time-share the sense amplifiers, strobe gates, the address registers P and S, the address decoder, and the drivers. That is to say, only one memory operates at any one time. The Permanent memory is preferably a nondestructive, high-speed, random-access device constructed of any one of a number of well known materials such as magnetic cores or thin films. It is used to store fixed constants and instructions. The Variable memory is preferably a destructive, high-speed, random-access unit made of similar magnetic material and which is used to store variable constants and working data. Both are word organized in that the common sense lines pass through the same bit of each word in all word locations. Therefore, specifying an address enables the selection and read-out of a complete 24-bit word from memory.

The Variable memory word locations are assigned octal addresses 00000 through 00777, and the Permanent memory word locations are assigned octal addresses 01000 through 17777. Octal notation is well known in the art and is merely a number system of radix 8. Therefore, the total number of digits per order is 8 and may be uniquely identified by the decimal digits 0 through 7. The present system encodes each octal digit in binary fashion such that 000=0, 001=1, 010=2, 011=3, and so on to 111=7. Therefore, the thirteen binary bit memory address can be divided into four right hand groups of 3 bits each, and one left hand bit in the highest octal order, so as to fall in the range of 00000 to 17777 expressed in octal fashion.

Since the Variable memory of the present system has a destructive readout feature, an information restore operation automatically follows the read operation whenever this memory is addressed. In this way, information is retained in a referenced Variable memory location until such a time when new information is to be entered therein. Such read-restore memories are well known in the computer art and thus no attempt is made here to disclose their details. The same is true for the Permanent memory.

1.2 Arithmetic

The arithmetic section is responsible for the performance of computation and logical functions specified by program instructions. The principal parts are the X and A registers, a 24-bit adder and the M and M* registers. A unique feature of the X and A registers is the fact that they are not the usual flip-flop registers, but are Variable memory storage locations. The A register is located in octal address 00000 and the X register in octal address 00001. Other special registers used for storing, product, and quotient bits are also Variable memory locations. Two's complement, fractional arithmetic is performed on the operands, with double length products and shifts. The format of an operand (or data word) is given below, with the digits above the line identifying the bit positions and the digits below the line indicating the decimal value of a "1" bit in each said position:

$$\begin{array}{ccccc} 0 & 1 & 2 & 3 & 4\,-\,-\,23 \\ \hline -1 & \tfrac{1}{2} & \tfrac{1}{4} & \tfrac{1}{8} & \tfrac{1}{16} \quad \tfrac{1}{2^{23}} \end{array}$$

In the above, the binary point is considered to be between the 0 and 1 positions. Hence, when the 0 or sign position contains a binary "0" bit, the number is positive and of value $0 \leq x < +1$. When the sign bit in the 0 position is "1," the number is negative and of value $-1 \leq x < 0$. Therefore, the range of values within which a valid number lies is $-1 \leq x < +1$. Any arithmetic operation which results in an answer of value equal to or greater than +1, or less than −1, cannot be indicated by this fractional notation and thus requires an error indication and/or correction.

An addition is performed by the following process: During Phase 3 of the instruction execution an operand is obtained from memory and placed in the M register. The contents of M are then transferred to the M* register. During Phase 4 of the instruction, the M register is cleared and the contents of A are transferred to M. The output of the adder always contains the sum of M and M*. This sum is then restored in the A register through the pre-drivers. Subtraction is a similar process with the following exception. The contents of $\overline{M}$ (the 1's complement of M) is transmitted to M* during Phase 3, and a carry of value 1 is generated into the rightmost stage of the adder during Phase 4.

1.3 Input-Output

The present system organization permits up to sixteen 24-bit channels for conveying information between the computer and the peripheral equipment. All such exchanges employ the M register as a buffer. Priority circuits may be included for determining which input-output units are to be given immediate attention if the computer is operated in a real-time mode. Since any well known input-output units and their controls may be utilized in conjunction with the present invention, details of same are not given in the present application.

1.4 Control

The control section of the computer is the heart of the present invention and is comprised of those circuits which direct the execution of instruction words. They are the clock pulse distributor, phase control, phase command generators, Z register, K and K* registers, S register, and P register. The clock pulse distributor in any well known fashion generates a continuous train of pulses which is divided into machine cycles each having six clock pulses designated as CP1 through CP6. There is no dead time between adjacent ones of these pulses. The phase control determines which part of the instruction word is to be scanned and executed at any particular time, while the phase command generators operate to produce sub-command signals for each particular phase of instruction execution. The Z register stores the instruction word while it is being executed. The K and K* registers are used during shift operations to store a value specifying the number of shifts. The S register holds the address of a memory location to be referenced and tells the memory circuits where a word is to be written or read, while the P register acts in conjunction with the S register to provide the sequence of instruction word addresses necessary to carry out the program.

The format of the instruction word has the following structure, where the digits above the line represent bit positions (a hyphen indicates "inclusiveness") and the indicia below the line signifies how the format is divided into various fields each having a specific control purpose.

| 0 | 1–3 | 4–7 | 8–10 | 11–23 |
|---|---|---|---|---|
| II Address Modification | III Operand Access | IV Function | V Transfer | U Address |

In the above, fields II, III, IV and V, respectively, control the successive phases 2, 3, 4, and 5 of the instruction word execution. The U Address field of the word contains a 13-bit address which can refer to any location in the memories, said location hereinafter being referred to generically as the U register.

The execution of an instruction consists of processing some or all of the following six phases.

PHASE 1: INSTRUCTION ADDRESS AND ADVANCE PROGRAM ADDRESS

Each new instruction begins with Phase 1. During this period, the contents of the program address register P are transferred to the storage address register S; the instruction at address S is referenced and placed in the memory data register M; and the contents of M are then transferred to the instruction register Z and the M* register. The program address is also advanced during this phase by transferring the contents of $S+1$ back to P.

PHASE 2: ADDRESS MODIFICATION

The Programmer has a choice of skipping or performing Phase 2. If Field II=0, Phase 2 will be skipped, and control will go directly from Phase 1 to Phase 3 without loss of time. If Field II=1, Phase 2 address modification will be performed. Before entering Phase 2 from Phase 1, the right-hand portion of the Z, M and M* registers contains the U address portion of the instruction word. The address modification is at octal address $\Delta U$=00005 in the Variable memory. During the first part of Phase 2, $\Delta U$ is referenced and the contents of $\Delta U$ placed into M and restored to $\Delta U$. During the remaining time of Phase 2, the contents of M and M* are added in the 24-bit adder, and the right-hand 13 bits are placed into the U portion of the Z register, thus causing the address modification $U+(\Delta U)$. If Phase 2 is skipped, the remaining portion of the instruction execution uses the U address specified in the instruction word. If Phase 2 is performed, the remaining portion of the instruction execution uses the modified U address.

PHASE 3: OPERAND ACCESS

During this phase of the instruction execution an operand is accessed and placed into the M register. Bits 1 through 3 (Field III) of the instruction word specifies one of eight different operations which can be performed in Phase 3. These operations are listed in Table 1 below: In addition to specifying an operation, the codes in Field III specify how Field IV is to be interpreted. The ( ) around the name of a register is a shorthand way of indicating its contents.

TABLE 1.—PHASE 3—OPERAND ACCESS

| Z1–3 | Octal | Operation |
|---|---|---|
| 000 | 0 | (A) To M, (M) To M*, (M) To A |
| 001 | 1 | (A) To M, (M) To M*, (M) To A Shifted |
| 010 | 2 | (U) To M, (M) To M*, (M) To U |
| 011 | 3 | (U) To M, (M) To M*, (M) To U Shifted |
| 100 | 4 | (X) To M, (M) To M*, (M) To X |
| 101 | 5 | (X) To M, (M) To M*, (M) To X Shifted |
| 110 | 6 | (U) To M, (M) To M*, (M) To U, (M) To Output |
| 111 | 7 | Input to M, (M) To M*, (M) To U |

NOTE 1.—Transmit (M) To M* if Field IV=Sub., Comp., or Divide.
NOTE 2.—For octal codes 1, 3, and 5, interpret Field IV as shift count.
NOTE 3.—For octal codes 6 and 7, interpret Field IV as channel select.

In Table 1 above, the digits in the second column from the left represent the octal equivalents of the binary bits found in positions 1, 2, and 3 of the instruction word and which are shown, in this order, in the first column from the left. As an example, for octal code 0, the binary bits are 000 and the operation during Phase 2 is to reference Variable memory at octal address 00000 to transfer the contents of the A register into M register and thence from M to M* register. Since readout from the Variable memory destroys the contents in a location, an automatic restore operation immediately follows the read operation to thereby transfer (M) back to A. However, any transfer from locations in the Permanent memory, S or from any of the flip-flop registers M, M*, P, S, K, K*, or Z does not destroy information. Therefore, at the completion of Phase 3, both M and M* registers contain the contents of A register.

For octal code 2, the memory is referenced at the address in positions 11–23 of the instruction word (held by Z register stages 11 through 23) in order to place information into M and M* registers. If this U register is in Variable memory, then a restore operation occurs.

For octal codes 6 and 7, transfer is made between the M register and the external input-output equipment. As an example, for Code 6 the memory is referenced with the U address portion of the instruction word and reads a word into M register which is then read from M to one of the external units selected by the value in Field IV. U register is restored with this word if necessary. For Code 7, an external unit selected by Field IV transfers a word into M register and from there into a memory U register whose address is designated by bits 11–23 of the instruction word.

Codes 1, 3, and 5 are similar to codes 0, 2, and 4 except that the restore cycle causes the M register content to be transferred back into its original memory location with a shift of one place either left or right. For these codes, the Field IV code determines the direction and total number of shifts required during Phase 3 before execution of the instruction word is complete.

PHASE 4: FUNCTION

Bits $Z_4$ through $Z_7$ (Field IV) of the instruction word may be interpreted in one of three ways, depending upon the Field III code used in Field III. Unless Phase 3 specifies otherwise, Phase 4 is performed as the Function phase, and bits $Z_4$ through $Z_7$ specify one of 15 different functions which can be performed during this phase. The code 0000 (i.e., the absence of any said Phase 4 function value) in bits $Z_4$ through $Z_7$ specifies that Phase 4 is to be skipped, and control will go directly to the next programmed phase without loss of time. These functions are listed in Table 2 under Phase 4. The Phase 3 code may, however, specify that Field IV is not to be interpreted for use during an independent Function phase. This is the case for octal codes 1, 3, 5, 6 and 7 in Field III. The four bits, $Z_4$ through $Z_7$, are then interpreted either as an input/output channel select during Phase 3 for Field III codes 6 and 7, or as the shift control during Phase 3 for Field III codes 1, 3, and 5, and Phase 4 consequently is skipped without loss of time. The interpretation of $Z_4$ through $Z_7$ as an input/output channel or as shift control is shown in Table 3.

through $Z_{10}$ instead specify one of eight starting addresses for the subroutine, and Phase 5 is skipped without loss of time.

TABLE 2.—PHASE 4–FUNCTION

| Z4–7 | Octal | Name | Operation |
|---|---|---|---|
| 0000 | 00 | Skip Phase | |
| 0001 | 01 | Addition | (A) To M, (M)+(M*) To A, (A) To M |
| 0010 | 02 | Subtraction | (A) To M, (M)+(M*)+Carry To A, (A) To M |
| 0011 | 03 | Mask | (A) To M, (M) (M*) To A, (A) To M |
| 0100 | 04 | 2's Complement | Clear M, (M)+(M*)+Carry To A, (A) To M |
| 0101 | 05 | Add 2 | 2 To M, (M)+(M*) To U, (U) To M |
| 0110 | 06 | Add 1 | 1 To M, (M)+(M*) To U, (U) To M |
| 0111 | 07 | Subtract 1 | −1 To M, (M)+(M*) To U, (U) To M |
| 1000 | 10 | Subroutine Jump Single Operand | (M) To X, (P) To M, (M) To π, (Z11–23) To P |
| 1001 | 11 | Subroutine Jump Double Operand | (M) To X, (P) To M, (M) To π, (Z8–10) To P21–23 |
| 1010 | 12 | Return Jump | (M) To Z11–23, (Z11–23) To P |
| 1011 | 13 | Unconditional Jump | (Z11–23) To P |
| 1100 | 14 | Load B-Box | (M) To Δ U |
| 1101 | 15 | Clear M | Clear M |
| 1110 | 16 | Partial Product | Develop uncorrected product bit |
| 1111 | 17 | Partial Divide | Develop uncorrected quotient bit |

NOTE 1.—M* is cleared to "1" state.
NOTE 2.—Final transfer to M will not occur if Phase V is skipped.
NOTE 3.—For octal code 11, P13 and P20 are also set.

TABLE 3.—FIELD IV SHIFT OR CHANNEL INDICATORS

| Z4–7 | Octal | Shift Control Operation | Channel Select Operation |
|---|---|---|---|
| 0000 | 00 | Right Shift 8 Places | Channel 0 |
| 0001 | 01 | Right Shift 1 Place | Channel 1 |
| 0010 | 02 | Right Shift 2 Places | Channel 2 |
| 0011 | 03 | Right Shift 3 Places | Channel 3 |
| 0100 | 04 | Right Shift 4 Places | Channel 4 |
| 0101 | 05 | Right Shift 5 Places | Channel 5 |
| 0110 | 06 | Right Shift 6 Places | Channel 6 |
| 0111 | 07 | Right Shift 7 Places | Channel 7 |
| 1000 | 10 | Left Shift 8 Places | Channel 8 |
| 1001 | 11 | Left Shift 1 Place | Channel 9 |
| 1010 | 12 | Left Shift 2 Places | Channel 10 |
| 1011 | 13 | Left Shift 3 Places | Channel 11 |
| 1100 | 14 | Left Shift 4 Places | Channel 12 |
| 1101 | 15 | Left Shift 5 Places | Channel 13 |
| 1110 | 16 | Left Shift 6 Places | Channel 14 |
| 1111 | 17 | Left Shift 7 Places | Channel 15 |

In Table 2 above, the operation performed by each octal code is expressed in the shorthand notation used in Table 1 and previously described. Therefore, Table 2 is believed to be self-explanatory, especially when read in view of the subsequent detailed description of the remaining figures and their operation.

In Table 3 above for a shift operation during Phase 3, a "0" bit in $Z_4$ signifies a right shift, and a "1" bit a left shift. The bits in $Z5$–$7$ then designate the number of shifts. For an input-output operation during Phase 3, a channel select circuit is responsive to the code in Field IV to prepare one of the sixteen external units for exchange of information with the computer (M register).

PHASE 5: TRANSFER RESULTS SHIFT CONTROL, OR SKIP CHECK CONTROL

Bits $Z_8$ through $Z_{10}$ (Field V) of the instruction may be interpreted in one of several ways depending upon the code in Field III or Field IV. If the Field IV code during Phase 4 is not a code 11 subroutine jump (double operand), Phase 5 is performed either as the Transfer Results, Shift Control, or Skip Check Control phase, and bits $Z_8$ through $Z_{10}$ specify one of nine different operations which may be performed during this phase. These operations are listed in Table 4. The Code 000 (i.e., the absence of any said Phase 5 function value) in bits $Z_8$ through $Z_{10}$ specifies that Phase 5 is to be skipped, and control will go directly to the next programmed phase without loss of time. If the instruction is a Phase 4, code 11 subroutine jump (double operand), bits $Z_8$

TABLE 4.—PHASE 5–TRANSFER RESULTS, SHIFT CONTROL, OR SKIP CHECK CONTROL

| Z8–10 | Octal | Operation |
|---|---|---|
| 000 | 0 | Skip Phase |
| 001 | 1 | (M) To X |
| 010 | 2 | (M) To A |
| 011 | 3 | (M) To U |
| 100 | 4 | (A) To M, (M) & (DL) To A Shifted |
| 101 | 5 | (U) To M, (M) & (DL) To U Shifted |
| 100 | 4 | (P)+1 To P, if no overflow |
| 101 | 5 | (P)+1 to P, if no overflow |
| 110 | 6 | (P)+1 To P, if (M) =0 |
| 111 | 7 | (P)+1 To P, if (M) 0 |

NOTE 1.—Overflow check is made for octal codes 4 and 5 if octal codes 1 or 2 are in Field IV.

In Table 4 above it will be observed that octal codes 4 and 5 have a dual role. If Field IV itself is interpreted as a shift indicator because of a Field III code 1, 3, or 5, these two Field V codes are double length shift codes for performing during Phase 5 the shift on one 24-bit portion of the double length word. On the other hand, if Field IV is not interpreted as a shift indicator, codes 4 and 5 of Field V are interpreted as overflow check codes for the opertaions of addition (01) or subtraction (02) in Phase 4, and perform during Phase 5 the following logic:

(a) If overflow has occurred, control passes to the next instruction in the sequential address, which is normally a jump instruction.

(b) If no overflow has occurred, the next instruction is skipped.

When a subroutine jump with double operand is performed during Phase 4 (code 11) then the code in Field V becomes part of the starting address for the subroutine and is transferred from Z8–10 to P21–23. Also, P13 and P20 are automatically set so that an address within the range of octal values 02010 to 02017 is placed into P register.

PHASE 6: THE DELAY PHASE

This phase is used in the computer to insert a delay in the normal computation cycle. The normal cycle of operations is delayed whenever a command is given to write data into the Permanent memory. When data is written into the Permanent memory, a longer period of time is required to switch the Permanent memory element of the present system. Whenever a write command to Permanent memory is required, Phase 6 is entered. After completion of the Permanent memory write, a resume signal from memory control clears Phase 6 and permits the normal instruction cycle to continue. Normally, the Permanent memory is not loaded during execution of a program.

From the discussion and tables given above it may therefore be appreciated that the divided word format of the present invention allows the programmer to build an instruction by choosing any desired combination of codes in the Fields II, III, IV, and V. As an example of the highly flexible instruction repertoire which results from this concept, Table 5 is given below, which is made up from Tables 1, 2, 3, and 4.

TABLE 5.—SAMPLE INSTRUCTION REPERTOIRE

| Name | III | IV | V |
|---|---|---|---|
| Load A | 2 | 00 | 2 |
| Store X | 4 | 00 | 3 |
| Transfer (X) To A | 4 | 00 | 2 |
| Clear (U) | 0 | 15 | 3 |
| Add (A)+(X) To A | 4 | 01 | 0 |
| Subtract (A)−(U) To A | 2 | 02 | 0 |
| Unconditional Jump | 0 | 13 | 0 |
| Equality Skip | 2 | 02 | 6 |
| Skip if (A) is negative | 0 | 00 | 7 |
| Shift (U) Right 3 Places | 3 | 03 | 0 |
| Shift (AU) Left 4 Places | 3 | 13 | 4 |

In Table 5 above, only the three instruction word Fields III, IV and V are shown for the sake of simplicity. The number of instructions illustrated represents only a fraction of the number possible with the novel word format of the present invention. The operations performed by a single instruction word as it cycles through Phases 2, 3, 4, and 5 is practically limited only by the programmer's imagination in choosing the codes for the fields.

(2) DETAILED FIGURE DESCRIPTION

In FIGURES 2 through 23 are shown the details of the more important units making up a preferred embodiment of the present invention. Each component, except for register stages, is identified by a legend beginning with the number of the figure in which it appears, placed to the left to the hyphen. Each input signal command lead to a figure is normally identified both by its function and by the figure or unit from which it originates, with the latter being enclosed by ( ).

*2.1 Basic Circuits*

FIGURES 2, 4, and 5 show each of the basic logic circuits utilized in the present invention together with the symbols representing said logic circuits which are employed in the subsequent figures. FIGURE 2A illustrates the And-Inverter circuit which may be utilized for one of three different logical functions as illustrated in FIGURES 2B, 2C and 2D. The And-Inverter circuit of FIGURE 2A is comprised of a plurality of input diodes 2-10 each having its cathode connected to an input terminal and its anode connected to a junction with a resistor 2-11. This junction in turn is connected to the base of an NPN transistor 2-12 via a diode 2-13 and resistor 2-14. The base of transistor 2-12 is further biased by a negative potential via resistor 2-15. The collector of transistor 2-12 is biased with a positive potential applied via resistor 2-16.

In order to obtain a negative going output from the collector of transistor 2-12, all inputs to the circuit of FIGURE 2A must be positive going. As an example, assume that three signal pulse trains are applied to the input diodes 2-10 during the time intervals $t_1$, $t_2$, and $t_3$. The potential at the anode of diode 2-13 essentially follows the lowest potential applied to any one of the input diodes 2-10, neglecting any drops across these diodes when conducting. Therefore, during time interval $t_1$, the bottom diode 2-10 remains conducting such that the current to resistor 2-07 maintains the anode of diode 2-13 at the negative signal value even though positive going signals are applied to the upper and center input diodes 2-10. This low anode potential of diode 2-13 also maintains the base electrode of transistor 2-12 at a potential sufficient to cut the transistor off so that little or no current flows through its collector and associate resistor 2-16. Therefore, the collector terminal remains high during time interval $t_1$ as illustrated. During time interval $t_3$, all of the input signals are positive going which thus raises the potential at the anode of diode 2-13 and so increases the potential of the transistor base electrode. This thereby turns on the transistor so that the current flow in the collector circuit causes a fall in the collector potential as seen during the time interval $t_3$ of the output signal. In FIGURE 2A, the number of input diodes 2-10 may obviously be increased or decreased within practical limits depending upon the number of signals whose coincidence must be ascertained.

When the circuit of FIGURE 2A is used to detect coincidence of positive going signals at all of its inputs, its significant output is negative going and thus it performs the logical AND function. Since the significant output from the circuit is of different polarity than the input signals, this logic function is designated in the following figures by the symbol $\overline{A}$ enclosed by a rectangle as illustrated in FIGURE 2B. However, the basic circuit of FIGURE 2A may also be used to ascertain the presence of a negative going signal at any one of its inputs in order to thereby generate a positive going signal output. For example, in FIGURE 2A this is illustrated during time interval $t_1$ in that the negative signal applied to the bottom input diode 2-10 causes a positive output from transistor 2-12 even though positive input signals are applied to all of the remaining input diodes. Thus, when the basic circuit of FIGURE 2A is utilized in this second manner, the basic logic function is disjunctive and is repersented by the symbol $\overline{O}$ surrounded by a rectangle as shown in FIGURE 2C. FIGURE 2C illustrates that the application of a negative going signal at any one of its inputs generates a positive going output signal, which is the significant signal in this case.

By modifying the circuit of FIGURE 2A so that it has but one input diode 2-10, the circuit performs an inversion function in that a positive input signal generates a negative output signal, and vice versa. When this modified circuit is employed in the succeeeding figures in this manner, it is represented by the letter I surrounded by a rectangle as shown in FIGURE 2D. Thus, the basic logic circuit of FIGURE 2A may be employed in any one of three ways which are respectively indicated by the symbols shown in FIGURES 2B, 2C, and 2D.

Another basic logic circuit is that of FIGURE 3A which is merely a positive diode AND gate having a plurality of input diodes 3-10 whose cathodes receive input signals and whose anodes are tied together at a common junction which is biased positive via a resistor 3-11. In this AND gate, the output terminal potential is approximately equal to the lowest potential of any of the input signals, such that positive going signals must be applied simultaneously to all of the input diodes in order to obtain a positive going output from the circuit. Since the significant output signal from this circuit is of the same polarity as the significant input signals, the positive And function is performed which is illustrated by the symbol A surrounded by a rectangle as shown in FIGURE 3B. Thus, FIGURE 3B differs from FIGURE 2B in that the former generates a positive going output for all the positive going signals, whereas the latter generates a negative going output for all positive going inputs.

A third type of logic circuit employed in the present invention is that disclosed in FIGURE 4A which is a positive OR gate comprised of input diodes 4-10 whose cathodes are connected to a common junction which is biased negatively via a resistor 4–11. For any positive input signal applied to one of the input diodes, a positive going output signal is generated by this gate. This positive OR function is represented by the letter O surrounded by a rectangle as shown in FIGURE 4B, and is to be contrasted with FIGURE 2C in that the latter generates a positive output for any negative input, whereas FIGURE 4B generates a positive output for any poistive input.

In the subsequent figures, a clock or command signal which is common to a group of gates is shown with its conductor placed adjacent the sides of the rectangles, and arrowheads are drawn touching the corners to indicate the direction of the signal. An example of this convention is shown in FIGURE 6, $\overline{A}$ gates 6–10 through 6–22.

FIGURE 5A shows how two of the FIGURE 2A circuits may be cross-coupled in order to form a bistable flip-flop for use as a register stage or for control purposes. By deriving one input of each of the circuits from the output of the other, the cross-coupled circuit may be triggered so that one output therefrom is high while the other is low, and vice versa, with the circuit being stable in either state. For example, connect the output of $\overline{O}$5–10 to one input of $\overline{O}$5–11, and the output of $\overline{O}$5–11 to one input of $\overline{O}$5–10. The logical OR function is attributed to each of these circuits in this case, since the significant input signal used for setting the flip-flop to one or the other stable state is deemed to be negative going in polarity. Hence, during the time when no change in the state of the flip-flop is to be made, all of the input terminals 5–12 and 5–13 are held at a high potential.

In operation, assume that initially the output from $\overline{O}$5–10 is high. This high output is appiled to one input of $\overline{O}$5–11 whose other input terminals 5–13 are also held at a high potential by circuitry not shown in FIGURE 5A. Thus, since all of the input terminals of $\overline{O}$5–11 are positive, its output must be negative. The negative potential from the output of $\overline{O}$5–11 is in turn connected to one input of $\overline{O}$5–10, whose other input terminals 5–12 are assumed to be maintained with positive potential. Since at least one input of $\overline{O}$5–10 is thus held negative, it output must be maintained at the positive potential which consequently results in a stable condition of the circuit.

Now assume that it is necessary to change the output potential of $\overline{O}$5–11 from low to high. To accomplish this, a temporary negative signal is applied to either one of its input terminals 5–13, thus driving its output high. This high output from $\overline{O}$5–11 now results in all of the inputs to $\overline{O}$5–10 becoming high and so generates a negative going signal from this gate. The negative signal from $\overline{O}$5–10 will now maintain a high output from $\overline{O}$5–11 even after the temporary negative signal disappears from the input terminal 5–13. Consequently, the flip-flop has been triggered into its second stable state where the output from $\overline{O}$5–11 is high and that from 5–10 is low. To again trigger the flip-flop into its initial state, a temporary negative going signal must be applied to one of the input terminals 5–12 of $\overline{O}$5–10.

The circuit of FIGURE 5A is represented in succeeding figures by the letters FF surrounded by a rectangle as shown in FIGURE 5B. In FIGURE 5B, if a temporary negative going signal is applied to either terminal 5–12, then the potential of the output labeled 0 becomes high, while that of the output labeled 1 becomes low. In such a state, the flip-flop is defined to be in its cleared or reset state. If a negative signal is applied to either of its inputs 5–13, then the 1 output becomes high while the 0 output goes low, and the flip-flop is said to be in its set condition. If the flip-flop is used as the stage of a register employed to hold a binary bit number, then the setting of the flip-flop register stage indicates that a binary "1" has been placed therein, so that its "'1" output becomes high. In this situation, the content of the register stage is usually indicated by the name of the register followed by the bit position, such as M11, Z10, etc. Where a register stage is considered to hold a binary "0" bit, it is in its cleared condition such that its "0" output is high with this condition being indicated by a horizontal bar placed over the register stage identification, e.g., $\overline{M22}$, $\overline{P15}$, etc.

2.2 Memory Addressing

FIGURE 6 shows details of the S register in which is placed an address for use in referencing the memory. The S register is comprised of thirteen stages designated S11 through S23 which may be abbreviated as S11–S23. The outputs of the S register stages are fed to the address translator common to both memories where it is used to select the necessary memory drive lines by techniques well known in the art. In the present system, S register stages 21, 22 and 23 contain the binary bits making up the lowest order octal digit, with S21 representing a binary order $2^3$ and S23 representing a binary order $2^1$. Similarly, the remaining higher order octal digits are held by the groups of stages S18–20, S15–17, S12–14, and S11. Since the highest octal order is comprised of only one stage S11, the maximum value of the octal digit in said order is 1. To illustrate the binary to octal conversion, assume that stages S11–23 contain the binary bit values 1 000 111 101 011, respectively. Thus, S11 is set, stages S12–14 are all cleared, stages S15–17 are all set, S18 is set, S19 is cleared, S20 is set, S21 is cleared and S22–23 are set. When this binary number is interpreted in octal fashion, the contents of S register is 10753, with the octal digit 3 being represented by the bit condition of stages S21–23, and so on.

At each CP6 time, the S register is normally cleared by a negative signal from $\overline{A}$6–9 since the positive signal Clear S Enable is present for all computer operations except when information is to be stored in a Permanent memory location such that the phase 6A flip-flop of FIGURE 16 is set. Normally, however, phase 6A flip-flop remains clear so that its 0 output is high. Information may be placed into the S register from either the P register or from Z register stages 11–23. A group of $\overline{A}$ gates 6–10 through 6–22 is provided which sample the "1" outputs of P register stages upon occurrence of the signal P To S applied via 16–23. Since the signal P To S is negative, its inversion will make high one input of each of the $\overline{A}$ gates 6–10 to 6–22. Thus, if the other input of one of these $\overline{A}$ gates is high due to the presence of a binary "1" bit in its associated P register stage, the output of the $\overline{A}$ gate goes negative and thus sets its associated S stage in order to enter a binary "1." In similar fashion, a group of $\overline{A}$ gates 6–24 through 6–35 samples the contents of Z11–23 upon the occurrence of the signal Z11–23 To S applied via 16–36.

In addition to entry of information from either the P or the Z registers, certain special memory addresses may be forced into the S register by the following signals. Assuming that all of the S stages are cleared, the generation of a negative signal 1 To S thereby enables $\overline{O}$6–37 to generate a positive output which, when inverted by I6–38, sets S23. Since all of the other S register stages are clear, the octal address residing in the S register is now 00001. In similar fashion, the generation of the negative signal 2 To S sets S22 via $\overline{O}$6–39 and I6–40 to thereby place the octal address 00002 into the S register. When the negative signal 4 To S is generated, S21 is set so that the S register now contains the octal address 00004. If the signal 5 To S is generated, then both $\overline{O}$6–37 and $\overline{O}$6–41 are enabled to set S23 and S21, respectively, in order to force the octal address of 00005 into the S register. Lastly, the signal 6 To S sets S22 and S21 in order to force the octal digit 6 into the lowest order octal position of the S register. As has been noted previously, these special octal addresses denote memory locations which are utilized for special purposes. Furthermore, it should be appreciated that when all of the S stages are cleared, the address translator will reference memory location 00000 which is that location utilized as the accumulator A register in the present system.

FIGURE 6 also shows the circuitry for adding the value of 1 to the number in S register in order to calculate the memory address of the next instruction. This newly calculated address is placed into P register from whence it subsequently is transferred to S register whenever a new instruction reference cycle is to occur. The octal value 1 is added to the lowest octal order of the number in the S register, which is that represented by S21–23. This calculating step is performed upon generation of the negative signal S+1 To P which is applied via 16–43 to a group of $\bar{A}$ gates 6–44 through 6–76. For any one of these $\bar{A}$ gates the presence of positive signals to all of its other inputs enables the generation of a negative signal therefrom which in turn sets the indicated P register stage. Since $\bar{A}$ gates 6–44 to 6–76 are conditioned concurrently by the signal S+1 To P, it is seen that the newly calculated address is placed into P register during one clock pulse interval.

The remaining part of the S register Add One circuitry will now be described together with the operation thereof. If S23 is cleared, its 0 output is high so that $\overline{A6}$–44 is enabled to set P23 when the signal S+1 To P occurs. This is correct, since binary 1 added to binary 0 equals binary 1 with no carry. $\overline{S23}$ is also applied to $\overline{A6}$–46, while S23 is applied to $\overline{A6}$–45. Thus, if S23 is cleared, then P22 is set only if S22 is set, since $\overline{A6}$–46 can only be enabled if the 1 output of S22 is high. For the condition where S23 is cleared, the addition of 1 to the 0 bit therein creates no carry to the next higher binary order, so that the bit in P22 should have the same value as the bit in S22.

If S23 contains a binary 1, whereby its 1 output is high, then the addition of a binary 1 thereto will result in 0 being placed into P23 and a carry of 1 generated to the next higher binary order. If S23 is set, then $\overline{A6}$–44 cannot be enabled by a signal S+1 To P, so that P23 cannot be set. Inasmuch as the P register is cleared prior to entry of the newly calculated address from $\overline{A6}$–44 through 6–76, the failure to set P23 at the add one time effectively enters a binary 0 into P23. If S22 is set, then the addition of the carry causes a binary 0 to be entered into P22 and a carry generated to the next higher order. For example, if both S23 and S22 are set, neither $\overline{A6}$–45 nor $\overline{A6}$–46 can have all inputs positive at the add one time. Thus, P22 cannot be set and in remaining clear, signifies the presence of a binary 0 therein. On the other hand, if S23 is set but S22 is clear, then $\overline{A6}$–45 is enabled to set P23. Consequently, a carry of 1 added to the "0" binary bit in S22 causes a sum bit of 1 to be placed into P22.

If both S22 and S23 are set, then the addition of binary 1 to the contents of S23 will cause a carry of 1 to be added to the contents of S21. $\overline{A6}$–77 determines if both S22 and S23 are set, and if so, indicates that P21 is to be set to the value opposite from the value in S21. However, if either one or both of the stages S22 and S23 is clear, then there cannot be a carry of 1 added to the value in S21 so that P21 should be set to the same value as that held by S21. For example, if the output from $\overline{A6}$–77 is low, then only $\overline{A6}$–48 can be enabled to set P21 if S21 is clear. On the other hand, when the output of $\overline{A6}$–77 is high, then $\overline{A6}$–47 sets P21 if S21 is set. Hence, a significant negative output is derived from $\overline{A6}$–77 only when there is a carry of 1 to be added to the contents of S21, which in turn causes a bit of opposite value to be placed into P21.

The function of $\bar{A}$ gates 6–79 and 6–81 is similar to that of $\overline{A6}$–77 in that each determines if all of the lower order S stages are set. If such is the case, then the addition of 1 to S23 will cause a carry of 1 to be added to the value in its own associated S register stage. Furthermore, the output of $\overline{A6}$–81 is applied to $\bar{A}$ gates 6–54, 6–57, 6–60 and 6–63, and the output from 16–82 is applied to $\bar{A}$ gates 6–55, 6–58, 6–61, 6–64 and 6–89. Thus, when determining the value of the bits to be placed into P18, P17, P16 and P15, there is available an indication as to the set or clear conditions of S register stages 20–23. For example, if any one of the stages S20–23 is cleared, then there will be no carry of 1 to be added to the content of S18. In this case, the positive output from $\overline{A6}$–81 enables $\overline{A6}$–54 to set P18 if S18 is set. Likewise, $\bar{A}$ gates 6–57, 6–60 and 6–63 also set their corresponding P register stages if their associated S register stages are set. However, if the stages S20–23 are set while S19 is clear, then no carry of value 1 can be added to S18. Although the now negative output from $\overline{A6}$–81 prevents the enabling of $\overline{A6}$–54, the output from S19 enables $\overline{A6}$–53 to set P18 if S18 is set. When S19 is clear, the low output from its 1 terminal also generates positive signals from $\overline{A6}$–83, 6–85 and 6–87 in order to permit $\bar{A}$ gates 6–56, 6–59 and 6–62 to set the associated P register stages if the associated S register stage are set. Thus, if any one of the stages S19–23 is clear, then the values in the remaining stages S11–18 are transferred unchanged to P11–18. However, if all of the stages S19–23 are set, then the positive output from 16–82 will enable $\overline{A6}$–55 only if S18 is clear. This is proper, since a carry of 1 added to the 0 bit in S18 results in sum bit of 1 placed in P18.

$\bar{A}$ gates 6–83, 6–85 and 6–87 perform similar functions as gates 6–77, 6–79 and 6–81, in that they determine whenever all of a preceding group of S register stages are set. The outputs of 16–82 and 16–88 are applied to $\overline{A6}$–89. If $\overline{A6}$–89 is enabled to generate a negative signal, this indicates that all of the stages S16–23 are set. Therefore, the value placed in P14 depends both upon the output from $\overline{A6}$–89 as well as upon the value in S15. The circuitry associated with stages S11–14 operates in the same fashion as does the circuitry associated with S15–18, and so will not be described in detail.

In summary, upon transfer of value held in the S register to P register, the value 1 is added to the lowest order binary bit in S23 in order to calculate the address of the next instruction to be performed. This new instruction address is placed into P register for storage until required, whereupon it is to be transferred unchanged back into the S register for translation by the addressing circuits.

FIGURE 7 shows details of the P register, which is that register used for holding the address of the next sequential instruction to be performed. This register is comprised of thirteen stages P11–23, although P12–17 are not shown in FIGURE 7. The register is cleared by the signal Clear P prior to entry of information from either the S register Add 1 circuitry in FIGURE 18 or from Z register stages 11–23. The latter transfer is accomplished via a group of $\bar{A}$ gates 7–10 through 7–22 upon generation of the signal Z11–23 To P applied via 17–23.

A transfer from Z8–10 may also be effected into P21–23 via a group of $\bar{A}$ gates 7–24 through 7–26 by the signal Z8–10 To P. The signal also sets P20 and P13, so that the address set into P register has an octal value somewhere within the range of 02000 through 02007. As with the S register previously described, stages P21–23 contain bits of the lowest order octal digit, while P11 is in the highest octal order. The transfer from Z8–10 is effected during execution of a subroutine jump which requires a double operand.

2.3 Arithmetic Circuits

FIGURE 8 shows details of the M and M* registers, each comprised of twenty-four stages although all of these are not actually shown in the figure. The M register provides buffering between the memories and the internal computer circuits, as well as between the memories and the external input-output units. It, therefore, can be filled with information from the memory sense amplifiers, or from the external peripheral input circuits. The contents of the P register can also be transferred to M register via a group of $\overline{A}$ gates 8–9 through 8–21 upon generation of the signal P To M. This transfer is made whenever a subroutine is entered so that the address of the next instruction in the main program may be stored in memory for use after completion of the subroutine.

Information from M register may be transferred either directly or in 1's complement form into the M* register. The direct transfer, i.e., with no change in bit value, is accomplished via a group of $\overline{A}$ gates 8–23 through 8–47. It will be noted that these $\overline{A}$ gates sense the 0 output terminal of the M register stages, so that an $\overline{A}$ gate in this group will be enabled only if a binary 0 resides in its associated M register stage. However, prior to transfer of information from M To M*, the signal Clear M* is applied to the set terminals of the M* register in order to set all of the M* stages. Therefore, when the signal M to M* is generated and applied to $\overline{A}$ gates 8–23 to 8–46 via 18–47, an M* stage is cleared to a 0 state only if its associated M stage contains binary 0. On the other hand, if the associated M register stage contains binary 1, then the corresponding M* stage remains set. The initial setting of the M* register by the signal Clear M* is performed in the event that a function M–1 is to be executed, since the binary number 1.11—1 actually represents the value—0.00—1.

As noted before, it is also possible to complement each bit in the M register and transfer same to the M* register, this operation being performed for subtract, complement, or the like. The transfer is made via a group of $\overline{A}$ gates 8–48 through 8–71 which are conditioned by the signal $\overline{M}$ to M*. These gates sample the 1 output terminals of the M register stages in order to clear the associated M* register stage to its "0" bit value if a "1" bit resides in the corresponding M stage. Thus, if M12 is set so that its 1 output is high, $\overline{A}$8–60 is enabled at the transfer time to clear M*12 to its 0 condition and thus make its 0 output high. Conversely, if M12 is cleared such that its 0 output is high, then $\overline{A}$8–60 cannot be enabled during the signal $\overline{M}$ to M*. In this case, M*12 remains set, this being the condition caused by the Clear M* signal.

FIGURE 8 also shows circuits for indicating that M register is completely filled with "0" bits. A group of $\overline{A}$ gates 8–73 through 8–80 each respectively sample the 0 output terminals of three different M stages so that it generates a significant negative output only if all three of its associated M stages are cleared, i.e., have binary "0" bits therein. For example, $\overline{A}$8–73 is responsive to the signals $\overline{M}$0, $\overline{M}$1 and $\overline{M}$2 in order to generate a negative output therefrom. In similar fashion, $\overline{A}$8–74 determines if M3–5 stages all contain zeros, and so on. $\overline{A}$ gates 8–73 through 8–76 feed into O8–81, while $\overline{A}$ gates 8–77 through 8–80 feed into O8–82. These O gates in turn respectively are applied to I8–83 and I8–84. Consequently, the output from I8–83 is positive only if all of the stages M0–11 contain "0" bits. This is so, since if any one of these stages is set, then the $\overline{A}$ gate of the group 8–73 to 8–76 with which it is associated generates a positive output which, when passed to O8–81, causes I8–83 to become negative. In similar fashion, the output from I8–84 is positive only if all of the M stages 12–23 contain binary "0" bits. Positive outputs from both I8–83 and I8–84 thereby indicate the M register to be empty, or in other words, to contain binary "0" bits in all of its stages.

FIGURE 9 shows the adder for summing the contents of the M and M* registers during execution of various of the instructions. The adder is also used for indexing the operand address contained in the Z11–23.

A first group of $\overline{A}$ gates 9–10 through 9–33 is provided each indicating by a significant negative output the fact that the M and M* stages of corresponding binary order both contain binary "0" bits. For example, $\overline{A}$9–33 is responsive to high signals from both of the "0" outputs of M23 and M*23 in order to generate a negative output therefrom. In similar fashion, each one of a second group of $\overline{A}$ gates 9–34 through 9–57 generates a significant negative output if corresponding binary order stages in the M and M* registers contain binary "1" bits. As an example, $\overline{A}$9–57 is enabled when both M23 and M*23 are set such that each generates a high output from its 1 terminal. In the present system, M0 and M*0 each contains the sign bit of the stored numbers, while M23 and M*23 each contains the lowest binary order bit of said stored numbers.

The operation of the adder will now be described in conjunction with the description of the remaining circuitry. Assume first that an Add operation is being performed so that the number in M* register is added to the number in the M register. In this case, the signal Subtract+Complement is low so that I9–58 produces a high output. This represents the fact that a carry of value 0 is introduced into the lowest order stage of the adder, which is that stage summing together the binary bits in M23 and M*23. If both M23 and M*23 contain binary "0" bits, then $\overline{A}$9–33 is enabled to generate a negative signal therefrom. This negative signal is applied both to $\overline{O}$9–59 and A9–60. Therefore, $\overline{O}$9–59 generates a positive signal, while A9–60 generates a negative signal. The positive signal from $\overline{O}$9–59 is applied both to A9–60 and also to A9–61, with the latter gate also having inputs from I9–58. Thus, under the assumption that M23 and M*23 both contain "0" bits, and that there is no input carry of value 1, A9–61 has all positive inputs which in turn causes I9–63 to have a negative output. The negative output from I9–63 indicates that the lowest order sum bit is 0. The same value of 0 for the sum bit will be produced in the event that both M23 and M*23 contain binary 1's with an input carry of 0. This is so, since $\overline{A}$9–57 is now enabled to generate a negative signal which disables A9–60 and enables $\overline{O}$9–59 to produce a positive signal as before. The sum bit of 0 is correct since the addition of two binary "1" bits results in a sum bit of "0" and a carry of "1" to the next higher order adder stage.

If M23 and M*23 contain binary bits of different value, i.e., 1 or 0 or vice versa, then neither $\overline{A}$9–33 nor $\overline{A}$9–57 is enabled and both produce positive signals. Since I9–58 also generates a positive signal, $\overline{O}$9–59 generates a negative signal which in turn prevents either A9–60 or A9–61 from generating a positive signal. Since no positive signals are applied to O9–62, its output is negative which in turn generates a positive signal from I9–63, thus representing a sum bit of value 1.

During the operations of subtract or complement, a carry of value 1 is introduced into the lowest order stage of the adder in order to effectively transform the 1's complement of the subtrahend into its 2's complement in accordance with well known subtraction techniques. The 1's complement of the subtrahend had previously been placed into the M* register from the M register via the complementing gates $\overline{A}$8–48 through 8–71. In this situation, if either $\overline{A}$9–33 or $\overline{A}$9–57 is enabled, then both A gates 9–60 and 9–61 are prevented from generating positive outputs since the output from I9–58 is now negative due to the positive signal Subtract+Complement. This sum bit is correct, since the carry value of 1 was being summed together with either two "1" bits or two "0" bits. On the other hand, if the bits in M23 and M*23 are of different value, then the sum bit from I9–63 equals 0 as represented by a negative output therefrom. This result is obtained because both $\overline{A}$9–33 and $\overline{A}$9–57 generate positive signals which switch A9–60 with a positive output from $\overline{O}$9–59. The positive output from the last gate is due to the negative output from I9–58.

Turning now to the second lowest order stage of the adder, it is seen that its configuration is different from that of the stage summing together the M23 and M*23 bits.

In operation, if both of the bits in M22 and M*22 are 0's or 1's, then $\overline{A}$9–32 or $\overline{A}$9–56 will be enabled, respectively, thus providing a second negative output signal to the inputs of $\overline{A}$9–64 and $\overline{O}$9–65. Both of these gates therefore generate positive signals. If both M23 and M*23 contain "0" bits, then $\overline{A}$9–33 also generates a negative output which is applied to $\overline{A}$9–66 and thus make its output positive. If both outputs of $\overline{A}$9–64 and $\overline{A}$9–66 are positive, then $\overline{O}$9–67 generates a negative output therefrom representing a sum bit of 0 value. Thus it will be seen that if both M23 and M*23 contain "0" bits, then there can never be a carry from position 23 to position 22, and consequently, the sum bit from $\overline{O}$9–67 depends entirely upon the bit values in M22 and M*22. This is further illustrated by assuming that bits of different value reside in M22 and M*22 such that both $\overline{A}$9–32 and $\overline{A}$9–56 generate positive outputs. If $\overline{A}$9–33 continues to generate a negative output, the $\overline{O}$9–65 also generates a positive output which enables $\overline{A}$9–64 to generate a negative output. This signal in turn produces a positive output from $\overline{O}$9–67 which represents a sum bit of 1.

If both M23 and M*23 contain binary "1" bits, then a carry will be generated from position 23 to position 22 and thus affect the value of the sum bit from $\overline{O}$9–67. In this event, $\overline{A}$9–33 now produces a positive signal while $\overline{A}$9–57 generates a negative signal which in turn produces a positive signal from $\overline{O}$9–59. Consequently, if bits of equal value are held in M22 and M*22, then $\overline{A}$9–66 produces a negative signal since all of its inputs are positive. This negative signal thereby generates a positive output from $\overline{O}$9–67, which is the result obtained when a carry of 1 is added to the binary bits of both 0 or 1 value.

If M23 and M*23 contain binary bits of different value, and there is a carry input of 1 into position 23, then $\overline{O}$9–59 is also positive so as to introduce a carry of value 1 to position 22. Thus, the two different circuits for stages 23 and 22 provide a full addition of two operand bits together with an input carry bit, and provide both sum and carry output indications.

The circuitry comprising stage 21 of the adder is identical to that circuitry comprising stage 23, except that the input carry leads have a different origin. For example, outputs from $\overline{A}$9–56 and $\overline{O}$9–65 are both connected to $\overline{O}$9–68 and $\overline{A}$9–69. If M22 contains a "0" bits, then there can never be a carry 1 into position 21. Under this assumption, both $\overline{A}$9–56 and $\overline{O}$9–65 generate positive signals so that the value of the sum bit from I9–72 depends upon the value of the bits in M21 and M*21. Therefore, the operation of the adder 21 position circuitry is identical to the operation of the position 23 circuitry when a positive output is derived from I9–58. If M22 and M*22 both contain binary 1's, then $\overline{A}$9–56 generates a negative signal which affects the circuitry in position 21 in exactly the same fashion as does the negative signal from I9–58. If instead M22 and M*22 have binary bits of different value, but there is a carry value of 1 into position 22, then $\overline{O}$9–65 generates a negative ouput signal which affects the circuitry of position 21 in exactly the same fashion as does the negative signal from I9–58. For these reasons then, a detailed explanation of the operation of adder position 21 is not here given.

Adder positions 1 through 20 are not shown in FIGURE 9 since their composition is identical to the positions just discussed. For example, adder stage 20 is identical to adder stage 22, while adder stage 19 is identical to adder stage 21. Thus, the two types of adder stages alternate, with all even number stages being identical to one another, and all odd number stages being identical to one another.

FIGURE 10 shows the memory digit drivers used for writing into the Variable memory from any one of a number of sources. A group of twenty-four O gates 10–10 through 10–23 is provided, one for each bit position in a referenced memory location. A first group of A gates 10–34 through 10–57 is provided to transfer the contents of M register to a location in the Variable memory upon generation of the signal M To DD applied in common with all of said first group gates. In similar fashion, a second group of A gates 10–58 through 10–81 transfers the sum digits appearing from the adder upon generation of the signal Adder To DD. When the signal Mask To DD is provided, the group of A gates 10–82 to 10–105 is responsive to both M and M* bit values in order to transfer 1 bits to the memory only where corresponding order stages of the M and M* registers contain binary "1" bits. As an example, A10–105 generates a positive output if both M23 and M*23 contain binary "1" bits as evidenced by positive signals therefrom.

When performing shift operations, multiply, divide and various other functions, it is necessary to transfer the contents of M register into a Variable memory location shifted either one place to the right or to the left. A gates 10–106 to 10–129 sample the contents of M register stages having a numerical designation one value lower than the numeral designation of the DD position. Thus, upon generation of the signal R1 To DD, the contents of M register is transferred into a Variable memory location shifted one place to the right. As an example, A10–129, associated with DD position 23, samples M22 in order to transfer a "1" in the latter into the lowest order position of the Variable memory location. In similar fashion, A10–107 examines M0 in order to shift the contents of same into DD position 1. However, A10–106 is responsive to the value of the signal Left End To DD0 generated from FIGURE 23. The significance of the signal will be subsequently described.

For a shift of the M register contents one position to the left when transferred to the Variable memory, the group of A gates 10–130 through 10–153 is responsive to the signal L1 To DD. Thus, A10–130 transfers the contents of M1 into the 0 position of the Variable memory location to which it is being sent. A10–153 is responsive to the value of the signal Right End To DD generated in FIGURE 23 which will subsequently be described.

A positive output from any one of the A gates associated with an O gate causes said O gate to likewise generate a positive signal which is gated via one of the group of $\overline{A}$ gates 10–154 through 10–157 in order to write a binary 1 into the associated memory location bit position. In absence of a Variable memory write cycle, the Clock signal from memory, which is applied in common via I10–178 to the $\overline{A}$ gates, is maintained positive so that all of the DD signals are positive. When writing into Variable memory, this Clock goes negative and thus the output of the $\overline{A}$ gates is determined by their 0 gate inputs.

2.4 Control Registers

FIGURE 11 shows details of the K and K* registers which cooperate together as a shift counter in order to control the number of times that a left or a right shift is made upon a number. As mentioned previously, when a shift operation is to be performed, the three right most bits in Field IV of the instruction determine the number of shifts to be performed, said number being equal to the octal value of said three bits. Consequently, $\overline{A}$ gates 11–10 through 11–12 sample the contents of M5–7 in order to transfer the bits into K register stages 3, 2 and 1, respectively. It will be appreciated from the subsequent discussion of FIGURE 12 that M5–7 is also transferred to Z5–7 which provides storage for the three right most bits of Field IV of the instruction. This transfer into K register is provided upon generation of the negative signal M5–7 To K via I11–13. Prior to such transfer, however, the K register is cleared to its "0" state by the signal Clear K.

In essence, the number contained in the K register has a value 1 subtracted therefrom each time that a shift occurs, until the contents of K register is reduced to 0, whereupon the shift operation is completed. This subtraction of 1 is accomplished by first transferring the K register number to the K* register via a group of $\overline{A}$ gates 11–14 through 11–19. $\overline{A}$ gates 11–14 through 11–16 sample the 0 outputs of the K stages 1–3, respectively, while $\overline{A}$ gates 11–17 through 11–19 sample the 1 output terminals of K1–3. Consequently, this double gating effect sets the K*1–3 stages to the bit values corresponding to the values in K1–3, respectively.

The number in K* register is now transferred back to K register with 1 being subtracted therefrom in the process. K*1 contains the lowest order bit of the three-bit octal value, while K*3 contains the highest order bit of the octal shift value. The same is true for the stages in K register. When the signal K*–1 To K is applied via I11–21, a group of $\overline{A}$ gates 11–22 through 11–27 are simultaneously conditioned. If K*1 contains a binary 1, as represented by a high output from its 1 terminal, then $\overline{A}$11–22 is enabled to clear K1, thus inserting a binary 0 therein. This is correct, since a value 1 subtracted from a 1 bit results in a difference digit of 0. Under this assumption, there is no borrow of 1 to higher order stages of the shift counter so that the values in K2 and K3 remain the same. This is shown to be the case since all of the remaining $\overline{A}$ gates 11–23, 11–26, 11–24 and 11–27 are prevented from generating negative outputs due to the negative signal from the 0 output of K*1. Thus, subsequent to generation of the signal K*–1 to K, K register contains a value one less than the value held in K* register.

If K*1 contains a binary 0 from which one is to be subtracted, then a borrow of 1 is generated from the lowest order stage of the counter which must be taken into account in determining the value of the bits in K2 and K3. As an illustration, when the K*–1 To K signal is generated with K*1 being cleared, $\overline{A}$11–25 is enabled to set K1 thus introducing a difference digit of 1 into this lowest order position of the K register. This is the effect of subtracting binary 1 from binary 0. Since the value 1 must be borrowed from the higher order of the shift counter, the K2 value must be altered to reflect this borrow. Thus, if K*2 has a 1 bit therein, $\overline{A}$11–23 is enabled due to the positive signal from the 0 output of K*1 which indicates that a borrow will occur when 1 is subtracted from the bit in K*1. The enabling of $\overline{A}$11–23 consequently clears K2, thus changing its bit value from that previously transferred from K2 to K*2. If K*2 itself contains a 0, a borrow from it will consequently generate a borrow to the highest order position of the shift counter and change the value of the bit in K3. This is accomplished by $\overline{A}$11–24 which is responsive to binary 0 indications in both K*1 and K*2. Furthermore, $\overline{A}$ gates 11–26 and 11–27 are also responsive to binary 0 digits residing in lower order stages to set associated K register stages to a 1 value if their associated K* register stages have 0 values therein.

$\overline{A}$ gate 11–28 is provided to indicate when the K register is filled with "0" bits, i.e., when all of its stages are cleared. If this latter condition prevails, then $\overline{A}$11–28 generates a negative output which appears positive from I11–29 to indicate the fact that K=0. If any of the K stages is set, however, then $\overline{A}$11–28 becomes positive to indicate the fact that K contents do not equal 0.

FIGURE 12 shows details of the Z register which is comprised of twenty-three stages for holding the complete instruction word, excluding the left most bit. As previously explained, the left most bit found in position 0 of the instruction word indicates whether or not an indexing phase is to be initiated. This left most bit in the present invention is sensed in the M0 stage while the instruction word is still contained therein, so that it is not necessary to provide storage for it in the Z register. In FIGURE 12, stages Z2–8, and 12–21 are not shown.

Stages Z1–3, 4–7, and 8–10 contain the III, IV and V Fields of the instruction word, while stages Z11–23 contain the operand address which reference some U register in the memory. Z1–10 is filled from corresponding ones of M1–10 via a set of $\overline{A}$ gates 12–10 through 12–19. Prior to this transfer, Z–10 is cleared by the indicated signal. Z11–23 may be filled from either the adder outputs 11–23, or from stages 11–23 of the M register. The former transfer is effected by the signal Adder To Z11–23 applied to $\overline{A}$ gates 12–21 to 12–33 whenever the indexing Phase 2 is performed. The latter transfer from the M register is made via $\overline{A}$ gates 12–35 through 12–37 upon generation of the signal M To Z11–23. Prior to entry of information, Z11–23 is cleared by the indicated signal.

$\overline{A}$12–50 is provided in FIGURE 12 to indicate that Z11–23 contains a Permanent memory address. As will be recalled, permanent memory addresses fall in the octal range of from 01000 through 17777. $\overline{O}$12–50 generates a positive output if any of the stages Z11–14 becomes set, whereupon its 0 output terminal goes negative. For example, if Z14 is set, which stores a bit of the second highest order octal digit, then the address in Z11–23 must have a value of at least 01000 or above. As another illustration, if Z11 is set, then the address in Z11–23 has a value of at least 10000. Hence, whenever the output of $\overline{O}$12–50 becomes positive, this indicates that the U address of the instruction word is of a Permanent memory location.

2.5 Control Circuits

FIGURES 13, 14 and 15 show the Z register decoders for each of the Fields III, IV and V of the Instruction Word. FIGURE 13, for example, inspects Z1–3 which holds the three bits comprising the octal digit in Field III of the instruction word. Z3 contains the bit of order significance $2^0$, Z2 holds the bit in order $2^1$, and Z1 holds the bit in order significance $2^2$. Thus, if Z3 is filled with a "1" bit, the octal digit must be odd and of value either 1, 3, 5 or 7. In looking at Table 1, it is seen that odd octal digits call for a shift operation with the exception of octal digit 7. For all digit values other than 7 held in Z1–3, $\overline{A}$13–10 generates a positive output which, when switched with Z3 at $\overline{A}$13–11, generates a negative signal indicating a shift operation. In other words, all odd octal digits in Field III other than the value 7 will generate a negative output from $\overline{A}$13–11 which is interpreted as a shift. Otherwise, $\overline{A}$13–11 generates a positive signal interpreted as $\overline{Shift}$, or no shift. When octal digit 7 is present in Field III, then $\overline{A}$13–10 has positive signals applied to all of its inputs and thus generates a negative output which, when inverted via I13–12, generates a positive signal indicating that information is to be transferred from an input-output unit to M register. Since there is no shift operation for such a function, $\overline{A}$13–11 is prevented from generating a negative output due to the fact that the output from $\overline{A}$13–10 is negative itself.

In considering FIGURE 13, it will be seen from Table 1 that octal digits 4 or 5 in Field III cause a reference of the X register in the variable memory. Octal digit 4 requires that Z1 only be set, while octal digit 5 has both Z1 and Z3 set. In either case, Z2 must be cleared. Therefore, $\overline{A}$13–13 senses the presence of either octal digit 4 or 5 in the field so as to generate a negative output therefrom which becomes positive from I13–14 and thus represents that the X register (of address 00001) is to be referenced.

The presence of a "1" bit is Z2 by itself indicates that a U register must be referenced at the address held by Z11–23. This is so since a U reference is made for octal digits 2, 3, 6 and 7 held in Field III. Where octal digit 6 is stored, an output operation is initiated which is indicated by a negative going signal from $\overline{A}$13–15 which is responsive to set conditions of Z1 and Z2, and clear condition of Z3. For digits other than 6, the output from $\overline{A}$13–15 is positive, indicating that there will be no output function.

FIGURE 14 shows the translator circuits for Z register stages 4 through 7 which store the octal digits in Field IV of the instruction word. Z5–7 store the bits for the lower order octal digit, while Z4 stores the bit for the higher order octal digit which can have a maximum value of 1. In accordance with Table 2, $\overline{A}$ gates 14–10 through 14–16 respectively, sense the presence of octal digits 01 through 07 and accordingly generate negative outputs when these digits are present. For example, $\overline{A}$14–10 generates a negative signal indicating the Add function of the 4–6 stages are cleared and Z7 is set. However, if the octal digits 01 are not stored in Field IV, then $\overline{A}$14–10 generates a positive output indicating that the function is $\overline{Add}$. $\overline{A}$ gates 14–17 and 14–18 translate stored octal digits of values 11 and 12, respectively, to generate negative signals indicating either a subroutine jump with double operand, or a return jump. $\overline{A}$14–19 detects octal digits 14 used for indicating a Load B-box function, while $\overline{A}$ gates 14–20 and 14–21 translate octal digits 16 and 17, respectively, for the Partial Product and Partial Divide functions. Various inverter gates 14–22 through 14–30 are associated with certain ones of the $\overline{A}$ gates in order to provide positive signals therefrom when certain octal digits are sensed. The term "B-Box" is another name for the $\Delta U$ location 00005 which holds the index modifying number.

$\overline{O}$14–31 is provided to generate a positive signal Add+Subtract when either the add or the subtract function is to be performed. In similar fashion, $\overline{O}$14–32 provides a positive signal Subtract+Complement when either the subtract or complement function is sensed. $\overline{A}$14–33 generates a negative signal if either pair of octal digits 10 or 11 is stored in Z4–7. Consequently, the negative output from $\overline{A}$14–33 indicates that a function is either a subroutine jump with a single operand or a subroutine jump with double operand. This negative signal is inverted by I14–34 to provide a positive signal if either one of these two functions is present. In similar fashion, $\overline{A}$14–35 goes negative if either the Partial Product or Partial Divide code is present.

If all stages Z4–7 are cleared, thus representing the octal digits 00, then $\overline{A}$14–37 responds by generating a negative output indicating that Field IV equals 0. Otherwise, the positive output from $\overline{A}$14–37 shows that at least one of the octal digits is other than the value 0.

FIGURE 15 shows the translator circuits for stages Z8–10 which contains the single octal digit for Field V of the instruction word. Z10 holds the lowest order bit of this octal digit, while Z8 contains the highest order bit of the digit. For an octal digit of value 1, $\overline{A}$15–10 generates a significant negative output which appears positive from I15–11 to indicate that the X register in the variable memory is to be filled. $\overline{A}$15–12 responds to the set condition of Z9 and Z10 and the clear condition of Z8 (octal digit 3) to thereby generate a positive signal Load U from I15–13 which will be used to reference the memory at an address held by Z11–23. For octal values of either 4 or 5, $\overline{A}$15–14 responds to a shift operation on the second portion of a double length number. For octal values 6 or 7, $\overline{A}$15–16 generates a negative output and consequently a positive signal from I15–17 to indicate an instruction skip operation if the necessary conditions are met. $\overline{A}$15–18 is enabled to generate a negative signal whenever Field V contains a 0 octal digit as evidenced by the clear conditions of all stages Z8–10.

FIGURE 16 shows the phase control circuits which govern the times during which an instruction word is referenced from memory and thereafter executed. This circuit consists of twenty-one flip-flops 16–10 through 16–30 which are connected in ring fashion such that they are sequentially set and cleared. Certain of the flip-flops may be skipped entirely as the instruction execution cycle progresses due to the fact that there is no need for allowing time in execution of one or more of the instruction word Fields II through V. Furthermore, when executing a Partial Product or a Partial Divide function, certain of the flip-flops are arranged to provide an iteration loop within the ring itself in that several are set and cleared twice during execution of the same instruction word. By means not shown in FIGURE 16, all of the flip-flops are considered cleared to their 0 state prior to the acquisition of the first instruction word from the memory.

Flip-flops 16–10 and 16–11 define the time during which an instruction word is referenced from memory at the address held in S register. This instruction word is transferred from memory to M register and from thence to Z register where its Fields III through V are subsequently translated during execution of the instruction. The signal Start New Instruction, which can only appear at CP5 time, sets FF16–10 so that its 1 output becomes high which thus represents a time hereinafter referred to as Phase 1A. At the following CP2 time, $\overline{A}$16–31 is enabled to generate a significant negative output to set FF16–11 to define the time hereinafter referred to as Phase 1B. Subsequent to the setting of FF16–11, a $\overline{CP4}$ signal from the clock pulse distributor clears FF16–10 to make its 0 output high and its 1 output low. Thus it will be seen that the set conditions of FF16–10 and FF16–11 overlap for the period between CP2 and CP4 of the same machine cycle. FF16–11 is subsequently cleared at CP1 time of the machine cycle following that in which it is set.

Flip-flops 16–12 through 16–15 determine the time during which modification may be made on the U address portion of the instruction word held in Z11–23. This procedure is often called indexing, and only occurs in the present system if the bit held in the 0 position of the instruction word is a binary 1 value, i.e., is a value specifying that an indexing operation is to be performed during execution of the instruction word. Otherwise, no indexing of the instruction word U address is required, and Phase 2 operation need not be initiated. $\overline{A}$16–36 samples M0 which is that stage of the M register containing the 0 position bit (field II) of the instruction word after said word has been transferred from memory. At CP5 time following the setting of FF16–11, $\overline{A}$16–32 is now conditioned to respond to an operation value in the field II of the instruction word, such that it is enabled to set FF16–12 only if a 1 bit resides in M0. The setting of FF16–12 defines a time hereinafter referred to as Phase 2A, with this time being represented by a high signal from its 1 output and a low signal from its 0 output. If FF16–12 is set, then $\overline{A}$16–33 is enabled by the next CP2 pulse to set FF16–13 which defines a time known as Phase 2B. FF16–12 in turn is cleared at the CP4 time following its setting.

Flip-flops 16–14 and 16–15 are likewise set in succession by enabling signals from $\overline{A}$16–34 and $\overline{A}$16–35, respectively. Adjacent flip-flops overlap during their set conditions since each is cleared subsequent to the setting of the next following flip-flop. The set conditions of FF16–14 and FF16–15, respectively, define Phases 2C and 2D.

Flip-flops 16–16 and 16–17 define the time during which Field III, i.e., bit positions 1–3 of the instruction word is scanned and executed. This time must always be taken by the preferred embodiment, and is designated as Phase 3 of the instruction execution cycle. Phase 3 may be initiated in one of three ways. If a Phase 2 operation has occurred due to the required indexing of the U address, then FF16–15 eventually is set and in turn conditions $\overline{A}$16–36 to set FF16–16 at CP5 time following the CP2 time at which FF16–15 is set. The set condition of FF16–16 is termed Phase 3A. On the other hand, if no Phase 2 operation is required, then FF16–16 may be set upon termination of Phase 1 operation, thereby skipping Phase 2 entirely. This is accomplished by $\overline{A}$16–37 which is responsive to the set condition of FF16–11 as well as to an indication that M0 contains a binary 0 bit.

The third way in which FF16–16 may be set is during execution of a shift operation when there is a required shift of more than one place. The number of shifts required is indicated by the number held in the K register transefrred there from M5–7 as previously explained. Phase 3 must be performed each time a number is shifted one place to the left or to the right. Furthermore, the value in K register is reduced by one each time that such a one place shift occurs. Consequently, $\overline{A}$16–38 is responsive to the fact the value in K does not equal zero, as well as to a positive signal First Pass Complete which indicates that a single shift has been accomplished and that another shift may take place. Consequently, $\overline{A}$16–38 sets FF16–16 as many times during execution of the same instruction word as is required to reduce the value in K register to 0.

The setting of FF16–16 at CP5 time subsequently enables $\overline{A}$16–61 to set FF16–17 at CP2 time in order to define Phase 3B. FF16–16 is subsequently cleared at CP4 following the setting of FF16–17, and the latter is subsequently cleared at the next following CP1 time.

Flip-flops 16–18 through 16–25 define Phase 4 of the execution cycle during which Field IV, i.e., bit positions 4–7 of the instruction word is scanned and executed. As indicated previously, an option is granted to the programmer to skip this phase of the execution which may be accomplished by failing to place an operation value in said Field IV or, in other words, by setting octal digits 00 into Z4–7. Phase 4 operation is also skipped automatically if an output or input operation is called for by Field III, or if this field requires the operand to be shifted. On the other hand, if Phase 4 operation is initiated, its duration may vary according to the particular function being executed. The Phase 4 flip-flops additionally have the ability to recycle during execution of a Partial Product or Partial Divide function.

In order to set FF16–18 at the conclusion of Phase 3, it is necessary that $\overline{O}$16–40 generate a negative signal and that the signal Start Phase 4 With A be positive. If $\overline{O}$16–40 generates a negative signal, then $\overline{A}$16–39 must generate a positive output which in turn will enable $\overline{A}$16–41 at CP5 time during the set condition of 16–17. On the other hand, if $\overline{O}$16–40 generates a positive output, then the set condition of FF16–17 will cause $\overline{A}$16–39 to generate a negative signal and thus prevent $\overline{A}$16–41 from setting 16–18 at the CP5 time following the setting of FF16–17. The Start Phase 4 With A signal is normally positive except when the codes 13, 14 and 15 are held in Field IV of the instruction word. In order to enable $\overline{O}$16–40 to generate a negative output, all inputs must be positive. This is the case when Field IV contains bits other than zero (that is, when there is a value in Field IV which specifies a Phase 4 operation), when no shift operation is called for by the code in Field III, and when no input or output operation is called for by the code in Field III. However, in the event that all of these conditions are not present, then one or more of these inputs to $\overline{O}$16–40 will be negative which consequently generates a positive signal therefrom. Therefore, it is seen that a high signal from the numeral 1 output of FF16–17 in combination or coincident with CP5 conditions $\overline{A}$16–41 to respond or be enabled to set FF16–18 only for one of four conditions. For example, when Field IV of the instruction word does not contain a value specifying a Phase 4 operation, i.e. its bit positions 4–7 contain zeroes, then the signal $\overline{IV=0}$ is down, making the output of $\overline{O}$16–40 high and consequently the output of $\overline{A}$16–39 low so as to prevent the enabling of $\overline{A}$16–41. On the other hand, where there is an operation value (other than 13, 14, or 15) in Field IV (and further assuming that Field III does not require an other than normal interpretation of Field IV so that signals $\overline{Z3}$ and $\overline{Output}$ are high) then signal $\overline{IV=0}$ is also high, making high the output of $\overline{A}$16–39 so as to permit the response of $\overline{A}$16–41 when conditioned by CP5 and FF16–17. The set condition of FF16–18 is defined as Phase 4A, and enables the subsequent setting of the Phase 4B flip-flop 16–19 by virtue of the enabling of $\overline{A}$16–42 at the next following CP2 time. Flip-flops 16–20 and 16–21 are subsequently set in that order by respective $\overline{A}$ gates 16–43 and 16–44, with there being overlap between the set conditions of adjacent flip-flops in a manner similar to that described for the flip-flops of Phases 1, 2 and 3.

Upon completion of Phase 4D, Phase 4 itself may be terminated under certain conditions so that the remaining flip-flops 16–22 to 16–25 are not utilized and remain clear. Since these conditions will be described in detail at a later time, it is sufficient to say here that if Phase 4 is to be terminated with the setting of FF16–21, the next phase to be initiated will be either Phase 5 or Phase 1. However, if the duration of Phase 4 is longer than that occupied by the set times of FF16–18 to FF16–44, the signal $\overline{Phase\ 4\ Complete}$ is positive so that the set condition of FF16–21 enables $\overline{A}$16–45 to set FF16–22 at a next following CP5 time. This operation defines Phase 4E. Another way of setting FF16–22 is by enabling of $\overline{A}$16–46 which occurs when the Phase 4 operation is to be initiated with Phase 4E instead of with Phase 4A previously described. Thus, at the conclusion of Phase 3 when FF16–17 is set, $\overline{A}$16–46 will be fully conditioned at CP5 time so as to be responsive to any one of the Field IV operation values 13, 14, and 15 the presence of which is indicated by A signal Start Phase 4 with E. If said signal is positive, then the signal Start Phase 4 with A is negative which thereby prevents $\overline{A}$16–41 from setting FF16–18. However, it is to be noted that $\overline{A}$16–46 still requires a positive output from $\overline{A}$16–39, which in turn depends upon the existence of a negative signal from $\overline{O}$16–40 only appearing when both $\overline{Z3}$ and $\overline{Output}$ are high (signal $\overline{IV=0}$ must also obviously be high since a non-zero value is in the Field IV). Therefore, it may be seen that Phase 4, if not skipped, may be initiated at one of two points depending upon whether FF16–18 is set or whether FF16–22 is set. On the other hand, FF16–18 may be set, with FF16–22 being subsequently set if the Phase 4 operation is to continue beyond the setting of FF16–21. The setting of FF16–22 subsequently enables $\overline{A}$16–47 to set FF16–23 which defines Phase 4F.

If the Field IV function requires the setting of flip-flops 16–22 and 16–23, the setting of the latter normally marks the conclusion of the Phase 4 period with the exception of the functions Partial Product (16) and Partial Divide (17). These two functions require that the Phase 4 period be extended to include the setting of flip-flops 16–24 and 16–25, as well as the setting once again of flip-flops 16–18 to 16–23 during a second cycle. Where either one of these two functions is present, the signal Phase 4 Complete remains positive during the whole time that FF16–23 is in its set condition. Since FF16–25 is at this time in its clear condition, the positive signal is applied to all inputs of $\overline{A}$16–51 to enable same to simultaneously set both FF16–24 and FF16–18 so that Phases 4A and 4G occur simultaneously. At the next CP2 time following the setting of FF16–24, $\overline{A}$16–48 sets FF16–25 which thereupon initiates Phase 4H. However, it will be noted that when FF16–24 and FF16–25 are once set, they are cleared only by a negative signal Clear Phase 4G and H which does not appear until the beginning of the Phase 1 time for the next following instruction word. Therefore, Phases 4G and 4H must be distinguished from the Phases 4A through 4F in that their initiating flip-flops remain set for the duration of the instruction word execution. However, when FF16–18 has once been set again by the output from $\overline{A}$16–51, the setting of the flip-flops 16–19 through 16–23 proceeds as during the first cycle until FF16–23 is once again set. When FF16–23 is set once again, $\overline{A}$16–49 now detects the fact that both FF16–23 and FF16–25 are set so as to generate a significant negative output therefrom which thereupon creates a positive output from $\overline{O}$16–50. The positive output from $\overline{O}$16–50 indicates the termination of Phase 4, after which the program control may go to Phase 5 or may instead return to Phase 1 in the event that Phase 5 is to be skipped.

There are two other ways in which a positive signal may be generated from $\overline{O}$16–50. These are if the Phase 4 period is to terminate at the end of Phase 4D, or alternatively, is terminated at the end of Phase 4F. If either of these two situations prevail, then at the time that either FF16–21 or FF16–23 is set, the signal Phase 4 Complete goes negative, and thus permits $\overline{O}$16–50 to generate a positive output indicating the end of Phase 4. Furthermore, if Phase 4 itself is to be skipped due to a negative signal applied to $\overline{O}$16–40, then at the time that FF16–17 is set, the two positive inputs to $\overline{A}$16–39 permit it to generate a negative output therefrom which in turn produces a positive output from $\overline{O}$16–50. It will further be noted that any negative signal from $\overline{A}$16–39 prevents the setting of either FF16–18 or FF16–22.

Flip-flops 16–26 and 16–27 define the Phase 5 period during which time the result of the function performed during Phase 4 may be written into its proper memory register. Phase 5 is also entered in the event that the shift of a double length word is required. Another use for Phase 5 is in the determination of whether or not the skip of the next instruction should occur, due to either an overflow check on an add or subtraction operation, or if the value of a particular number is equal to or less than zero. Alternatively, Phase 5 may be skipped entirely if the programmer codes a 0 octal digit, ie., does not put a Phase 5 operation value, into Field V (bit positions 8–10) of the instruction word, or if a subroutine jump with a double operand (Field IV=II) is being performed during Phase 4. Either one of these latter two situations is detected by $\overline{O}$16–52 which is responsive to a negative input in order to generate a positive output to $\overline{A}$16–53. However, if there is a Field V operation value, as specified by an octal digit other than 0 in Field V of the instruction word, and if a subroutine jump with double operand is not being performed, then $\overline{O}$16–52 generates a negative output which in turn generates a positive output from $\overline{A}$16–53. Thus, upon generation of a positive signal from $\overline{O}$16–50 indicating the termination of Phase 4 (or the skipping of Phase 4) $\overline{A}$16–54 is fully conditioned at CP5 to respond to the presence of any Field V operation value and thus be enabled to set FF16–26 which defines Phase 5A. The setting of FF16–26 in turn subsequently sets FF16–27 by the enabling of $\overline{A}$16–55 at the next following CP2 time.

With the setting of flip-flop 16–27, its 0 output goes low to produce a positive output from $\overline{O}$16–56. On the other hand if Phase 5 is to be skipped entirely, then $\overline{O}$16–52 generates a positive output which, when coupled with the positive output from $\overline{O}$16–50, generates a negative output from $\overline{A}$16–53 which in turn prevents the setting of FF16–26 and at the same time produces a positive output from $\overline{O}$16–56. Consequently, this high output from $\overline{O}$16–56 indicates either the skipping or the termination of Phase 5. The output from $\overline{O}$16–56 is applied both to $\overline{A}$16–57 and to $\overline{A}$16–38. If a shift function is being performed so that the number in K register has not yet been reduced to zero, then the positive output from $\overline{O}$16–56 thereupon enables $\overline{A}$16–38 to set FF16—16 and thus initiates Phase 3 once again in order to perform another shift of one place. Hence, Phase 3 periods are periodically initiated by the output from $\overline{O}$16–56 until the count in register K has been reduced to zero, whereupon the signal $K=0$ becomes negative and thus prevents $\overline{A}$16–38 from setting FF16—16 upon occurrence of the positive output from $\overline{O}$16–56. At this time, therefore, the signal $K=0$ becomes positive which thus allows $\overline{A}$16–57 to respond to the positive output from $\overline{O}$16–56 and set FF16–10 to initiate a Phase 1 period which acquires the next instruction word to be executed. The signal $K=0$ is also positive in the event that no shift function was being performed, so that the operation may go directly into Phase 1 upon appearnace of the positive signal from $\overline{O}$16–56. As noted previously, the signal Start New Instruction from $\overline{A}$16–57 occurs at CP5 time.

Flip-flops 16–28, 16–29 and 16–30 define Phase 6 which is only initiated when information is to be written into the Permanent memory. The duration of this phase allows for the longer time required for writing into Permanent memory than is required for writing into the Variable memory. Hence, if a Phase 5 operation is initiated in order to perform the function of writing a result into a location in Permanent memory, Phase 1 cannot be initiated immediately upon termination of Phase 5 because of the fact that the signal Initiate Load Delay appears to set FF16–28 prior to the time when $\overline{A}$16–57 is sampled by the CP5 signal. Thus, if FF16–28 is set, its 0 output becomes low so that a positive output from $\overline{O}$16–56 has no effect at this time. Hence, the output from $\overline{A}$16–57 remains high until such a time as when the Permanent memory completes its storage and the address translation circuits then become free to accept the address of the next instruction word. When Permanent memory completes this storage operation, a signal Memory Resume appears therefrom which is positive and thus enables $\overline{A}$16–58 to set FF16–29. The setting of FF16–29 thereupon sets FF16–30 due to the enabling of $\overline{A}$16–59. When FF16–30 is set, its 0 output becomes negative which is fed back to $\overline{A}$16–56 and thus produces a positive output therefrom. At the same time, the now positive output from the 1 terminal of FF16–30 enables $\overline{A}$16–60 to clear FF16–28 at the next following CP4 time. When FF16–28 is cleared, $\overline{A}$16–57 receives positive signals on all of its inputs to thereby generate a significant negative output which in turn clears FF16–29 and sets FF16–10 to initiate the Phase 1 operation. FF16–30 is automatically cleared at CP1 time following its setting.

FIGURE 17 shows what commands are generated during Phase 1, these commands being employed to transfer information between registers and the like as has been described in connection with the preceding figures. FIGURE 17 shows that many of the commands are automatically generated merely by the fact that Phase 1 is performed and without regard to the codes residing in the instruction word fields. This is so, since Phase 1 is used for referencing the memory and acquiring a new instruction word to be placed into Z register. An attempt has been made in this figure and in the succeeding FIGURES 18 through 21 to indicate generally the clock pulse times at which the signals are generated. For example, during Phase 1A, the signals Clear M and P To S appear at CP1 time. The commands are actually clocked or gated by the $\overline{A}$ gates shown in FIGURE 22, since these same commands are also issued during other phases. However, where a command is only generated during a one particular phase, the clock pulse gate is normally shown in that phase generator figure since it is not common with any commands issued from other phase generator figures. For example, the signal Clear Quotient, DLL, DLR and Overflow is only issued during Phase 1A at CP2 time as evidenced by $\overline{A}$ gate 17–10 which is enabled by the positive signal Phase 1A. It should be appreciated that when the Phase 1A signal is positive, the Phase 1$\overline{A}$ signal is negative which, when applied to an $\overline{O}$ gate in FIGURE 22, results in a positive signal which can be clocked at the appropriate CP time.

As a further illustration of the arrangement of FIGURE 17, assume that Phase 1 is initiated by the setting of FF16–10 at CP5 time. The signal Phase 1A goes high and the signal Phase 1$\overline{A}$ goes low. Consequently, in FIGURE 22 the following $\overline{O}$ gates have high outputs due to the fact that at least one of their inputs is negative, being derived from the 0 side of FF16–10. These $\overline{O}$ gates are 22–10, 22–11, 22–15, 22–16, 22–17, 22–23, 22–24 and 22–25. Consequently, at CP1 time following the setting of FF16–10 $\overline{A}$ gates 22–31 and 22–32 generate significant negative outputs designated Clear M and P To S which set zeros into M register and transfer the address of the new instruction word from P register to S register, where it will be translated and used to reference memory in order to acquire the next instruction word to be executed. At CP2 time following the setting of FF16–10, significant negative outputs are obtained from $\overline{A}$ gates 22–36, 22–37 and 22–38 which in turn initiate the memory read circuits, clear P register of the address of the instruction word, and clear the Carry flip-flop in FIGURE 23. Also at CP2 time, $\overline{A}$17–10 is enabled to clear various others of the control flip-flops in FIGURE 23, as well as clearing flip-flops 16–24 and 16–25 previously described.

At CP3 time of Phase 1A, $\overline{A}$ gates 22–24, 22–45 and 22–46 generate significant negative outputs which clear M* register, Z11–23, and K register in preparation for receipt of the new instruction word, which first will be transferred from memory into the M register previously cleared at CP1 time. Also at CP3 time, $\overline{A}$17–11 generates a significant negative output which clears Z1–10. This completes the command signal generation during the first part of Phase 1 which has been designated as Phase 1A. The Phase 1B flip-flop 16–11 is set at CP2 time and thus is available by CP4 time to generate another set of commands to complete the acquisition of the instruction word and placement thereof into Z register. Thus, when FF16–11 is set, the signal Phase 1B goes high and Phase 1$\overline{B}$ goes low in FIGURE 17, with the latter being further directed to $\overline{O}$ gates 22–26, 22–27, and 22–28. These $\overline{O}$ gates consequently generate a positive output which is sampled at CP4 and CP5 time by their associated $\overline{A}$ gates 22–47, 22–48, and 22–49 in order to perform the following functions. The address of the instruction word just acquired is transferred from S register back to P and incremented by 1 in the manner previously described. Therefore, by CP4 time of the Phase 1 period, P register now contains the next sequential address of the following instruction word to be executed, said address being transferred from P to S during initiation of the next following Phase 1 period. Furthermore, by CP5 time of the Phase 1 cycle the instruction word currently being referenced from memory has been placed into M register by the memory read circuits, so that it may be transferred to the Z register by signals appearing from $\overline{A}$22–48 as well as from $\overline{A}$17–12. The instruction word in M register is further transferred to M*, while the three right most bits in Field IV of the instruction word are transferred from M5–7 to the K register in case a shift operation is required during Phase 3. These commands terminate Phase 1, since the instruction word has now been placed into Z register where its Fields III, IV and V subsequently will be translated during Phases 3 through 5, respectively.

FIGURE 18 illustrates the commands generated during Phase 2 if an indexing operation is required in order to modify the U address portion of the instruction word, said address portion residing in Z11–23. As before described in connection with FIGURE 16, Phase 2 is only entered in the event that the 0 position of the instruction word contains a binary "1" bit. If Phase 2 is initiated, then FF16–12 is set which makes negative the signal Phase 2$\overline{A}$. In FIGURE 18, this negative signal is applied to $\overline{O}$ gates 22–10, 22–12 and 22–15. These gates in turn become positive so that significant outputs are generated as the indicated clock pulse times from $\overline{A}$ gates 22–31, 22–33, and 22–36. Hence, at CP1 time following the setting of FF16–12, M register is cleared of the newly acquired instruction word, and the octal code 00005 is forced into S register in the manner previously described. This octal address refers to a location in the Variable memory where is stored a number to be used in incrementing the address contained in Z11–23. This modified U address will then be used during the subsequent phases whenever a U register is referenced, instead of the original address as contained in the instruction word when it was brought from memory during Phase 1.

The generation of a negative signal from $\overline{A}$22–36 at CP2 time of Phase 2 again commences operation of the memory read circuits in order to withdraw the modifying number from AU location 00005 and place same into M register. It is important here to note that although M register is cleared at the beginning of Phase 2, M* register still retains the original instruction word which was placed therein during CP5 time of Phase 1. Therefore, when $\overline{A}$18–10 is enabled at CP5 time to generate the signal Adder To Z11–23, the output from adder positions 11–23 at this time is the sum of the two numbers respectively held in M11–23 and M*11–23. Thus, the original instruction word U address portion has been modified by the addition thereto of the number taken from Variable memory location 00005. This modified U address is placed back into Z11–23, which had been cleared of its original U address during CP3 of Phase 2. The commands generated during Phase 2 at CP3 and CP5 times are due to the respective settings of flip-flops 16–14 and 16–15.

FIGURE 19 shows the circuits for generating commands during Phase 3 of the instruction execution cycle. As in FIGURES 17 and 18, some of the commands in FIGURE 19 are actually clocked by gates in FIGURE 22 since these commands are common to more than just one phase. However, in Phase 3 particular commands to be generated therein depend upon the translation of Field III of the instruction word residing in Z1–3. The translator circuits for this field have previously been described in connection with FIGURE 13. Therefore, it will be noted in FIGURE 19 that several of the commands will be generated only in response to certain outputs from FIGURE 13, whereas other commands from FIGURE 19 are generated automatically merely by the fact that Phase 3 is being performed. Among the former are such commands as 1 To S and Z11–23 To S which require the presence of the signals Reference X and Reference U, respectively. Thus, $\bar{A}$19–10 is only enabled to generate the command 1 To S during Phase 3A time if it detects the positive signal Reference X, which in turn depends upon an octal value of four or five being held in Z1–3. It will be noted that the commands 1 To S and Z11–23 To S cannot be produced simultaneously in FIGURE 19. Among the commands that are generated automatically in Phase 3 are those such as Clear M clocked at CP1 time, Initiate Memory clocked at CP2 time, and Clear M* clocked at CP3 time. The commands M To Output, Input To M and Clear Channel are directed to the external peripheral units for controlling their operation in a well known fashion whenever information is to be transferred between the input-output units and the internal computer components. A more complete explanation of the operation in FIGURE 19 is best delayed until the description in subsequent paragraphs of the execution of some typical instruction words, since only then will it be possible to appreciate the interaction between Phases 3, 4 and 5 and the effect that octal codes in one may have the interpretation of the octal codes in another.

FIGURE 20 shows the command generator circuits for Phase 4 operation during which time the octal digits in Z4–7 are translated and utilized to generate the signals required for their execution. As in the preceding command generator figures, those output signals from FIGURE 20 which are clocked by gates in FIGURE 22 are denoted by the particular CP time at which they are gated, whereas those commands which are unique to Phase 4 operation are generated from $\bar{A}$ circuits shown in FIGURE 20 itself. To better understand the operation in FIGURE 20, its detailed explanation awaits description of the execution of some typical instructions which will follow in subsequent paragraphs.

FIGURE 21 shows the command generator circuits for executing the functions defined by the octal digit contained in Z8–10, which holds Field V of the instruction word. The arrangement and interpretation of FIGURE 21 is identical to that of the preceding FIGURES 17 through 20, and the operation of the Phase 5 command generator circuits will be best understood in the following descriptions of some typical instruction word executions.

FIGURE 23 shows certain memory and arithmetic control flip-flops. FF23–10, for example, can be set by the signal Mask To DD0–23. The set condition of FF23–10 in turn makes positive its 1 output to thereby condition $\bar{A}$ gates 10–82 through 10–105 in FIGURE 10. As before explained, the enabling of this group of $\bar{A}$ gates in FIGURE 10 writes "1" bits back into the memory location whenever corresponding order stages of the M and M* registers contain "1" bits. In similar fashion, flip-flops 23–11, 23–12 and 23–13 are set by the indicated commands from the command generator figures in order to condition various groups of the A gates in FIGURE 10 in order to shift left or right one place, or to transfer the Adder output into the memory. There is no flip-flop required to generate the signal M To DD, since this signal is indicated by providing $\bar{A}$23–14 and I23–15 to detect the fact that all of the flip-flops 23–10 through 23–13 are in their clear condition. However, if any one of the flip-flops 23–10 through 23–13 is set, then $\bar{A}$23–14 must generate a positive signal due to the negative input thereto, which in turn produces a negative signal from I23–15. If any of these flip-flops is set, it is subsequently cleared by the next CP1 pulse.

Flip-flop 23–17, when cleared, permits information to be transferred from the memory, via the Strobe Gates, into the M register. This transfer is normally performed immediately subsequent to the receipt by the memory of the signal Initiate Memory, since said signal causes the memory read circuits to energize the proper drive lines in order to read information from the core or film storage. However, if FF23–17 is set by a signal from FIGURE 22, the Strobe Gates are blocked from passing information from memory into the M register. Hence, whenever it is required to store new information into a memory location, information must first be erased from that memory location in preparation for receipt of the new. Since the only way that information can be so erased from a memory location is by energizing the memory read circuits, it is necessary to block these Strobe Gates at this time in order to prevent this information from memory from being placed in M register and thus destroying the new information intended for storage into memory. Consequently, FF23–17 must be set when the function is to merely erase a memory location and insert new information therein. If set, FF23–17 is cleared at the next following CP6 time.

Flip-flop 23–19 is provided to indicate whether or not an overflow occurs upon adding the contents of M* register to that of M register. Overflow occurs whenever the sum exceeds the capacity of the fractional binary arithmetic registers, i.e., $-1 \leq x < +1$. For example, if $+\frac{5}{8}$ is added to $+\frac{1}{8}$ the sum $+\frac{6}{8}$ is within range and overflow does not occur. However, if $+\frac{5}{8}$ is added to $+\frac{3}{8}$, the sum of $+1$ exceeds the capacity of the machine and overflow does occur. Similarly, if $-\frac{5}{8}$ is added to $-\frac{4}{8}$, the sum of $-\frac{9}{8}$ is outside the register capacity and overflow occurs. The flip-flop 23–19 is initially cleared by the signal Clear Quotient, DLL, DLR and Overflow generated from FIGURE 17 during Phase 1. When cleared, the 0 output of FF23–19 is high while the 1 output is low. If FF23–19 is in its cleared condition at the time it is sampled during Phase 5, it indicates that an overflow has occurred during the addition operation which in turn requires that the next instruction, whose address is in P register, be withdrawn and executed. Normally, this next instruction is a jump instruction which leads into error correcting subroutine. However, if flip-flop 23–19 is set during Phase 4, then its 1 output becomes high thus indicating that no overflow has occurred. In this case, the P register contents is incremented by 1 during Phase 5 so that a skip occurs in the program. Therefore, it is necessary to examine the sign position of M, M* and Adder at the time of addition in order to determine if overflow has occurred, and if not, to set FF23–19 to its 1 state. This setting function is performed by enabling $\bar{A}$23–20 to generate a significant negative output, which requires that all inputs thereto must be positive. During Phase 4, a negative signal Check Overflow from FIGURE 20 is applied to I23–21 which generates a positive output and thus conditions $\bar{A}$23–20 to set FF23–19 if the other input thereto is also positive. The other input to $\bar{A}$23–20 is derived from $\bar{O}$23–22 which, to be positive, must have at least one negative input thereto. Inputs to $\bar{O}$23–22 are derived from $\bar{A}$23–23 and $\bar{A}$23–26, which in turn respectively sample the sign bits of both operands and of the sum as contained in M0, M*0, and Adder 0.

The detection of a no overflow condition by the circuitry in FIGURE 23 is best understood by reference to the following two examples. For the sake of clarity, only the sign bit to the left of the binary point and three bits to the right of the binary point are shown for each operand and for the sum.

EXAMPLE 1

```
0.101 (+5/8)   M Register
0.001 (+1/8)   M* Register
—————————
0.110 (+6/8)   Adder
```

EXAMPLE 2

```
1.101 (−3/8)   M Register
1.101 (−3/8)   M* Register
—————————
1.010 (−6/8)   Adder
```

In Example 1 above, assume that +⅝ is added to +⅛ to form the sum of +⅝, which is within the capacity of the arithmetic registers. It will be noted that both M0 M*0 and Adder 0 hold binary zero values. Since the output from the Adder position 0 is thus negative, it is inverted by I23–25 and applied to one input of $\overline{A}$23–23. Furthermore, $\overline{A}$9–10 generates a significant negative output due to the fact that it detects "0" bits in both M0 and M*0, said negative signal being inverted by I23–24 to apply another positive signal to $\overline{A}$23–23. This therefore results in a negative signal applied to $\overline{O}$23–22 which in turn enables $\overline{A}$23–20 at the check overflow time to set FF23–19. Thus, for the condition shown by Example 1, FF23–19 is set which therefore indicates that no overflow has occurred.

Example 2 above also shows the situation wherein no overflow occurs. Here, −⅜ is added to −⅜ with the sum being −⅝. In this case, all sign bits are binary ones. The output from Adder position 0 is therefore high and applies a positive signal to one input of $\overline{A}$23–26 in FIGURE 23. In FIGURE 19, $\overline{A}$9–34 generates a low output because of 1's in both M0 and M*0, with said negative output being inverted by I23–27 and applied to $\overline{A}$23–26 to thereby generate a positive signal from $\overline{O}$23–22. Thus, at the check overflow time determined by the negative signal from FIGURE 20, $\overline{A}$23–20 again generates a negative output which sets FF23–19 to indicate no overflow. Consequently, in order to set FF23–19, the sign bits of both operands and of the sum must be identical as shown in either Example 1 or Example 2. For any other condition, that is, where the sign bits are not identical, the sum exceeds the capacity of the machine and so $\overline{A}$23–20 fails to set FF23–19.

Flip-flops 23–28 through 23–32 are employed to determine the value of the bit placed into position 0 of a memory register during a right shift operation. As will be recalled from the description of FIGURE 10, during a right shift operation $\overline{A}$10–106 is responsive to the signal Left End to DD. In similar fashion, flip-flops 23–33 through 23–36 determine the value of the bit placed into position 23 of a memory register during a left shift operation. This is done by making $\overline{A}$10–153 responsive to the signal Right End To DD. For the shift right one place of a single length word, it will be recalled from the prior discussion that the value placed into position 0 of the memory register is the value of the sign of the number shifted, whether it be 0 or 1. The number to be shifted right is first placed into M register and from there is transferred back into memory via $\overline{A}$10–106 through 10–129. While in the M register, M0, which contains the sign bit of the number, is sampled during Phase 3A by the set condition of FF23–11 so that $\overline{A}$23–37 will set FF23–32 if M0 contains a "1" bit. If not, then FF23–32 remains clear. If FF23–32 is set, its 0 output goes low so that $\overline{O}$23–38 generates a positive signal which enables $\overline{A}$10–106 to place a "1" bit into position 0 of the memory register upon transfer of the number from M register to the memory. Therefore, the value of the sign bit of the number prior to the shift will be retained in the sign position of the newly shifted number as it is stored into the memory.

Where a double length word (48 bits) is to be shifted right one place, the left hand portion (24 bits) of the word is first shifted right one place during Phase 3, and right hand portion of the word (24 bits) is then shifted right one place during Phase 5. During Phase 3, the left hand portion of the double length word maintains the original sign bit because of the operation of FF23–32 just described. However, during Phase 3 the bit residing in position 23 of the number cannot be stored into the memory register since the group of A gates 10–106 through 10–129 makes no provision for sampling position 23 of the M register. Instead, this bit in position 23 of the left hand portion of the word is stored in flip-flop 23–28 for use during Phase 5 when the right hand portion of the word is shifted right one place. Thus, during Phase 3 the negative signal M23 To DLR is generated from FIGURE 22 which is inverted via I23–39 and applied to condition $\overline{A}$ gates 23–40 and 23–41. These $\overline{A}$ gates examine M23 so that upon occurrence of this gating signal, FF23–28 is placed in a state, either clear or set, indicating the value of the bit residing in M23. If FF23–28 is set at this time, it applies a positive input to $\overline{A}$23–43 so that when FF23–29 is set during Phase 5 by the indicated signal, $\overline{A}$23–43 generates a negative output which in turn raises the output from $\overline{O}$23–38 and so inserts a "1" bit into the 0 position of the right hand portion of the double length word. This bit is the least significant bit of the left hand portion of the double length word previously shifted during Phase 3. If FF23–28 is not set during Phase 3 due to the fact that the bit in M23 is 0, then, of course, a 0 bit is placed into position 0 of the memory register to which the right hand portion of the word is shifted during Phase 5.

Flip-flops 23–33 to 23–36 perform somewhat similar functions whenever a left shift is required. As an example, for a left shift of one place of a double length word, the right hand portion of the word is first shifted left one place during Phase 3 so that its leftmost bit from its position 0 is placed into FF23–33 by means of $\overline{A}$23–49 and 23–50 which sample the contents of M0. This occurs upon receipt of the nagtive signal M0 To DLL applied by I23–51. Subsequently, during Phase 5 the left hand portion of the double length word is shifted left one place and at the same time FF23–34 is set so that $\overline{A}$23–53 samples the contents of FF23–33. If FF23–33 has been set in Phase 3, thus indicating that a binary 1 bit resides in the sign position of the right hand portion of the double length word, then $\overline{O}$23–54 places a "1" bit into position 23 of the left hand portion of the double length word during the Phase 5 shift.

The Quotient flip-flop 23–35 is employed during the Partial Divide function in order to place into memory each bit of the quotient as it is generated. It is normally cleared at each CP1 time and set by a negative signal Set Quotient from FIGURE 20. When it is time to transfer the quotient bit into the memory register during a left shift operation, flip-flop 23–36 is set by the signal Quotient To DD23 to enable $\overline{A}$23–55 if FF23–35 is set. In this case, a binary 1 will be read into position 23 of the memory location. On the other hand, if FF23–35 is clear at the time that FF23–36 is set, then $\overline{A}$23–55 continues to generate a positive output, as does $\overline{A}$23–53, so that $\overline{O}$23–54 generates a negative output indicating a quotient bit of value 0.

Flip-flop 23–30 is employed during a Partial Product operation to store any carry value of 1 which may be generated from the sign position 0 of the adder. If the addition of the contents of M and M* registers during formulation of a product bit will result in an overflow from the adder position, then one of the signals $\overline{M0} \cdot \overline{M*0}$ or Carry Bit 0 is negative, thus generating a positive output from $\overline{O}$23–44 which, when gated at $\overline{A}$23–45 by a positive signal from I23–46 (due to a significant negative signal Check Carry), sets FF23–30. FF23–31 is set during the Partial Product function when the content of M register is transferred into A register in Variable Memory with a right shift. The setting of FF23–31 causes FF23–30 to be sampled at this shift time in order to place either a 0 or a 1 bit into position 0 of A register. Thus, the overflow will be taken into consideration during the formulation of the next higher product bit.

(3) OPERATION

The remaining FIGURES 24 through 29 are timing diagrams illustrating the execution, beginning with Phase 3, of some typical instructions in the repertoire. These timing diagrams are provided to clarify the operation of the invention, but it is impossible to provide timing diagrams for every conceivable instruction which may be made up as a result of the novel micro programming format of the instruction word. As just mentioned, each timing diagram begins with the initiation of Phase 3, it being assumed that Phase 1 has already been performed so that the instruction word to be executed now resides in the Z register. Furthermore, it is assumed that Phase 3 has been entered either directly from Phase 1, or from Phase 2 if position 0 of the instruction word contains a binary 1. Since the Phase 1 and Phase 2 command generators of FIGURES 17 and 18 have been described in some detail, it is believed that no further explanation of the operation of the device during Phase 1 and Phase 2 is necessary at this time.

In the timing diagrams to be discussed, the content of each register under consideration is indicated by an appropriate legend which is enclosed by a square wave whose end limits indicate the time during which the register holds this particular value. For example, in FIGURE 24 it is seen that S register is filled at CP1 time of Phase 3A with the U address portion of the instruction word contained in Z11–23. The S register continues to hold this U address until the next following CP6 time whereupon it is automatically cleared by the enabling of $\overline{A}$6–9. As mentioned before, the parenthesis surrounding a letter identifying a register indicates that the content of this register is contained in the register under consideration. For example, in FIGURE 24 the M register is filled at CP4 time of Phase 3A by the contents of U register whose address is held in Z11–23. This U register content is cleared from M register at the next following CP1 time, and the M register is filled at the next following MP4 time by the contents of the A register in the Variable Memory.

With regard to the setting and clearing of various control flip-flops, these operations are indicated in the timing diagrams by the square wave which normally indicates that the indicated flip-flop has been set and is performing its control function.

With respect to the instruction address contained in P register and S register, the letters CI indicate that the address therein is that of the instruction currently being executed with which the timing diagram deals. The letters NI indicate the address of the next instruction to be executed subsequent to completion of the execution of the current instruction.

3.1 Arithmetic

Figures 24, 25:
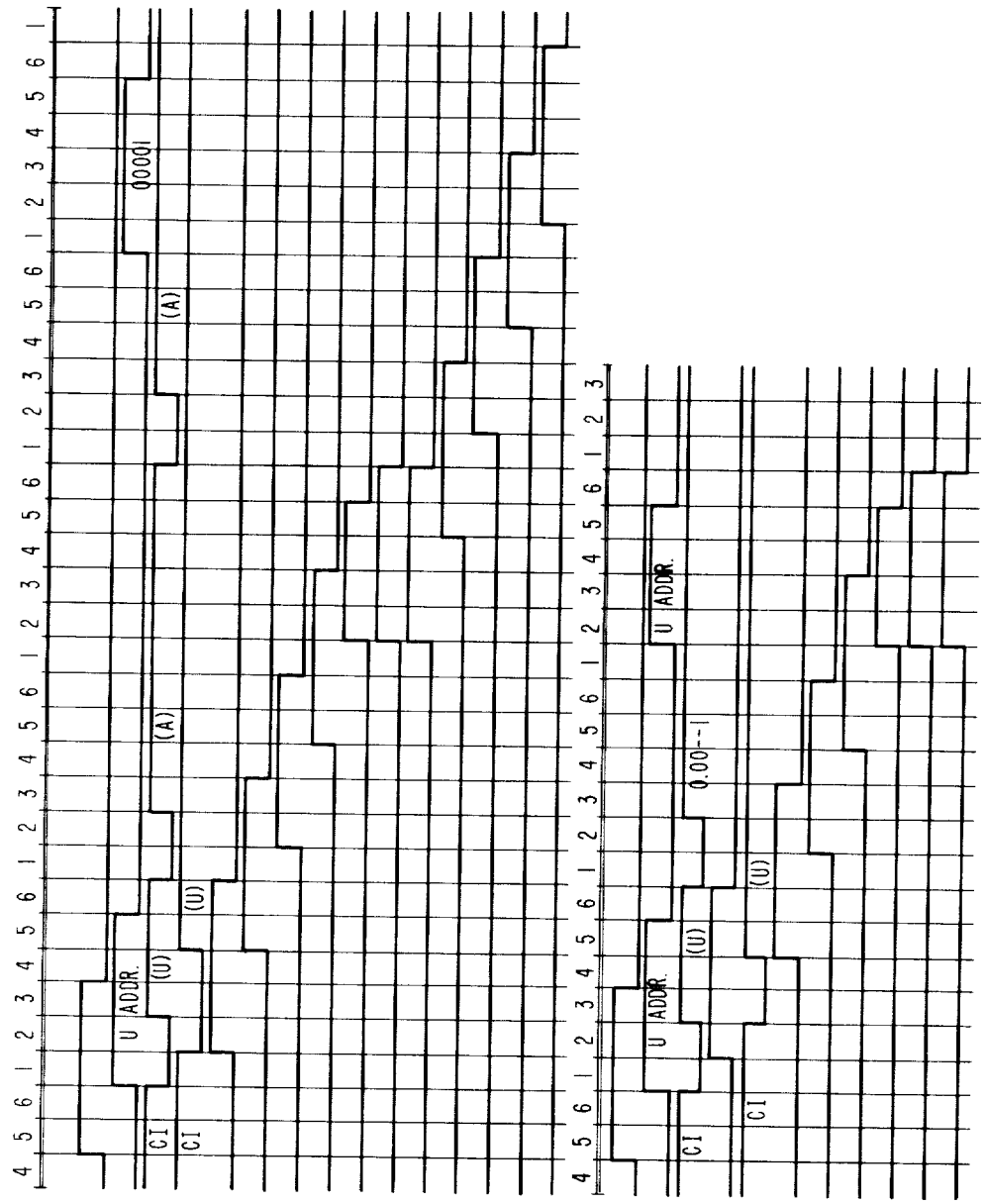

FIGURE 24 is a timing diagram illustrating the execution of an instruction having the following octal digits in its Fields III, IV and V, respectively: 2/01/1. In executing this instruction, a U register in the memory is referenced during Phase 3 and its contents withdrawn and placed in M register and in M* register. During Phase 4, the A register in the Variable memory (at address 00001) is referenced and its contents placed in M register for addition to the U register contents in M*. The sum from this addition is thereupon placed back into the Variable memory A register during Phase 4. During Phase 5, the A register in Variable memory is referenced and the sum withdrawn and placed into M register from whence it will then be directed to the X register (location 00001) in the Variable memory. Thus, the basic operation of the selected instruction is to add $(A)+(U)$ and place the sum in X.

The manner in which the circuitry of the present invention performs or executes this instruction is as follows, with particular reference being made to FIGURE 24. At CP5 time, Phase 3A is turned on which thereafter permits $\overline{A}$19–11 to transfer the contents of Z11–23 into S register because of the presence of the signal Reference U from FIGURE 13. S register now contains the U address portion of the current instruction word held in the Z register. M register is cleared automatically at CP1 time. Furthermore, at CP2 time K register is cleared of the three rightmost bits of Field IV inasmuch as $\overline{A}$19–16 determines that no shift operation will be required during execution of this instruction. Therefore, K register equals a 0 value for the remainder of the execution time. Also at CP2 time the M* register is cleared, and a signal Initiate Memory is generated in order to commence operation of the memory read circuits. Thus, by CP2 time of Phase 3A the memory begins to reference a location whose address is contained in S register. The information contained in this U register within the memory is withdrawn and sent to the M register via the Strobe Gates. Furthermore, if the U register is in Variable memory, then the information must be restored therein immediately subsequent to the read operation so that it will not be destroyed. This is performed by generating the signal M To DD from $\overline{A}$23–14 since none of the flip-flops 23–10 through 23–13 has been set at this time. Consequently, the information from U register which is now in M register is sampled therefrom and read back into the Variable memory at the location in which it was originally found. The S register maintains the U address until CP6 of this machine cycle.

During Phase 3A, M* register is also automatically cleared at CP3 time so that at CP5 time of Phase 3B the contents of M may be transferred to M* by a signal generated from $\overline{A}$19–20. $\overline{A}$19–20 is enabled because the operation to be performed during Phase 4 is that of Add as indicated by the octal digits 01 in Field IV of the instruction word. Therefore, by CP5 time of Phase 3B, both M and M* registers contain the number referenced from the U register in the memory.

On completion of Phase 3B, Phase 4A is initiated since all of the inputs to $\overline{O}$16–40 are positive. In FIGURE 20, $\overline{A}$20–17 generates a significant negative output which in turn generates a positive output from $\overline{O}$20–50 so that A20–51 produces a positive output during Phase 4A. The positive output from A20–51 in turn generates a significant negative signal from I20–49 so that M register is cleared at CP1 time of Phase 4A. $\overline{A}$20–25 is enabled to generate a negative output which in turn makes the output of $\overline{O}$20–63 positive and thus generate the command Initiate Memory at CP2 time which commences operation of the memory read circuits. It should be noted, however, that by CP2 time of Phase 4A the S register has been cleared of its previous contents so that the octal address of 00000 resides therein. This is the address of A register in the Variable memory whose contents are now withdrawn and placed into M register via the Strobe Gates.

Phases 4B and 4C now operate in succession. At CP2 time of Phase 4C, A20–61 generates a positive output which initiates the memory read circuits. Since S register continues to maintain the octal address of 00000, the A register is again referenced and an attempt is made to pass its contents again to M register via the Strobe Gates. However, $\overline{A}$20–26 is now enabled at Phase 4C time in order to make positive the output from $\overline{O}$20–69 and thus set flip-flop 23–17 to disable the Strobe Gates from passing the contents of A register into M register. Furthermore, $\overline{A}$20–31 is enabled during Phase 4C to generate the signal Adder To DD0–23 which in turn sets FF23–13 and so permits the adder output to be transferred back into A register during the restore cycle of the memory read-write circuits. Hence, the content of U register has been added to the original content of A register and the sum written back into A register during Phase 4. Phase 4D is initiated subsequent to initiation of Phase 4C.

Although Phase 4D is now on by CP2 time, neither A20–40 nor A20–41 is enabled to change the output from I20–88 to a negative signal. This is so because neither of these A gates has positive signals to all of its inputs. Therefore, the signal $\overline{\text{Phase 4 Complete}}$ from 120–88 remains high since O20–87 receives no positive inputs from any of the A gates shown. Consequently, Phases 4E and 4F are turned on as shown in FIGURE 24. During Phase 4E, $\overline{A}$20–13 is enabled to generate a significant negative output which in turn supplies a positive output from $\overline{O}$20–46 and thus clears M register at CP1 time of this phase. The positive output from $\overline{O}$20–46 is also applied to O20–65 to generate the signal Initiate Memory at CP2 time. Since S register continues to remain empty, the A register in the Variable memory is again referenced and the contents therein directed to M register. Therefore, during Phases 4E and 4F, the sum of the addition operation is transferred from A register to M register in preparation for a transfer from M register to X register during Phase 5. The sum is also restored back into A register automatically by the Variable memory read-write circuits, since again the signal M To DD is present from I22–15.

During Phase 4F time, A20–42 is enabled since neither the function Partial Product or Partial Divide is being executed. Therefore, during Phase 4F the signal from 120–88 becomes negative and thus produces a positive signal from $\overline{O}$16–50. This signal in turn is applied to $\overline{A}$16–54 and $\overline{A}$16–53, with the latter receiving a negative signal from $\overline{O}$16–52 because of the absence of any negative inputs thereto. Consequently, Phase 5A commences immediately subsequent to Phase 4F.

During Phase 5A, $\overline{A}$21–10 generates the signal 1 To S which forces the octal value 00001 into S register. This is the address of the X register in Variable memory. At CP2 time, $\overline{A}$21–18 is enabled to generate a negative output which sets the Disable Strobe flip-flop 23–17 as well as providing the Initiate Memory signal via $\overline{O}$21–21. Consequently, the Variable memory is referenced at the X register address and attempts to send information therefrom through the Strobe Gates in M register. However, this is not possible since the Strobe Gates are now disabled. This prevents the old information in X register from disturbing or mutilating the new information contained in M register. It will be recalled that the information held by M register at this time is the sum of the addition which took place during Phase 4. Upon the restore cycle being performed in the Variable memory, the presence of the signal M To DD from $\overline{A}$23–14 allows the sum from M register to be written into X register. Thus, the execution of the instruction is completed, and upon Phase 5B being initiated, $\overline{A}$16–57 will subsequently generate the Start New Instruction signal at the next CP5 time. This signal in turn initiates Phase 1A again in order to withdraw from memory the next instruction whose address has resided in P register all during Phases 3, 4 and 5 just discussed.

A slightly different instruction from that discussed above will now be described wherein the octal digit 4 or the octal digit 5 is stored in Field V of the instruction instead of the octal digit 1. As mentioned before, codes 4 and 5 in Field V are interpreted as overflow check codes if Field IV is not to be interpreted as a shift indicator. Thus, the slightly modified instruction now to be discussed has the following codes in Fields III, IV and V: 2/01/4 or 5. Phases 3 and 4 of this instruction are executed in exactly the same way as described above in connection with FIGURE 24. It will further be noted that during Phase 4D, $\overline{A}$20–86 generates a signal which allows flip-flop 23–19 to be set in the event that no overflow occurred during the addition process. This signal Check Overflow was also generated during Phase 4D in FIGURE 24; however, the condition of flip-flop 23–19 had no significance for the instruction of FIGURE 24 and was therefore not taken into account during Phase 5. On the other hand, in the instruction now under consideration which has either octal digits 4 or 5 in Field V, there is a change in function during Phase 5. During Phase 5B, $\overline{A}$21–28 samples the output of $\overline{O}$21–26 which in turn is fed by three $\overline{A}$ gates. One of these $\overline{A}$ gates 21–25 examines the output of FF23–19 in the event that a digit 4 or 5 is in Field V of the instruction word in Z register. If FF23–19 is set at the time that Phase 5B occurs, then $\overline{A}$21–25 is enabled to generate a negative output which in turn raises the output from $\overline{O}$21–26 and allows $\overline{A}$21–28 to generate the signal S+1 To P at CP4 time. However, prior to CP4 time, the positive output from $\overline{O}$21–26 also permits $\overline{A}$21–15 to transfer the contents of P register to S register during Phase 5A. P register at the beginning of Phase 5A holds the address of the next instruction to be executed, which is higher in value by 1 than the address of the current instruction being executed. The output from $\overline{A}$21–28 transfers this next instruction address from S back to P and increments it by 1 so that the address residing in P register at the end of Phase 5P is actually higher in value by 2 than the address of the instruction currently being performed. Thus, a skip of one instruction in the program has been made due to the fact that no overflow occurred during the summation process of Phase 4. However, if an overflow had occurred, then flip-flop 23–19 remains clear so that $\overline{A}$21–25 cannot be enabled. This, therefore, would prevent generation of the signals P To S and S+1 To P from $\overline{A}$21–15 and 21–28, respectively. In this situation, the content of P register is not disturbed so that the next instruction acquired during the following Phase 1 is from a memory location whose address is only higher in value by 1 than the address of the instruction currently being performed. It is important to note that with this overflow check during Phase 5, there is no transfer of the sum in M register to any of the internal memory registers as was illustrated in FIGURE 24. However, it will be recalled that the sum has already been placed into A register during Phase 4 as a normal consequence of the addition process. Therefore, the sum is retained in the A register.

In the event that the octal digits 02 are coded in Field IV of the instruction word, a subtraction operation occurs during Phase 4 instead of the addition previously described. To accomplish this, $\overline{A}$19–21 transfers the 1's complement of M to M* at CP5 time. During Phase 4, this 1's complement in M* register is added to the number in M register (the latter having been received from the Variable memory A register), together with an input carry of 1 to the lowest order position 23 of the adder. This carry of 1 is introduced to Adder 23 because of the positive signal Subtract+Complement applied to I9–58. Consequently, the 2's complement of the number from the U register is effectively added to the number from the A register, and the sum (or difference) transferred from the adder output back into A register in the manner previously described.

FIGURE 25 is a timing diagram illustrating the execution of an instruction having the following octal digits in Fields III, IV and V, respectively: 2/06/0. During Phase 3, this instruction references memory at the U address carried by the instruction word and transfers a number into M and M* registers as well as restoring U register if necessary. M register is then cleared and position 23 thereof set so that when M and M* registers are held together, 1 is added to the lowest order position of the operand in M* register. This addition occurs during Phase 4. Also during Phase 4 the sum of M+1 is transferred back into the memory U register. Since Field V contains a 0 octal bit, there will be no Phase 5 and so the number incremented by 1 is retained in U register.

Referring now to FIGURE 19 and FIGURE 25, it is seen that at CP1 time following the setting of Phase 3A flip-flop 16—16, $\overline{A}$19–11 transfers the contents of Z11–23 into S register for referencing memory at a U register location. M register is also cleared at this time. At CP2 time, the memory read-write circuits are initiated to transfer the number to be incremented into M register from the U register location. M* register is cleared at CP3 and the number from M register transferred thereto. S register is cleared of the U address at CP6 time.

In FIGURE 16, Phase 4A flip-flop 16–18 is set since all of the inputs to $\overline{O}$16–40 and to $\overline{A}$16–41 are positive during Phase 3B. At CP1 time of Phase 4A, a negative output from $\overline{A}$20–17 permits $\overline{A}$20–51 to generate a negative signal which in turn clears M register of the number to be incremented. However, this number is still retained in M* register. At CP3 of Phase 4A, $\overline{A}$20, 80 sets M23 which enters the value $+1/2^{23}$ into M register. During Phase 4C, the negative signal to $\overline{O}$20–20 causes $\overline{A}$20–52 to again transfer Z11–23 into S register in order that the memory U register may again be referenced to place therein its original value incremented by 1. A20–61 is effective at CP2 time of Phase 4C to initiate memory operation, but at the same time $\overline{A}$20–26 sets the Disable Strobe flip-flop 23–17 to prevent the original contents of U register from being read into M register and thus destroying the value 0.00–1 previously set in there during Phase 4A. Also at CP2 time of Phase 4C, $\overline{A}$20–31 sets FF23–13 which transfers the adder output to memory so that the sum of M and M* may be restored into the U register by the memory write circuits.

Since Field V of the instruction word contains a 0 octal digit, and since Z4 holds a binary "0" bit, A20–41 is enabled at Phase 4D to make negative the signal $\overline{\text{Phase 4 Complete}}$. Consequently, $\overline{A}$16–45 cannot set FF16–22 at CP5 time of Phase 4D, but instead $\overline{O}$16–50 is enabled to pass a positive signal. However, the positive signal from $\overline{O}$16–50 is unable to cause the setting of the Phase 5A flip-flop 16–26 because of a negative signal to $\overline{O}$16–52. Therefore, at the termination of Phase 4D operation, $\overline{A}$16–57 generates the Start New Instruction signal which sets Phase 1A in order to acquire the next instruction word from memory at the address held in P register.

The instructions for adding 2 or subtracting 1 from the contents of a U register location are very similar to the instruction just described. For example, when Field IV of the instruction word contains octal digits 05, $\overline{A}$20–79 sets M22 during Phase 4A instead of M23. This forces the binary number 0.00–10 into M register so that when M and M* are summed during Phase 4C, the value 2 is added to the number from U register. If the function field of the instruction word contains the digits 07, then the following operation is seen to occur. At CP3 time of Phase 4A, $\overline{A}$20–34 clears M* of the U register number previously placed there during Phase 3. As was previously explained, M* is always cleared in such a way that each of its stages contains a binary 1. This configuration, in the 2's complement fractional arithmetic employed in the present system, has a decimal value of $-1/2^{23}$. Therefore, if this number is added to the original U register number in M, then 1 will be subtracted from the lowest order position of the M register number. M register itself is not cleared during Phase 4A because of the now negative input to $\overline{A}$20–17 due to the octal code digit 7. The remaining part of Phase 4 is the same as described in connection with FIGURE 25, since addition of the M and M* register contents is performed and the result put back into the memory U register.

As was noted in connection with FIGURE 25, Phase 4 had a duration ending with Phase 4D, since a 0 digit was coded in Field V. If this instruction had other than a 0 digit in Field V, then A20–41 would not have been enabled, and consequently Phase 4E and 4F would be performed in order to transfer the incremented number from U register back into M register in preparation for a Phase 5 transfer.

Means are further provided to cause a skip of the next programmed instruction in the event that the content of some register has a value within a specified range of values. For example, the octal 6 in Field V of an instruction word requires the initiation of Phase 5 during which time the address in P register is incremented by 1 if the number in M register equals 0. The M register number can either be the result of an arithmetic operation performed during Phase 4, or it may be a number obtained from some register during the transfer Phase 3. During Phase 5, $\overline{A}$21–23 is enabled if M register is empty so as to transfer P To S by the signal from $\overline{A}$21–15. Subsequently, $\overline{A}$21–28 transfers S register contents back to P with the addition of 1 thereto. When octal digit 7 is in Field V, an instruction skip also occurs in similar fashion if the content of M register is negative, as evidenced by a 1 bit in M0. In this case, $\overline{A}$21–24 is enabled during Phase 5 to increment the next instruction address in P register by 1.

The multiplication subroutine written for the computer utilizes the fact that the computer employs a fractional 2's complement arithmetic. The subroutine also makes use of the fact that any number may be written as the sum of its parts. Any number, N, given in fractional 2's complement form, can be written in this form:

$$N = N_0 + N_1$$

where $N_0$ represents the sign bit of N, and is either a zero or a minus one, and $N_1$ is the fractional portion of the original N. Applying this idea to the product of two numbers, where W is the multiplicand and Y is the multiplier.

$$Y \cdot W = (Y_0 + Y_1)(W_0 + W_1)$$
$$= Y_0 W_0 + Y_0 W_1 + Y_1 W_0 + Y_1 W_1$$
$$= Y_1 W_1 + Y_0 W_1 + W_0 (Y_0 + Y_1)$$

Therefore the multiplication algorithm is:

$$Y \cdot W = Y_1 W_1 + Y_0 W_1 + W_0 Y$$

This equation shows that the product can be obtained by multiplying the fractional portions of Y and W ($Y_1 W_1$), and then correcting this product according to the signs of the multiplicand and the multiplier. The corrections made to $Y_1 W_1$ are either or both of the following.

(1) $Y_0 W_1$ correction:
   If the multiplier is positive, the correction is zero; if the multiplier is negative, the correction is to subtract $W_1$ from $Y_1 W_1$.
(2) $W_0 Y$ correction:
   If the multiplicand is positive, the correction is zero; if the multiplicand is negative, the correction is to subtract Y (original multiplier) from $W_1 Y_1$.

To illustrate the above algorithm, assume that $$W = 1.10110$$

($-10/32$) is multiplied by $Y = 0.11010 (+26/32)$ which yields the product $1.1011111100 (-260/1024)$. The multiplication of the fraction portions $W_1$ and $Y_1$ occurs first as shown below.

```
   .10110  (W₁)
   .11010  (Y₁)
   ──────
   00000
   10110
   00000
   10110
   10110
   ──────
1000111100  Uncorrected Product
```

Since $Y_0=0$, there is no $Y_0W_1$ end correction. Since the $W_1=1$, Y is subtracted from the uncorrected product developed above. This may be done by adding the 2's complement of Y as shown below.

```
1000111100   Uncorrected Product
  100110     2's complement of Y
─────────────
1.1011111100  (−260/1024)
```

Since the major portion of the computer program of this type is spent in performing multiplications, one of the 16 functions in Phase 4 has been tailored specifically for use in the multiplication subroutine. The use of this function permits a single instruction loop in the multiplication subroutine and reduces the multiplication time by a factor of more than four. The resulting hardware penalty is insignificant compared to the requirements for a complete "multiply instruction."

This special function is Partial Product which is coded as 16 in Field 4 of an instruction word also having octal digits 4 and 0 in Fields III and V, respectively. Its function is to multiply the fractional parts $Y_1$ and $W_1$ of the two operands, there being one bit of the uncorrected product developed during each execution of this instruction. However, by the time Partial Product is first acquired, certain set up instructions of the multiply subroutine have already placed the fractional part $W_1$ of the multiplicand into X register, and the multiplier Y into address location 00006 of the Variable Memory. In addition, these set up instructions also have placed an indicator value 0100—0 into address location 00004 of Variable memory, said location being used to store each uncorrected bit of the product as it is developed during the repeated execution of the Partial Product instruction. As each said partial product bit is placed into position 0 of location 00004, a right shift of one place occurs, so as to eventually result in the single 1 bit of the original indicator number being read out of position 23 and thereby lost. At that time, certain end correction instructions of the multiply subroutine may be acquired in order to carry out the subtractions $Y_0W_1$ and/or $W_0Y$ from $Y_1W_1$ if either or both of these are necessary. At the conclusion of the subroutine, the lower order bits of the 48-bit product are found in location 00004, while the higher order bits including sign are found in A register (location 00000).

In general, the following logic is performed in executing the Partial Product instruction word which has octal digits 4/16/0 in Fields III, IV, and V, respectively. During Phase 3A, X register is referenced by forcing 00001 into S register to withdraw the value $W_1$ therefrom (i.e., the sign position 0 contains a binary 0 value no matter what the sign of the complete multiplicand) and place same into M and M* registers. At CP1 during Phase 4A, M register is cleared by $\bar{A}20$–15, and octal digits 00006 are forced into S register by $\bar{A}20$–56. This latter operation occurs because the Phase $4\bar{G}$ signal is high. Furthermore, the now negative output from $\bar{A}20$–15 also initiates memory operation via $\bar{O}20$–63 which extracts the multiplier Y from location 00006 and places it into M register. $\bar{A}20$–15 additionally sets FF23–11 which causes the multiplier Y to be restored in X register with a right shift of one place. However, M23 (which now holds the bit from position 23 of X register) is sampled at Phase 4B by virtue of the negative signal from $\bar{A}20$–38 so as to place the lowest order multiplier bit into FF23–28.

During Phase 4C, $\bar{A}20$–11 clears M register via $\bar{O}20$–46. The positive output from $\bar{O}20$–46 also initiates memory via O20–65 so that A register is referenced. When the Partial Product instruction is executed for the first time in the multiply subroutine, A register contains all zeros. M register receives the contents of A register. During Phase 4E, $\bar{A}20$–24 initiates memory operation (since signal $4\bar{H}$ is high) to reference A register again. However, this time FF23–17 is set to prevent a transfer of information into M register. When Variable memory restores A register during Phase 4E, the information placed back into A register comes from one of two sources. If the multiplier bit previously stored in DLR flip-flop 23–28 during Phase 4A has a value of 1, then the adder output is transferred into A register because of the enabling of $\bar{A}20$–33. The adder at this time produces the sum of the numbers in M and M* registers, with the former containing the previous contents of A register and the latter containing the fractional part $W_1$ of the multiplicand. However, if the multiplier bit is 0, then FF23–13 is not set, and the signal M To DD restores the contents of M register back into A register. For either case, position 23 of A register now contains a bit of the uncorrected product which must next be transferred into location 00004 of Variable memory.

The storage of the product bit developed during execution of a Partial Product function is performed in the following manner. For the octal digits 16 in Field IV, none of the A gates 20–40, 20–41, or 20–42 can generate a significant positive output. Hence, the signal $\overline{\text{Phase 4 Complete}}$ remains positive even when Phase 4F comes on. $\bar{O}16$–50 cannot therefore generate a positive signal indicating the end of Phase 4. Instead, $\bar{A}16$–51 is enabled to set both FF16–24 and FF16–18 which make positive the signals Phase 4A and Phase 4G. At the next following CP2 time, $\bar{A}16$–48 sets FF16–25 to make positive the Phase 4H signal. As has previously been explained, Phases 4G and 4H remain on until the next following Phase 1.

With phases 4G and 4H being present, Phases 4A through 4F are again set and cleared successively with the following logic occurring. During Phase 4A, $\bar{A}20$–15 again clears M register and initiates memory operation. This time, however, $\bar{A}20$–56 cannot force octal address 00006 into S register since the signal Phase $4\bar{G}$ is down. Consequently, A register is referenced and its contents placed into M register. $\bar{A}20$–15 also sets FF23–11 via $\bar{O}20$–58 to restore A register shifted one place to the right. The product bit generated during the first part of Phase 4 is therefore lost from A register, since M23 has no input to Variable Memory during a right shift operation. However, the product bit still remains in M23 from which it is transferred during Phases 4B, G, and H to DLR FF23–28 by the enabling of $\bar{A}20$–38. During the next following Phase 4C, $\bar{A}20$–11 again clears M register and initiates memory via $\bar{O}20$–46 and O200–65. Also during Phase 4C $\bar{A}20$–55 forces octal address 00004 into S register so that this location in Variable memory is referenced and its contents placed into M register. $\bar{A}20$–11 further sets FF23–11 which in turn restores location 00004 with a right shift of one place. In addition, $\bar{A}20$–11 sets FF23–29 which transfers the product bit now in DLR FF23–28 into position 0 of location 00004.

If the Partial Product instruction now under consideration is being performed for the first time in the multiply subroutine, the indicator bit 1 in position 1 of location 00004 is transferred to M register during this last described Phase 4C period, whereupon it is subsequently restored in position 2 of location 00004 at the same time that the lowest order uncorrected product bit is being stored in position 0 of said location as above described. Hence, each time that an uncorrected product bit is developed and stored in position 0 of location 00004 (which occurs for each execution of the Partial Product instruction), this indicator bit is shifted right one place, until eventually it resides in position 23 of location 00004. Up until this time, however, position 23 has contained binary 0 bits since all developed product bits are introduced into position 0 of location 00004. If position 23 of location 00004 does contain a binary 0 bit at the time Phase 4C when the contents of this location are transferred into M register, then M23 is clear. $\overline{A}$20–30 is enabled by the positive signals Phase 4H, $\overline{M23}$, and PP to generate a significant negative output which in turn generates a positive output from $\overline{O}$20–70. Hence, during Phases 4E, G, and H, $\overline{A}$20–71 is enabled to clear P register of the next sequential instruction address. The negative output from $\overline{A}$20–30 also enables $\overline{O}$20–81 to generate a positive output which causes $\overline{A}$20–82 to transfer the U address portion of the Partial Product instruction from Z11–23 into P register. This U address is the memory address of the Partial Product instruction just considered, so that upon a new Phase 1 being initiated, the same Partial Product instruction just considered is again withdrawn from memory and executed. It is in this fashion that repeated executions of the Partial Product instruction are obtained, each execution developing a higher order uncorrected product bit and storing same into address location 00004.

As mentioned briefly above, position 23 of location 00004 is eventually filled with the indicator 1 bit. This occurs during the next to last execution of the Partial Product instruction. Consequently, during the last execution of the Partial Product instruction this indicator 1 value is placed into M23 in Phases 4C, G, and H. This 1 bit in M23 prevents the enabling of $\overline{A}$20–30, so that P register now retains the calculated address of the next instruction in the multiply subroutine which is higher in value by 1 than the address of the Partial Product instruction under consideration. At the conclusion of this final Partial Product instruction execution, the next following Phase 1 acquires the next instruction which is the first of the instructions designed to perform the end corrections $Y_0W_1$ and $W_0Y$ if either or both are necessary. After all end corrections have been performed, the lower order 24 bits of the final product are found in location 00004, while the higher order 24 bits including sign are in A register.

The division subroutine is specifically designed for a double-length word dividend of 48 bits (including sign). Certain set up instructions of the subroutine are initially employed to place an absolute value of the original dividend in a double length memory register comprised of A register (holding the most significant bits) and location 00004 (holding the least significant bits). These set up instructions also place minus the absolute value of the original divisor (—|divisor|) into the X register, or in other words, the 2's complement of the original divisor if it is a positive value. An indicator value of 0.00—01 is also placed into memory address location 00004 which will indicate when all bits of the uncorrected quotient have been developed. The signs of the original dividend and original divisor are also stored for the end correction of the signs of the quotient and remainder, the latter sign being the same as the sign of the dividend.

After execution of these set up instructions, the Partial Divide instruction word is repeatedly acquired and executed to successively develop the quotient bits which are placed into location 00004 via its position 23. For each execution of the Partial Divide instruction word (having octal digits 4/17/0 in Fields III, IV, and V, respectively), the divisor in X register is or is not subtracted from the previous remainder. The quotient bit $Q_i$ resulting from execution of the Partial Divide instruction is determined in the following manner:

$$Q_i=1 \text{ if } R_{i-1}-D \geq 0$$
$$Q_i=0 \text{ if } R_{i-1}-D < 0$$

where $R_1=2N$, $R_i=2(R_{i-1}-D)$ if $R_{i-1}-D \geq 0$, $R_i=2R_{i-1}$ if $R_{i-1}-D<0$, $Q_i$=ith bit of the quotient, $R$=remainder, $N$=dividend, $D$=divisor.

At the conclusion of each Partial Divide execution, a determination is made as to whether or not the indicator bit of value 1 is present in position 0 of location 00004. If not, this means that not all of the quotient bits have been developed. In this case the U address portion of the Partial Divide instruction word is transferred from Z11–23 to P register. This U address portion is the address of the Partial Divide instruction itself, so that at the next following Phase 1, the Partial Divide instruction is again acquired and executed to develop another quotient bit. When the indicator bit is finally detected in position 0 of location 00004, then P register is allowed to reference memory for the first of the end correction instructions. Thus, as in the case of multiplication, the Partial Divide function permits a single instruction iteration loop in the division subroutine which thus reduces the divison time by a factor of three.

After all quotient bits have been developed by the repeated acquisition and execution of the Partial Divide instruction, the end correction instructions of the subroutine are employed to correct the signs of the quotient and remainder in the following manner:

(1) $Q=Q$ if $N>0$, $D>0$ or $N<0$, $D<0$
(2) $Q=-Q$ if $N>0$, $D<0$ or $N<0$, $D>0$
(3) $R=R/2$
   (a) $R=R=N \geq 0$
   (b) $R=-R$ if $N<0$ For each execution of the Partial Divide instruction, the following logic is performed. During Phase 3, X register is referenced and its contents (minus the absolute value of the original divisor) withdrawn and placed into M* register. During Phase 4A, $\overline{A}$20–16 clears M register. $\overline{A}$20–30 sets FF23–12 via $\overline{O}$20–64 and also initiates operation of memory, while at the same time, $\overline{A}$20–56 forces octal address 00006 into S register so that the lower order bits of the absolute value of the dividend are placed into M register. These lower order bits are restored into location 00006 with a left shift of one place. However, $\overline{A}$20–37 is enabled to transfer the bit now in M0 into FF23–33 so that said bit is not lost because of this left shift.

During Phase 4C, $\overline{A}$20–14 clears M register and initiates memory operation both via $\overline{O}$20–46. Since S register contains octal digits 00000, A register is referenced to place the higher order bits of the absolute dividend value into M register. M* register at this time still contains the divisor value placed there during Phase 3. During Phase 4E, $\overline{A}$20–24 again initiates memory, but at the same time it further sets FF23–17 to prevent A register contents from being transferred into M register and thus destroying the number placed therein during Phase 4C. Instead, A register is erased, and $\overline{A}$20–32 transfers the adder output into A register. This adder output is the sum of the numbers standing in M and M* registers. Thus, the divisor is effectually subtracted from the dividend by this operation during Phase 4E.

If the signal from Adder position (sign) is high (representing binary 1), this means that the divisor is greater than the dividend portion from which it was subtracted. Consequently, the quotient bit for this operation is 0, and the dividend portion must be restored but shifted left in A register for use during generation of the next following quotient bit. On the other hand, if the sign position signal of the adder is negative, then the quotient bit is 1, and the difference is shifted left but retained in A register. To develop the quotient bit, $\overline{A}$20–85 is responsive during Phase 4F to the complement of Adder position 0 output to either set or leave clear the Quotient FF23–35. For example, if the adder position 0 signal is low (binary 0), then $\overline{A}20$–85 is enabled to set FF23–35 which in turn represents a quotient bit of value 1.

In a manner similar to the Partial Product instruction, Phase 4 of Partial Divide includes Phases 4G and 4H. During Phases 4A and 4G, M register is cleared by the combined enabling of $\overline{A}20$–18 and A20–51 if the Quotient FF23–35 has been set during the preceding Phase 4F time. Also, $\overline{A}20$–23 initiates memory so that the A register is referenced and its contents (the difference of Phase 4E) transferred to M register. $\overline{A}20$–23 further sets FF23–12 so that A register is restored from M register with a left shift of one place. $\overline{A}20$–22 also sets FF23–34 to transfer the bit in DLL into position 23 of A register. This bit was previously found in position 0 of location 00006.

On the other hand, if the Quotient FF23–35 is clear at Phases 4A and 4G, M register cannot be cleared of the original dividend portion used during the preceding Phase 4F. When memory is initiated and A register referenced, $\overline{A}20$–27 disables the strobe gates from passing the contents of A register to M register. A register is thus erased, and restored with the original dividend portion shifted left one place.

During Phases 4C and 4G, $\overline{A}20$–14 clears M register and initiates memory. It also sets FF23–12 and FF23–36. $\overline{A}20$–55 forces octal address 00004 into S register to thereby reference this memory location and transfer its contents to M register. Location 00004 is thereafter restored shifted left one place, and the quotient bit developed previously is transferred to position 23. During the remainder of Phase 4F, M0 is examined for the indicator bit, which if not present, causes $\overline{A}20$–29 to clear P register and transfer Z11–23 to P in order to again acquire the Partial Divide instruction.

To illustrate the above algorithm, assume that $$0.011\ 011\ 000\ (+108/256)$$

is divided by 0.1100 ($+12/16$), yielding a quotient of 0.1001 ($+9/16$) and a remainder of 0. The absolute value of the dividend is the same as the original value, while minus the absolute value of the divisor is 1.0100 ($-12/16$). During each execution of the Partial Divide instruction, a quotient bit is calculated (highest order first) as shown below.

|     |                      | Quotient bits |
| --- | -------------------- | ------------- |
| (1) | 0011011000<br>10100  |               |
|     | 11010                | 0.            |
| (2) | 0110110000<br>10100  |               |
|     | 00001                | 0.1           |
| (3) | 0001100000<br>10100  |               |
|     | 10111                | 0.10          |
| (4) | 0011000000<br>10100  |               |
|     | 11010                | 0.100         |
| (5) | 0110000000<br>10100  |               |
|     | 00000                | 0.1001        |

3.2 Jump

Figure 26:
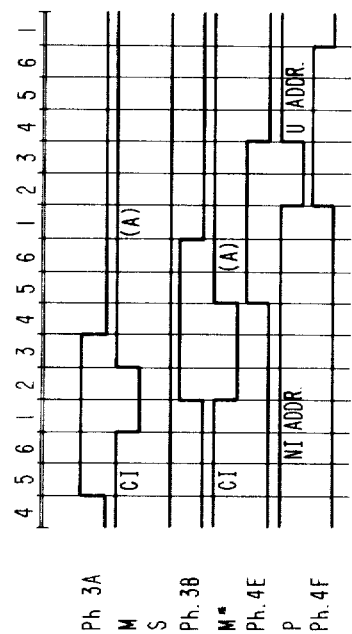

FIGURE 26 is a timing diagram illustrating the execution of an Unconditional Jump instruction specified by the following digits in Fields III, IV and V, respectively: 0/13/0. For this instruction, the U address portion of the instruction word is transferred from Z register into P register where it will be employed to reference memory for the next instruction word instead of the calculated address that P register usually holds. During Phase 3A, M register is cleared of its previous contents, but no value is entered into S register which therefore remains empty. Memory operation is initiated during Phase 3 and the A register in Variable memory is referenced and its contents withdrawn for storage in M register. The restore cycle which follows the read cycle transfers M to A again so that A retains its original contents. M register is also transferred to M* at CP5 time of Phase 3B. These operations in Phase 3 are automatic and cannot be skipped. However, the number from A register now residing in M register is not actually utilized during subsequent Phase 4 operations.

It will now be seen that $\overline{A}20$–43 is enabled to generate a significant negative output for any of the octal codes 13, 14 or 15 in Field IV of the instruction word. Hence, the negative signal to $\overline{A}16$–41 prevents it from setting FF16–18 at completion of Phase 3B operation. Instead, the now positive signal from 120–89 allows $\overline{A}16$–46 to set Phase 4E flip-flop 16–22. Thus, Phases 4A through 4D are not performed, but instead the phase control skips from Phase 3A to Phase 4E. Phase 4F will follow Phase 4E. Since $\overline{A}20$–28 generates a significant negative output for this function code, $\overline{A}20$–71 is enabled to clear the P register at CP2 time of Phase 4E. P register, up until the time it is cleared, stores the next instruction address which had been calculated during Phase 1 of the instruction execution. $\overline{A}20$–36 also generates a negative output so that at CP4 time of Phase 4F, $\overline{A}20$–82 transfers the contents of Z11–23 into P register. Thus, the U address portion of the instruction will be employed during Phase 1 of the next instruction execution cycle in order to reference memory for the next instruction. In this way, a jump is made and instructions therefore need not be withdrawn from sequential addresses. Also during Phase 4F, $\overline{A}20$–42 produces a negative signal from 120–88 which terminates Phase 4 operation in the manner previously described. Since a 0 digit is stored in Field V, the phase control reverts now to a new Phase 1 operation in order to acquire the next instruction word from the address held in P register.

For the Return Jump function coded as octal digits 12 in Field IV, $\overline{A}20$–43 maintains a positive output so that Phase 4 begins with the setting of FF16–18. During Phase 4A, $\overline{A}20$–35 is enabled to clear Z11–23 of its U address portion which has by this time already been employed during Phase 3. Also during Phase 4A, M register is filled with the operand taken from some register location during Phase 3, where this operand represents the address of the next instruction to be acquired at the following Phase 1 time. At Phase 4B, $\overline{A}20$–39 transfers M register to Z11–23 at CP5 time. Subsequently, $\overline{A}20$–28 enables the clearing of P register and $\overline{A}20$–82 transfers Z11–23 in the manner described in connection with FIGURE 26. In this way, the main program may be re-entered after completion of a subroutine by acquiring the instruction address placed into memory from P register at the beginning of said subroutine.

Figure 27:
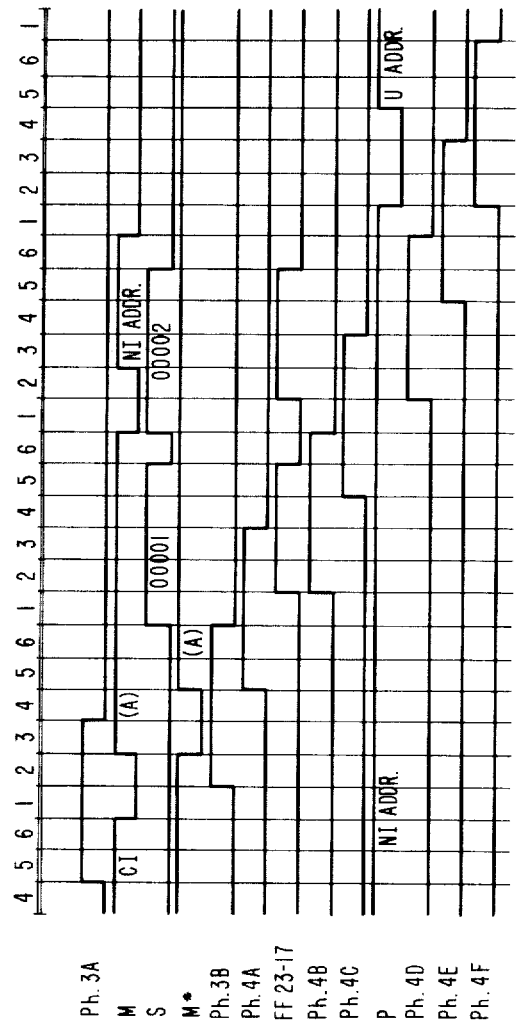

FIGURE 27 is a timing diagram illustrating the execution of an instruction which makes a jump to a subroutine wherein a single operand is employed in the execution of said subroutine. Assume that the single operand to be utilized during the subroutine resides in A register at the time that the subroutine jump instruction word is acquired from memory. In this case, the octal code in each of the Fields III, IV and V of the subroutine jump instruction have the following values: 0/10/0. During execution of this instruction, A register is referenced during Phase 3 and transferred into M register with A register also being restored. Next, the X register in Variable memory is referenced and the single operand in M register transferred thereto so that the arithmetic section will be prepared to commence the first instruction of the subroutine, which is that instruction following the subroutine jump instruction now under consideration. The M register is cleared of this operand and the contents of P register transferred thereto for storage within Variable memory at address location 00002, which is a special register used for holding the next address of the main program to be referenced after completion of the subroutine instructions. In this way, the main program can be re-entered since the last instruction of the subroutine is normally a return jump instruction (above described) whose U address portion references address location 00002. After the P register contents have been stored, the U address portion of the subroutine jump instruction is transferred to P in order that the first instruction of the subroutine may be acquired at the next following Phase 1.

The manner in which the circuitry performs this operation is outlined below. During Phase 3A, S register contains all 0 bits since neither signal Reference X nor Reference U is present. Consequently, when memory is initiated during CP2 time of Phase 3A, the A register in Variable memory has its contents transferred to M register. Subsequent to the completion of Phase 3B, $\overline{A}20$–19 generates a signal to force the octal value 00001 into the S register which is the address of the X register in Variable memory. At CP2 time of Phase 4A, the negative output from $\overline{A}20$–19 also enables $\overline{O}20$–63 and O20–65 to initiate memory operation so that the next register is referenced and its contents withdrawn. However $\overline{O}20$–69 is also responsive to the output from $\overline{A}20$–19 to set FF23–17 and thus prevent the contents of X register from being directed to M register which would, if such occurred, destroy the operand stored in M register at this time. However, since the restore cycle follows the read cycle for Variable memory, the contents of M register are sampled and read into X register to replace the contents formerly there. The single operand to be used during execution of the instructions of the subroutine is now present in X register for use when the subroutine begins. S register is cleared of the A register address by CP6 time next following.

During phase 4C, $\overline{A}20$–12 is enabled to clear M register of the operand. Furthermore, the negative output from $\overline{A}20$–12 is inverted by 120–53 so that $\overline{A}20$–54 forces the octal address 00002 into the S register in order that this Variable memory location can be referenced. The negative output from $\overline{A}20$–12 also provides a positive output from $\overline{O}20$–46 so that memory is initiated at CP2 time of Phase 4C. This operation references the Variable memory at the location in S register, but at the same time $\overline{A}20$–26 causes the setting of FF23–17 to disable the strobe gates and thus prevent information in Variable memory from being read to M register. Instead, $\overline{A}20$–78 gates the contents of P register into M register at CP3 time of Phase 4C so that upon restoring address location 00002, the next address of the main program is transferred thereto where it will be retained until the subroutine is finished. During the phases 4E and 4F, the P register is cleared and Z11–23 transferred thereto in order to provide the address of the first instruction of the subroutine. The operation during phases 4E and 4F consequently are identical to those described in FIGURE 26. Since Field V has an octal digit of 0 coded therein, Phase 5 is skipped at the completion of Phase 4F, and the phase control returns to Phase 1 which uses the address in P register to reference memory for the next instruction.

A modification of the instruction illustrated in FIGURE 27 is as follows. Assume that an instruction word is to be executed having the following octal digits in Fields III through V: 2/11/3. This instruction specifies that a jump must be made to a subroutine which requires two operands for its execution, e.g., multiplication or division. It is assumed that one argument of the subroutine is in the A register and that the address portion of the instruction word now under consideration contains the location of the other argument. The U address portion of the instruction is placed into the S register, and the read-restore signal is sent to the memory to bring the second argument of the subroutine into the M register during Phase 3. During Phase 4, the X register is referenced and the second argument from the M register is transferred to the X register. At this time, one operand of the subroutine is in the A register and the other in the X register. The content of P register is now placed in M register for transfer to address 00002 where it will be stored until the completion of the subroutine in order that the main program may be re-entered. During Phase 5, the three bits in Field V are placed into P register stages 21, 22 and 23 from Z8, 9 and 10, respectively. At the same time this transfer is being made from Z register to P register, P register stages 2 and 20 are automatically set so that the address 02013 is placed into P register. This address will be used during the following Phase 1 to cause referencing of the indicated memory location, which in turn contains an unconditional jump instruction for entering the actual subroutine.

The above-described execution of the subroutine jump with double operand is generally quite similar to the execution of the subroutine jump with single operand, except for the following. Since Field III has the octal digit of 2 coded therein, the memory U register is referenced during Phase 3 instead of the A register shown in FIGURE 27. Consequently, the number transferred into X register during Phase 4 originally came from a register other than A. In Phase 4, $\overline{A}20$–36 is unable to transfer Z11–23 to P register due to the detection of octal code 11 in Field IV, but the same detection permits $\overline{A}20$–83 to transfer the bits in Field V of the instruction word from Z8–10 to P21–23. This signal V to P also sets P register stages 13 and 20 as shown in FIGURE 7. This number in P register now becomes the address of an unconditional jump instruction which in turn, when executed, will withdraw the first instruction of the subroutine.

3.3 Shift

Figure 28:
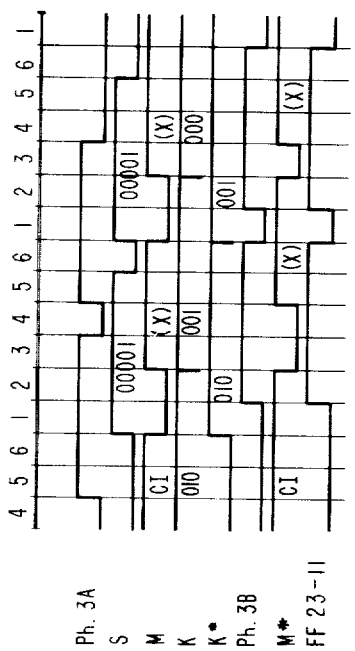

FIGURE 28 is a timing diagram illustrating the operation when the content of the X register is to be shifted right two places. Such an instruction is coded as follows in Fields III, IV and V, respectively: 5/10/0. In this case, the octal digits 02 in Field IV are interpreted as specifying the number of shifts to take place, as well as the direction of the shift. A shift of one place for each pass through Phase 3 will occur, and Phase 4 is skipped entirely as well as Phase 5. Therefore, during execution of the instruction under consideration, Phase 3 is executed twice in succession in order to accomplish the shift of two places.

During Phase 3A, $\overline{A}19$–10 is enabled to force the address 00001 into S register for referencing the X register in Variable memory. Also, a transfer of the contents of K to K* register is made by $\overline{A}19$–12. The contents of K register at the time this transfer occurs had been placed there previously during Phase 1 from positions 5 through 7 of the M register, which at that time contained the three right most bits of Field IV of the instruction. Therefore, during Phase 3, the octal value 2 in K register is transferred to K* register.

At CP2 of Phase 3A, memory is initiated to reference the X register and withdraw its contents to M register. At the same time, $\overline{A}19$–13 is responsive to the 0 bit in Z4, as well as to the indication of shift from I19–24, in order to set FF23–11 which provides a right shift of one place of the number in M register during the restore cycle of the memory write circuits. Consequently, when X register is automatically restored during Phase 3, it contains its original contents shifted one place to the right.

Because of the positive signal from I19–24, $\overline{A}19$–17 transfers K* back to K register at CP3 time of Phase 3A so that 1 is subtracted from the initial value 2 and the difference 1 placed in K register. At CP5 time of Phase 3B, $\overline{A}19$–18 transfers the bit value in M23 to DLR flip-flop 23–28. FF23–28 now contains the rightmost bit of the original value in X register, but since the operation does not call for the shift of a double length word, this bit is not utilized in succeeding operations. It will also be appreciated that $\overline{A}23$–27 sets FF23–32 during the restore cycle in the event that the sign of the original number in X register is 1. This permits retention of the same sign of the number in X register no matter what the number of shifts.

Since Field III contains the octal digit 3, it is seen that Z3 is set. Consequently, a negative signal is applied to $\overline{O}$16–40 which prevents the setting of Phase 4A flip-flop 16–18 at the end of Phase 3, inasmuch as $\overline{A}$16–39 will generate a negative signal. This negative signal from $\overline{A}$16–39 does enable $\overline{O}$16–50 to generate a positive signal which fails to set Phase 5A flip-flop 16–26 because of the 0 digit in Field III. Consequently, $\overline{O}$16–56 generates a positive signal as has previously been described. However, since the register contains a value other than 0 at this time, $\overline{A}$16–57 is unable to initiate the Phase 1A operation. Instead, the positive signal from $\overline{O}$16–56 enables $\overline{A}$16–38 to set the Phase 3A flip-flop 16—16 again because the signal $K \neq 0$ is positive. The initiation of Phase 3 operation once again results in a right shift of one place of the previously shifted number held in X register, with the restoration in X register being of a number equal to the original number shifted right two places. During this second cycle of Phase 3 the contents of K register (which equal 1) is again transferred to K* register, and then back to K register once more with a subtraction of 1 occurring. Thus, by the time that $\overline{O}$16–56 once again generates a positive signal, $\overline{A}$16–57 is enabled to initiate Phase 1 so that the next instruction can be acquired.

A similar operation occurs in the event of a left shift operation, except that Z4 now contains a 1 bit so that $\overline{A}$19–15 is enabled during Phase 3 to restore the Variable memory register with the number shifted left one place. Obviously, other registers besides X may be shifted in this manner, depending upon the particular code held in Field III. For example, A register may be shifted right or left, as well as the U register whose address is held by Z11–23.

Figure 29:
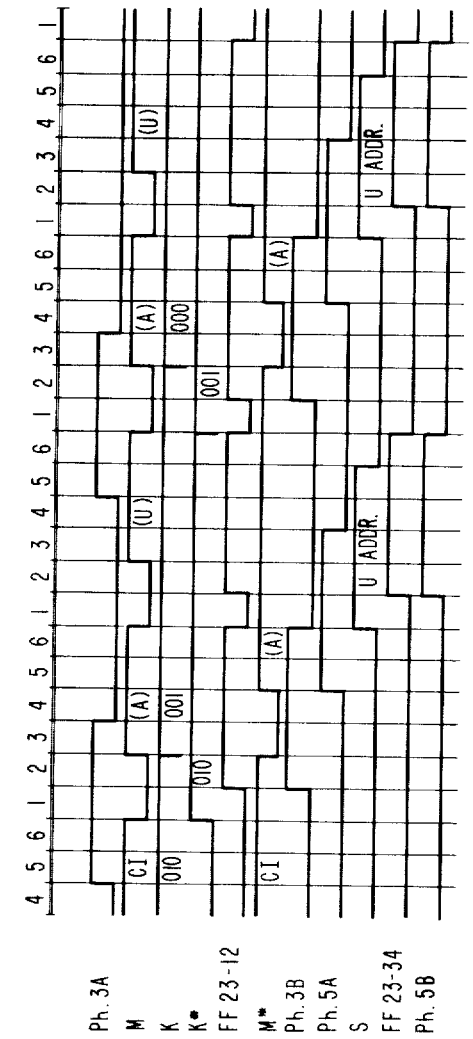

FIGURE 29 is a timing diagram illustrating the execution of a shift operation on a double length (48 bit) word. In the present system the programmer can, with one instruction, shift the contents of two registers (acting as a double length register) either right or left, 1 to 8 places. One of the registers must, however, be the A register or the X register. Assume that the double length shift instruction under consideration has the following octal codes in Fields III, IV and V: 1/12/5. This instruction specifies that a double length word (48 bits) is to be shifted left two places. The right hand portion of this word, i.e., the lowest order 24 bits, is held in the A register, while the left hand portion of this word including sign is held in the memory U register specified by the bits in Z11–23. During Phase 3, the A register is referenced and restored with a shift of one place to the left. Since the 0 position bit of the original contents of A is normally lost during such a left shift operation, it must be stored in flip-flop 23–33 for use during Phase 5. Phase 4 is skipped since the bits in Field IV are merely used to specify the number of places to be shifted. During Phase 5, the left hand portion of the double length word is referenced from the U register location in memory and is restored also with a shift of one place to the left. However, this Phase 5 shift further results in the content of FF23–33 being placed into position 23 of the U register. Consequently, the only bit lost in the double length word is its original sign bit which resides in position 0 of the U register prior to any shifting. Since a shift of two places is required by the instruction under consideration, Phases 3 and 5 must be repeated at least once before Phase 1 can be entered.

Referring now to FIGURE 29, it is seen that the operation during Phase 3 is exactly identical to the Phase 3 operation of a single length word shift previously described in connection with FIGURE 28. The only exception is the fact that a left shift is performed in FIGURE 29. Phase 4 is skipped since $\overline{O}$16–40 has a negative input thereto because of the 1 bit in Z3. However, since Field V of the instruction word contains a digit other than 0, $\overline{O}$16–52 generates a negative signal which permits $\overline{A}$16–54 to set Phase 5A flip-flop 16–26 upon completion of Phase 3. During Phase 5, a negative output from $\overline{A}$21–11 allows $\overline{A}$21–13 to transfer Z11–23 into S register. This occurs at CP1 time. M register is also cleared by $\overline{A}$21–14. At CP2 time, $\overline{A}$21–17 sets FF23–12 because of the 1 bit in Z4 and because of the negative output from $\overline{A}$21–14. Consequently, when U register is referenced, its contents are placed in M register and then shifted one place to the left during the Variable memory restore write cycle. $\overline{A}$21–17 further sets FF23–34 in order to allow $\overline{A}$23–53 to sample the contents of FF23–33 and so place the left most bit of the original A register contents into the right most position 23 of the U register. The leftmost bit of the original U register content is lost during this left shift in Phase 5.

During the preceding Phase 3 operation, the content of K register is reduced by 1 in the fashion previously described in connection with FIGURE 28. When Phase 5B flip-flop 16–27 is set, $\overline{O}$16–56 generates a positive output which fails to enable $\overline{A}$16–57 as long as K register contains a digit value other than 0. Consequently, the positive output from $\overline{O}$16–56 again initiates Phase 3 operation, and subsequently Phase 5 operation, in order to perform another left shift on the double length word and so reduce the content of K register to 0. At the conclusion of this repeat of Phase 3 and Phase 5 operations, $\overline{A}$16–57 is now enabled to initiate a new Phase 1 operation to acquire the next instruction.

It may here be mentioned that the above-described shift operation in FIGURE 29 can be employed to perform logical shifts and end around shifts. A logical shift is a single length right shift in which the left end of the word being shifted is filled with zeros instead of the sign bit. This operation is necessary for composing discrete words and operating on logical rather than numeric expressions. The logical shift is implemented by a double length shift, with the lefthand word being all zeros and the word to be shifted being in the A register. Consequently, zeros from the left hand word are placed in the sign position of the A register each time that a shift occurs, instead of the sign of the original contents of the A register. An end around shift can be implemented by using a double length shift and making both halves of the double length word identical. To perform an end around right shift of the contents of location U, this quantity must first be placed into A register by an appropriate instruction. Then, a double length shift is executed where the A register is the left hand portion of the word.

In summary, it may be stated that the present invention provides means for processing and executing an instruction word in a series of successive phase periods each controlled by a different command field of the word. One or more of these phase periods may be skipped entirely when not needed in order to speed up the execution time. Furthermore, the particular operation performed during a phase period may or many not depend upon the operation performed during another phase period. Alternatively, a command field of the instruction word can be utilized during the phase period other than the one normally assigned to it.

The specific details of certain components, such as the memories, clock pulse distributor, and input-output units, have not been shown inasmuch as they are conventional. Furthermore, only one kind of memory need be provided to store both instructions, constants, and working data. The A and X registers, as well as other special registers, might also be external to the memory as in conventional systems. Consequently, while a preferred embodiment of the present invention has been shown and described, it is obvious that many modifications thereto will be apparent to those skilled in the art without departing from the spirit of the invention as defined in the appended claims.

We claim:

1. In a data processing system, the combination according to claim 11 wherein said first control means comprises a plurality of groups of bistable elements, said groups at least equal in number to said storage means locations with a least one element per group where plural bistable elements in any group are so interconnected as to be sequentially settable to one stable condition and resettable to the other stable condition such that the set condition of any element in the same group generates signals for defining at least a part of the same time phase period which in turn is different from the phase period defined by the signals from the set condition of an element in any other group, where said first control means further includes individual gating means for each of said groups which, upon conditioning, is responsive to a said first signal from a said first translating means connected to a different one of said storage means location to thereby initiate the sequential setting and resetting of the elements within its associated group; and said second control means comprises means for applying to each of said individual gating means a conditioning signal which is derived in part from the set condition of the last element to be sequentially set in a group other than the group associated with said individual gating means.

2. In a data processing system, the combination according to claim 12 wherein on said second translating means is conditioned by at least one predetermined said operation value in its connected storage means location for causing said command generator means to transfer information between said memory unit and said arithmetic unit, and a different said second translating means is conditioned by at least one predetermined said operation value in its connected storage means for causing said command generator means to perform an arithmetic operation upon information contained in said arithmetic unit.

3. In a data processing system, the combination according to claim 12 wherein said first control means comprises a plurality of groups of bistable elements, said groups at least equal in number to said storage means locations with at least one element per group where plural bistable elements in any group are so interconnected as to be sequentially settable to one stable condition and resettable to the other stable condition such that the set condition of any element in the same group generates signals for defining at least a part of the same time phase period which in turn is different from the time phase period defined by the signals from the set condition of an element in any other group, where said first control means further includes individual gating means for each of said groups which, upon conditioning, is responsive to a said first signal from a said first translating means connected to a different one of said storage means locations to thereby initiate the sequential setting and resetting of the elements with its associated group; and said second control means comprises means for applying to each of said individual gating means a conditioning signal which is derived in part from the set condition of the last element to be sequentially set in a group other than the group associated with said individual gating means.

4. In a data processing system whose instruction word command portion is divided into at least three command fields, the combination according to claim 14 wherein a first said second translator means is conditioned by at least one predetermined operation value in its connected storage means location for causing said command generator means to transfer information from said memory unit to said arithmetic unit, a second said second translator means is conditioned by at least one predetermined operation value in its connected storage means location for causing said command generator means to perform an arithmetic operation upon information in said arithmetic unit, and a third said second translating means is conditioned by at least one predetermined operation value in its connected storage means location for causing said command generator means to transfer information from said arithmetic unit to said memory unit, and said third means sequentially conditions said plurality of second means such that particular phase signal indications identifying storage means locations connected with the first, second, and third said second translating means are generated in that order.

5. In a data processing system whose instruction word command portion is divided into at least three command fields, the combination according to claim 14 wherein a first said second translating means is conditioned by at least one predetermined operation value in its connected storage means location for causing said command generator means to transfer information from said memory unit to said arithmetic unit, a second said second translating means is conditioned by at least one predetermined operation value in its connected storage means location for causing the command generator means to perform an arithmetic operation upon information in said arithmetic unit, and a third said second translating means is conditioned by at least one predetermined operation value in its connected storage means location for causing said command generator to check the results of a previously performed arithmetic operation for an overflow indication, and said third means conditions said plurality of second means such that particular predetermined phase signal indications identifying the storage means locations connected with the first, second, and third said second translating means are successively generated in that order.

6. In a data processing system whose instruction word command portion is divided into at least three command fields, the combination according to claim 14 wherein a first said second translating means is conditioned by at least one predetermined operation value in its connected storage means location for causing said command generator means to transfer information from said memory unit to said arithmetic unit, a second said second translating means is conditioned by at least one predetermined operation value in its connected storage means location for causing the command generator means to perform an arithmetic operation upon information in said arithmetic unit, and a third said second translating means is conditioned by at least one predetermined operation value in its connected storage means location for selectively causing said command generator means to transfer the information from said arithmetic unit to said memory unit, or said command generator means to check the results of a previously performed arithmetic operation for an overflow indication, and said third means conditions said plurality of second means such that particular predetermined phase signal indications identifying the storage means locations connected with the first, second, and third said second translating means are successively generated in that order.

7. In a data processing system whose instruction word command portion is divided into at least three command fields, the combination according to claim 14 wherein a first said second translating means is conditioned by at least one predetermined operation value in its connected storage means location for causing said command generator means to transfer information from said memory unit to said arithmetic unit, a second said second translating means is conditioned by at least one predetermined operation value in its connected storage means location for causing said command generator means to perform an arithmetic operation upon information in said arithmetic unit, and a third said second translating means is conditioned by at least one predetermined operation value in its connected storage means location for causing said command generator means to selectively modify the instruction program, and said third means conditions said plurality of said second means such that particular predetermined phase signal indications identifying the storage means locations connected with the first, second, and third said second translating means are successively generated in that order.

8. In a data processing system, the combination according to claim 17 wherein said command generator means utilizes said last named operation value as a shift count.

9. In a data processing system, the combination according to claim 17 wherein said command generator means utilizes said last named operation value as an address.

10. Phase control means according to claim 19 wherein said first control means comprises a plurality of groups of bistable elements, said groups at least equal in number to said storage means locations with at least one element per group where plural bistable elements in any group are so interconnected as to be sequentially settable to one stable condition and resettable to the other stable condition such that the set condition of any element in the same group generates signals for defining at least a part of the same time phase period which in turn is different from the time phase period defined by the signals from the set condition of an element in any other group, where said first control means further includes individual gating means for each of said groups which, upon conditioning, is responsive to a said first signal from a said translating means connected to a different one of said storage means locations to thereby initiate the sequential setting and resetting of the elements within its associated group; and said second control means comprises means for applying to each of said individual gating means a conditioning signal which is derived in part from the set condition of the last element to be sequentially set in a group other than the group associated with said individual gating means.

11. In a stored program data processing system for executing an instruction word whose command portion is divided into a plurality of command fields in each of which can be selectively present or absent any one of a group of values specifying an operation to be performed during said instruction word executive, the combination comprising:

(a) multi-location storage means for concurrently holding said plural command fields of a single instruction word each at a different location therein;

(b) a plurality of first translating means each connected with a different said storage means location so as to be responsive to the presence of any said operation value therein for producing a same first signal, and to the absence of all said operation values therein for producing a second signal;

(c) first control means conditionable to independently sense any one of said first translating means such that a said first signal therefrom causes said first control means to generate a particular phase signal indication which uniquely identifies that said storage means location whose first translating means is being sensed and also defines a time phase period during which the operation specified by any said operation value therein is to be performed, while a said second signal therefrom prevents said first control means from generating any phase signal indication identifying said last named storage means location;

(d) second control means for conditioning said first control means to make the latter sequentially sense said plurality of first translating means in a manner such that said particular phase signal indications are successively generated, with said second control means being responsive at the commencement of sensing any said first translating means to a said second signal therefrom in order to immediately condition said first control means to sense a different one of said first translating means; and (e) command generator means responsive to each said particular phase signal indication for sampling said identified storage means location so as to direct the data processing system in performing only the operation specified by a said operation value therein.

12. In a data processing system which includes memory and arithmetic units, the combination according to claim 11 wherein said command generator means includes a plurality of second translating means each connected to a different said storage means location for interpreting any said operation value therein in a manner different from the interpretation given operation values in any other said storage means location.

13. In a stored program data processing system for executing an instruction word whose command portion is divided into a plurality of command fields in each of at least a predetermined two of which can be selectively present or absent any one if a group of values specifying an operation to be performed during said instruction word execution, and in each of any remaining command fields is a value specifying an operation also to be performed during said instruction word execution, the combination comprising:

(a) a multi-location storage means for concurrently holding said plural command fields of a single instruction word each at a different location therein;

(b) a plurality of first means each associated with a different said storage means location and operable only upon receipt of an actuating signal individual thereto to thereby generate a particular phase signal indication which uniquely identifies its said associated storage means location and also defines a time phase period during which the operation specified by any said operation value therein is to be performed;

(c) a plurality of second means each individual coupled to a different said first means and conditionable to apply thereto a said actuating signal; where each said second means, which is coupled to a said first means whose particular phase signal indications identifies a storage means location holding a said predetermined command field, includes a first translating means individually connected to said last named identified storage means location and selectively responsive to the presence of any said operation value therein and the absence of all said operation values therein for respectively permitting or preventing said second means upon conditioning from so applying said actuating signal;

(d) third means for sequentially conditioning said plurality of second means in a predetermined order such that said particular phase signal indications are successively generated, where any said first translating means is further responsive at the commencement of conditioning its said second means to the absence of all operation values in its connected storage means location for thereby causing said third means to immediately condition said second means next following in said predetermined order; and (e) command generator means responsive to each said particular phase signal indication for sampling said identified storage means location so as to direct the data processing system in performing only the operation specified by an operation value therein.

14. In a data processing system which includes memory and arithmetic units, the combination according to claim 13 wherein said command generator means includes a plurality of second translator means each connected to a different said storage means location for interpreting any said operation value therein in a manner different from the interpretation given operation values in any other said storage means location.

15. In a stored program data processing system for executing an instruction word whose command portion is divided into a plurality of command fields in each of at least a predetermined two of which can be selectively present or absent any one of a group of values specifying an operation to be performed during said instruction word execution, and in each of any remaining command fields is a value specifying an operation also to be performed during said instruction word execution, the combination comprising:
  (a) a multi-location storage means for concurrently holding said plural command fields of a single instruction word each at a different location therein;
  (b) a plurality of first means each associated with a different said storage means location and operable only upon receipt of an actuating signal individual thereto to thereby generate a particular phase signal indication which uniquely identifies its said associated storage means location and also defines a time phase period during which the operation specified by any said operation value therein is to be performed;
  (c) a plurality of second means each individually coupled to a different said first means and conditionable to apply thereto a said actuating signal; where each said second means, which is coupled to a said first means whose particular phase signal indication identifies a storage means location holding a said predetermined command field, includes a first translating means individually connected to said last named identified storage means location and selectively responsive to the presence of any said operation value therein and the absence of all said operation values therein for respectively permitting or preventing said second means upon conditioning from so applying said actuating signal;
  (d) at least one second translating means connected to at least one said storage means location and responsive to at least one predetermined operation value therein for inhibiting a said second means associated with a different storage means location from applying a said actuating signal to the said first means whose particular phase signal indication identifies said last named different storage means location;
  (e) third means for sequentially conditioning said plurality of second means in a predetermined order such that said particular phase signal indications are successively generated; where any said first translating means is further responsive at the commencement of conditioning its said second means to the absence of all operation values in its connected storage means location for thereby causing said third means to immediately condition the said second means next following in said predetermined order; and any said second translating means is also responsive at the commencement of conditioning the said second means inhibited by it for causing said third means to immediately condition the said second means next following in said predetermined order; and
  (f) command generator means responsive to each said particular phase signal indication for sampling said identified storage means location so as to direct the data processing system in performing only the operation specified by an operation value therein.

16. In a data processing system, the combination according to claim 15 wherein a said second translating means is connected to a storage means location which in turn has its associated second means conditioned by said third means at a particular time in said predetermined order, and the said second means inhibited by said last named second translating means is conditioned by said third means at some subsequent time in said predetermined order.

17. In a data processing system, the combination according to claim 15 wherein said command generator means is conditioned by a second second translating means to sample the operation value held in the said storage means location whose said associated second means is inhibited by said last named translating means so as to employ the said last named operation value as an auxiliary control function during the generation of some predetermined particular phase signal indication.

18. In a data processing system, the combination according to claim 17 wherein said command generator means employs said last named operation value during the generation of that particular phase signal indication which identifies the storage means location to which the said last named second translating means is connected.

19. Phase control means for scanning an instruction word whose command portion is divided into a plurality of command fields in each of which can be selectively present or absent any one of a group of values specifying an operation to be performed during said instruction word execution which comprises the combination of:
  (a) a multi-location storage means for concurrently holding said plural command fields of a single instruction word each at a different location therein;
  (b) a plurality of translating means each connected with a different said storage means location so as to be responsive to the presence of any said operation value therein for producing a same first signal, and to the absence of all said operation values therein for producing a second signal;
  (c) first control means conditionable to independently sense any one of said translating means such that a said first signal therefrom causes said first control means to generate a particular phase signal indication which uniquely identifies that said storage means location whose translating means is being sensed and also defines a time phase period during which the operation specified by any said operation value therein is to be performed while a said second signal therefrom prevents said first control means from generating any phase signal indication identifying said last named storage means location; and
  (d) second control means for conditioning said first control means to make the latter sequentially sense said plurality of translating means in a manner such that said particular phase signal indications are successively generated, with said second control means being responsive at the commencement of sensing any said translating means to a said second signal therefrom in order to immediately condition said first control means to sense a different one of said translating means.

20. Phase control means for scanning an instruction word whose command portion is divided into a plurality of command fields in each of at least a predetermined two of which can be selectively present or absent any one of a group of values specifying an operation to be performed during said instruction word execution, and in each of any remaining command fields is a value specifying an operation also to be performed during said instruction word execution, which comprises the combination of:
  (a) a multi-location storage means for concurrently holding said plural command fields of a single instruction word each at a different location therein;
  (b) a plurality of first means each associated with a different said storage means location and operable only upon receipt of an actuating signal individual thereto to thereby generate a particular phase signal indication which uniquely identifies its said associated storage means location and also defines a time phase period during which the operation specified by any said operation value therein is to be performed;
  (c) a plurality of second means each individually coupled to a different said first means and conditionable to apply thereto a said actuating signal; where each said second means, which is coupled to a said first means whose particular phase signal indication identifies a storage means location holding a said predetermined command field, includes a translating means individually connected to said last named identified storage means location and selectively responsive to the presence of any said operation value therein and the absence of all said operation values therein for respectively permitting or preventing said second means upon conditioning from so applying said actuating signal;

(d) third means for sequentially conditioning said plurality of second means in a predetermined order such that said particular phase signal indications are successively generated; where any said translating means is further responsive at the commencement of conditioning its said second means to the absence of all operation values in its connected storage means location for thereby causing said third means to immediately condition the said second means next following in said predetermined order.

21. Phase control means for scanning an instruction word whose command portion is divided into a plurality of command fields in each of at least a predetermined two of which can be selectively present or absent any one of a group of values specifying an operation to be performed during said instruction word execution, and in each of any remaining command fields is a value specifying an operation also to be performed during said instruction word execution, which comprises the combination of:

(a) a multi-location storage means for concurrently holding said plural command fields of a single instruction word each at a different location therein;

(b) a plurality of first means each associated with a different said storage means location and operable only upon receipt of an actuating signal individual thereto to thereby generate a particular phase signal indication which uniquely identifies its said associated storage means location and also defines a time phase period during which the operation specified by any said operation value therein is to be performed;

(c) a plurality of second means each individually coupled to a different said first means and conditionable to apply thereto a said actuating signal; where each said second means, which is coupled to a said first means whose particular phase signal indication identifies a storage means location holding a said predetermined command field, includes a first translating means individually connected to said last named identified storage means location and selectively responsive to the presence of any said operation value therein and the absence of all said operation values therein for respectively permitting or preventing said second means upon conditioning from so applying said actuating signal;

(d) at least one second translator means connected to at least one said storage means location and responsive to at least one predetermined operation value therein for inhibiting a said second means associated with a different storage means location from applying a said actuating signal to the said first means whose particular phase signal indication identifies said last named different storage means location; and (e) third means for sequentially conditioning said plurality of second means in a predetermined order such that said particular phase signal indications are successively generated; whereby any said first translating means is further responsive at the commencement of conditioning its said second means to the absence of all operation values in its connected storage means location for thereby causing said third means to immediately condition the said second means next following in said predetermined order; and any said second translating means is also responsive at the commencement of conditioning the said second means inhibited by it for causing said third means to immediately condition the said second means next following in said predetermined order.

22. Phase control means according to claim 21 wherein a said second translating means is connected to a storage means location which in turn has its associated second means conditioned by said third means at a particular time in said predetermined order, and the said second means inhibited by said last named second translating means is conditioned by said third means at some subsequent time in said predetermined order.

23. Phase control means for scanning an instruction word whose command portion is divided into a plurality of command fields in each of at least a predetermined two of which can be selectively present or absent any one of a group of values specifying an operation to be performed during said instruction word execution, and in each of any remaining command fields is a value specifying an operation also to be performed during said instruction word execution, which comprises the combination of:

(a) a multi-location storage means for concurrently holding said plural command fields of a single instruction word each at a different location therein;

(b) a plurality of first means each associated with a different said storage means location and operable only upon receipt of an actuating signal individual thereto to thereby generate a particular phase signal indication which uniquely identifies its said associated storage means location and also defines a time phase period during which the operation specified by any said operation value therein is to be performed;

(c) a plurality of second means each individually coupled to a different said first means and conditionable to apply thereto a said actuating signal; where each said second means, which is coupled to a said first means whose particular phase signal indication identifies a storage means location holding a said predetermined command field, includes a translating means individually connected to said last named identified storage means location and selectively responsive to the presence of any said operation value therein and the absence of all said operation values therein for respectively permitting or preventing said second means upon conditioning from so applying said actuating signal;

(d) third means for sequentially conditioning said plurality of second means in a predetermined order such that said particular phase signal indications are successively generated; where any said translating means is further responsive at the commencement of conditioning its said second means to the absence of all operation values in its connected storage means location for thereby causing said third means to immediately condition the said second means next following in said predetermined order; and (e) fourth means connected to at least one said storage means location and responsive to at least one predetermined operation value therein for causing the said first means, whose particular phase signal indication identifies said last named storage means location, to repeat the generation of said last named phase signal indication.

References Cited by the Examiner

UNITED STATES PATENTS 2,914,248  11/1959  Ross et al. _____ 235—157

OTHER REFERENCES

Pages 101–106, 1959 Chao, "The System Organization of Mobidic B," Proc. of the E.J.C.C.

ROBERT C. BAILEY, *Primary Examiner.*

MALCOLM A. MORRISON, *Examiner.*

B. REIN, R. B. ZACHE, *Assistant Examiners.*